US008567961B2

(12) United States Patent
Huebner

(10) Patent No.: US 8,567,961 B2
(45) Date of Patent: Oct. 29, 2013

(54) LIGHT ARRAY PROJECTION AND SENSING SYSTEM

(76) Inventor: Kenneth J. Huebner, Milwaukee, WI (US)

(*) Notice: Subject to any disclaimer, the term of this patent is extended or adjusted under 35 U.S.C. 154(b) by 6 days.

(21) Appl. No.: 13/336,051

(22) Filed: Dec. 23, 2011

(65) Prior Publication Data

US 2012/0092623 A1    Apr. 19, 2012

Related U.S. Application Data

(63) Continuation-in-part of application No. 12/435,073, filed on May 4, 2009, now Pat. No. 8,100,540.

(51) Int. Cl.
*G03B 21/14*    (2006.01)

(52) U.S. Cl.
USPC ............ 353/94; 353/30; 353/43; 353/120; 352/87

(58) Field of Classification Search
USPC ............. 353/15, 19, 30, 39, 43, 62, 94, 103, 353/107, 108, 109, 120; 40/362, 366, 367, 40/456, 474, 701; 352/50, 52, 81, 87
See application file for complete search history.

(56) References Cited

U.S. PATENT DOCUMENTS

| | | | |
|---|---|---|---|
| 5,321,449 A | 6/1994 | Coccoli et al. | |
| 5,450,148 A | 9/1995 | Shu et al. | |
| 6,104,625 A * | 8/2000 | Shona | 363/89 |
| 6,443,590 B1 * | 9/2002 | Lovitt | 362/103 |
| 6,623,126 B2 | 9/2003 | Sekiguchi et al. | |
| 7,338,175 B2 | 3/2008 | Miyzazwa et al. | |
| 7,410,263 B2 | 8/2008 | Miyzazwa et al. | |
| 7,472,997 B2 | 1/2009 | Miyzazwa | |
| 7,874,681 B2 | 1/2011 | Huebner | |
| 7,959,320 B2 | 6/2011 | Mueller et al. | |
| 2007/0183152 A1 * | 8/2007 | Hauck et al. | 362/251 |
| 2008/0143966 A1 * | 6/2008 | Mastrosimone-Gese et al. | 353/15 |
| 2008/0174515 A1 | 7/2008 | Matthies et al. | |
| 2008/0316439 A1 | 12/2008 | Conner | |
| 2009/0016052 A1 | 1/2009 | Holder et al. | |
| 2009/0051793 A1 | 2/2009 | Smith | |
| 2009/0051831 A1 | 2/2009 | Bierhuizen et al. | |
| 2009/0052204 A1 | 2/2009 | Kawashima et al. | |
| 2009/0091710 A1 | 4/2009 | Huebner | |
| 2011/0115823 A1 | 5/2011 | Huebner | |
| 2011/0122368 A1 * | 5/2011 | Fischer | 352/5 |
| 2011/0141442 A1 | 6/2011 | Auerbach et al. | |
| 2011/0141856 A1 | 6/2011 | Cho et al. | |

* cited by examiner

*Primary Examiner* — William C Dowling
(74) *Attorney, Agent, or Firm* — Andrus, Sceales, Starke & Sawall, LLP

(57) ABSTRACT

A low cost, light projection and sensing system that projects an image onto a display surface using an array of light emitters. The system or device has an integral sensing capability of the display surface using light sensors. Both the emitters and sensors are coupled to a control unit. The device modifies the light-projected image and sensor view region with its control unit. The device projects an animated overlaid image or large tiled image of photographic resolution. In at least one embodiment, a projection device may create smooth animation of its projected image by varying the brightness of one or more illuminated images within its generated video frames. Computer implemented methods are utilized for light emitter activation and brightness control.

22 Claims, 45 Drawing Sheets

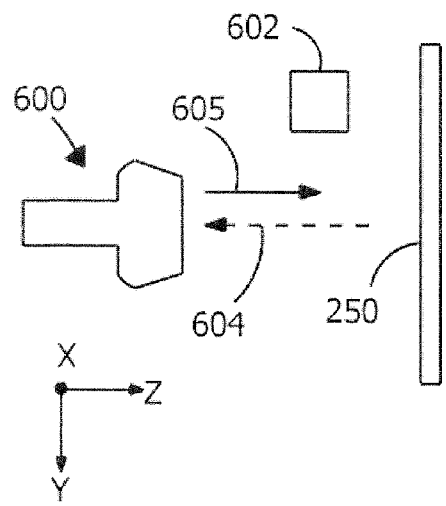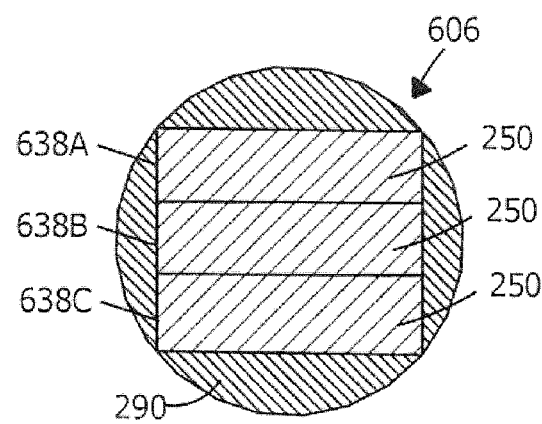
FIG. 32A  FIG. 32B
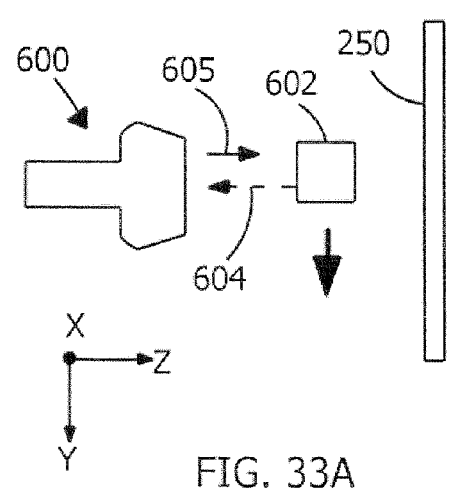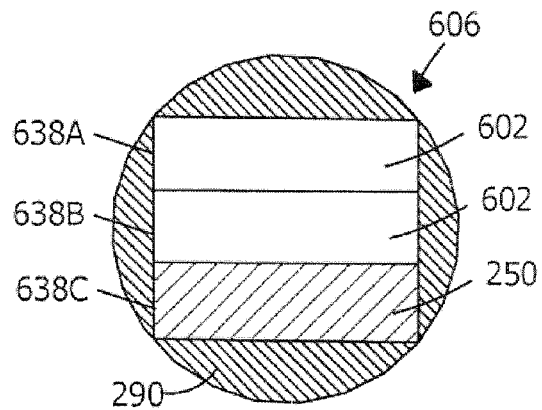
FIG. 33A  FIG. 33B

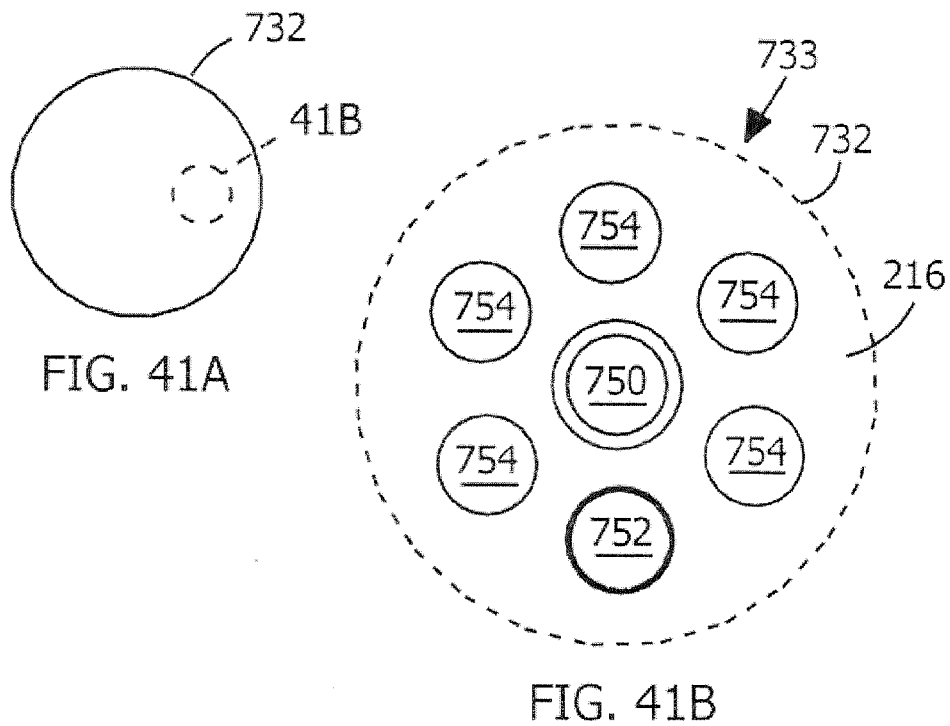
FIG. 41A
FIG. 41B
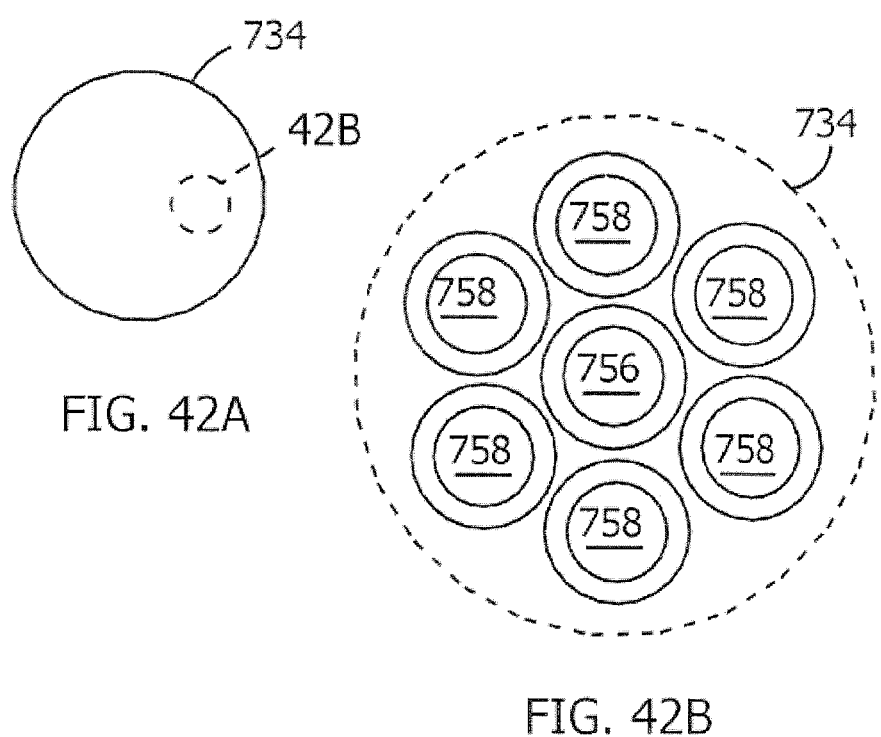
FIG. 42A
FIG. 42B

LIGHT ARRAY PROJECTION AND SENSING SYSTEM

CROSS-REFERENCE TO RELATED APPLICATION

The present application is a continuation-in-part application based on and claiming priority to U.S. patent application Ser. No. 12/435,073 filed May 4, 2009.

FIELD OF THE INVENTION

The present disclosure generally relates to a light projection device. More specifically, the present disclosure relates to a compact, low cost, light projection device that may be able to project a photo-realistic, animated image from an array of light sources onto a projection surface. The projection device may also have an integral light sensing capability for the projection surface, allowing touch and hand gesture sensing.

BACKGROUND

Presently, applications for compact light projection devices are quite limited due to their high cost and taxing energy demands. Small MEMS-based mobile projection devices have appeared in the marketplace, costing upwards of a few hundred dollars and operate for about two hours before battery depletion. Such product limitations make it difficult to market mobile projection devices for a host of applications with wide consumer appeal. As a result, state-of-the-art mobile projection devices tend to be sold as a communication tool for affluent professionals in conveying business, medical, and sports related information.

Further, in contemplating non-mobile technology, large-scale projection systems often cost thousands of dollars to illuminate a graphic screen in a public forum. Moreover, the power hungry systems tend to be inefficient as well, wasting much energy as generated heat.

Therefore, an opportunity exists for a compact, low cost, energy-efficient light projection system having a more diverse range of applications, such as children's toys, women's jewelry, home entertainment, retail billboards, and other kinds of products serving a larger audience.

SUMMARY

The present disclosure generally relates to a light projection device in which the device or system generates an output image. More specifically, the present disclosure relates to a compact, low cost, light projection device that may be able to project an animated, photo-realistic image from an array of light sources onto a projection surface. The projection device may also have an integral ability to sense a light image on the projection surface using an array of light sensors. In one embodiment, the projection device can detect a remote object; while in another embodiment, the projection device is touch sensitive. Sound effects and other sensory feedback can be provided to enhance the visual effects.

In at least one embodiment, the light projection device is shaped as a toy flashlight and contains an LED array powered by a small battery. When the device's projection beam is swept across a household wall, an animated image of a walking dog delightfully appears. The sound effect of dog paws tip-tapping on the floor accompanies the projected image. With remarkable efficiency, the projection device may operate for up to eighty hours without recharging. The light projection device may further create smooth animation of its projected image by varying the brightness of each generated video frame. In accordance with the present disclosure, computer implemented methods are disclosed for light emitter activation and brightness control.

A control unit within the projection device animates the projected image by activating light sources in a coordinated manner. In at least one embodiment, the device includes a microprocessor-based control unit that is operatively associated with light sources and/or light sensors.

Accompanying the control unit, the projection device includes a light array. In at least one embodiment, the light array contains LEDs that emit modulated beams of light. In another embodiment, the light array has photo sensors that observe specific regions of the projection surface. The light array may be of any shape or size, ranging from millimeters across to more than ten meters square.

Surrounding the light array, the projection device includes a primary light guide. The primary light guide is a panel of walled openings that guide the transmitted and received light.

Forward of the primary light guide, the projection device includes a multi-image film. Like a traditional projection slide, the translucent film filters the light and creates a light image, pattern, or coloration of photographic resolution. In some embodiments, the multi-image film is permanently fixed within the device. In other embodiments, the multi-image film is a removable, rotating film diskette, such that the subject matter of the projected image may be modified.

Adjacent to the multi-image film, the projection device optionally includes a secondary light guide. The purpose of the secondary light guide is to further control the projected light.

Atop the secondary light guide, the projection device has a bug-eyed lens. Much like an insect's eye, the bug-eyed lens has myriad optical lens focusing light onto the projection surface.

Finally, all of the above mentioned parts—namely, the light array, primary light guide, multi-image film, secondary light guide, and bug-eyed lens—form an array pack. The array pack is highly integrated and designed for compactness.

Notwithstanding, various illumination styles exist for the array pack. In some embodiments, multiple light beams converge to a common spot on the projection surface. This illumination style is best suited when animating a sequence of overlaid images, such as a galloping horse. In other embodiments, clusters of light beams are parallel and well suited for animating backlit displays, like an advertising sign. In further embodiments, the light beams diverge, enabling the projection of a giant tiled image, such as a landscape.

Various display styles exist too. Sometimes light is projected outward from the device's body, or light is projected internally within a light-transmissive housing—creating a visible image on its exterior. For example, a kiosk projection system provides a backlit billboard in a public forum.

To enhance the visual effects, the system may include a sensory input module. The sensory input module provides interactive, contextual information to the device's control unit. In one mobile embodiment, the module contains a spatial sensor, such as an accelerometer. Based upon the sensed movement signals from the spatial sensor, the control unit modifies the projected image.

To further engage a user, the system may include a sensory output module. The output module can provide a LCD display as a visual menu, an audio synthesizer for sound playback, or a haptic feedback element for tactile sensation. All of these sensations are synchronized with the device's light output for a richer user experience.

The system can also wirelessly communicate. That is, the system's control unit can modulate the light array and transmit a light encoded message to a remote object. In one embodiment, a wand-shaped projection device casts illuminated stars. When the wand is pointed at a doll, the illuminated stars fall across the doll's face, causing the doll to begin to giggle in delight.

Finally, in support of the aforementioned electronic components, the array projection system includes a power source. The power source may be internal to the system, such as a penlight battery or rechargeable pack. Alternatively, the power source may be external, where a power cord connects the projection system to an external power supply.

BRIEF DESCRIPTION OF THE DRAWINGS

The drawings illustrate the best mode presently contemplated of carrying out the invention. In the drawings:

FIG. 32A is a side view of the third embodiment with no object in view;

FIG. 32B is a front view of the third embodiment's light sensor view, indicating that no object is in view;

FIG. 33A is a side view of the third embodiment with an object in view;

FIG. 33B is a front view of the third embodiment's light sensor view, indicating that an object is in view;

FIG. 41A is a top view of the fourth embodiment's clustered light array;

FIG. 41B is a close-up view of the fourth embodiment's clustered light array;

FIG. 42A is a top view of the fourth embodiment's clustered primary light guide;

FIG. 42B is a close-up view of the fourth embodiment's clustered primary light guide;

DETAILED DESCRIPTION OF THE INVENTION

A Light Array Projection and Sensing System

Figure 1:
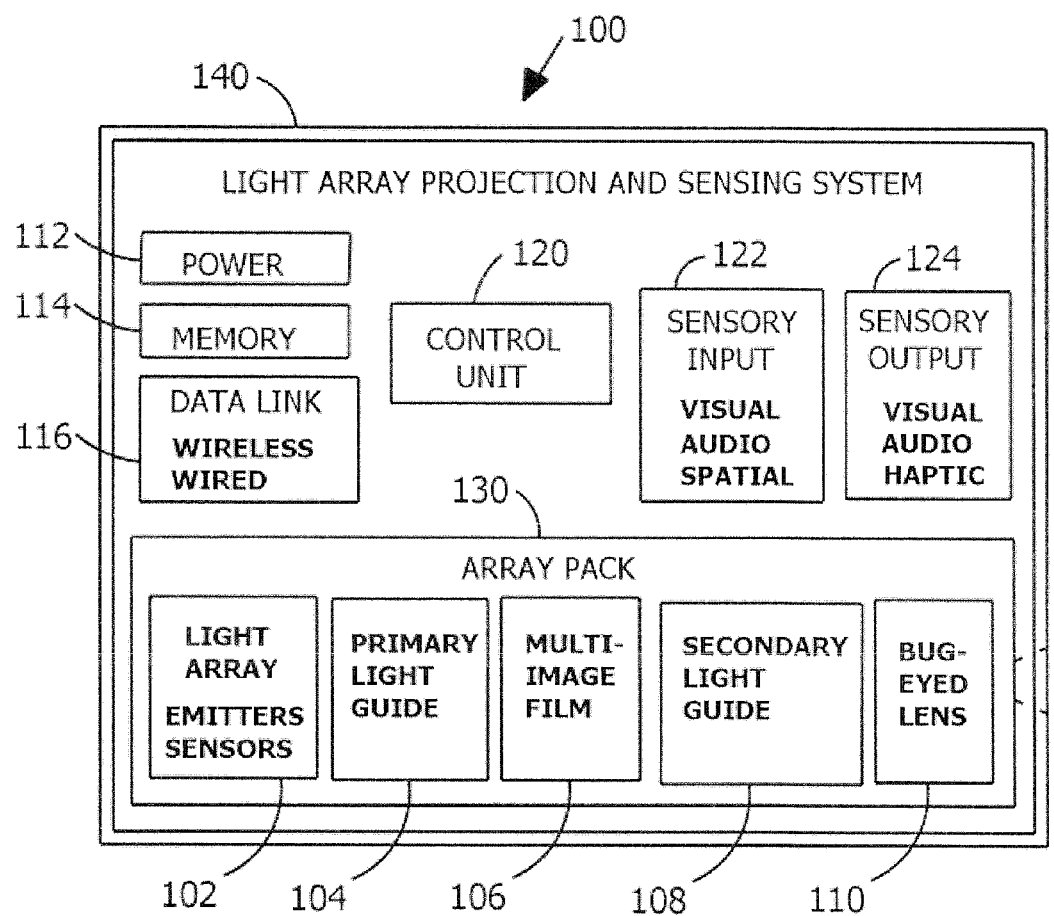
FIG. 1 is a block diagram of the array projection system showing the principal components.

Referring first to FIG. 1, thereshown is a block diagram of the major components of a projection system 100 defined in accordance with the present invention. As the diagram indicates, the projection system 100 is surrounded and protected by an outer housing 140. The outer housing 140 may be made of materials such as plastic, wood, metal, rubber, and even cloth. The outer housing 140 may be flexible or rigid. Further, in some embodiments, the outer housing 140 is composed of materials that are translucent or transparent, allowing both visible and invisible light to be transmitted.

Within the outer housing 140, the projection system 100 includes a control unit 120. The control unit 120 is in operative association with electronic components contained in the projection system 100. The control unit 120 may be a microprocessor, microcontroller, digital timer, analog sequencer, or any other control apparatus capable of switching electronic circuitry on and off.

Along with the control unit 120, the projection system 100 includes an array pack 130. The array pack 130 facilitates the projection of an animated, light image from the system 100. In addition, the array pack 130 may facilitate the sensing of light images on the projection surface or region forward of the system 100. The array pack 130 is constructed as a sandwich-like structure in the shape of a round disk, strip, or polygon—or may be three-dimensional, like a hollow dome or sphere. Further, the array pack 130 can be of an indefinite size, ranging from a few millimeters along its sides to more than ten meters across. The array pack 130 is comprised of a collection of sub-components defined as follows: a light array 102, primary light guide 104, multi-image film 106, secondary light guide 108, and bug-eyed lens 110.

At the base of the array pack 130 is a light array 102. The light array 102 is a collection of closely packed light sources that produce distinct beams of modulated white visible light. The electronically activated light sources are in operative association with the control unit 120. Further, each light source may have its brightness adjusted by the control unit 120 using pulse-width modulation, or other amplitude modifying techniques. The light sources are mounted on a supportive substrate, such as through-hole LEDs soldered onto a printed-circuit board, although other kinds of construction should be considered. For example, the light array 102 can be composed of surface mount LEDs on a flexible membrane circuit, or glow bulbs attached to conductive cloth. The light sources may be multi-chip LEDs, laser diodes, neon lamps, incandescent bulbs, fluorescent tubes, or EL membrane elements. Further, various emitted light wavelengths should be considered. The light sources may emit colored light (red, yellow, etc.) for special effects, or even invisible light (infrared, ultraviolet, etc.) providing hidden graphic information to a remote apparatus or the projection system 100 itself—due to its light sensing potential.

The light sensors can be mounted in the light array 102, in combination with light sources, or in whole—making a light sensing array. The light sensors are in operative association with the control unit 120, enabling the detection and/or discernment of light intensity surrounding the system 100. Examples of light sensors include photodiodes, cadmium sulfide cells, photo multipliers, and CMOS/CCD image sensors. Notwithstanding, these are just a few construction approaches for the light array 102 as other types of substrates, light sources, light sensors, and light wavelengths are clearly contemplated as being within the scope of the present invention.

Integrated with the light array 102, the array pack 130 includes a primary light guide 104. The primary light guide 104 controls and guides the light forward from the light array 102. The primary light guide 104 is constructed as a perforated panel having a collection of closely-packed walled openings, each guiding the light output of a corresponding light source of the light array 102. The individual walled openings may have any shape, such as circular, polygonal, or a combination of shapes to define the cross-section of the outwardly projected light beams. Further, the primary light guide 104 would typically be made of a light-opaque material to avoid leakage of light from each of the multitude of light guide openings. Preferably, the primary light guide 104 is a single molded part of low cost and low weight, such as injection molded polystyrene with carbon black filler—or thermoformed, black polyethylene sheet with die-cut openings. Various coatings may be applied to the light guide as well. For example, the primary light guide 104 may be coated with reflective metal to improve its light guiding efficiency.

Forward of the primary light guide 104, the array pack 130 includes a multi-image film 106. The multi-image film 106 is similar to a translucent projection slide. That is, the translucent multi-image film 106 essentially filters light from the light guide 106 such that when the transmitted light falls on an ambient surface, an illuminated color image, shape, or pattern results. The multi-image film 106 creates a light image of photographic resolution. However, unlike a traditional projection slide, the multi-image film 106 contains a multitude of closely packed images, where each distinct image is positioned forward of a corresponding light source or light sensor of light array 102. The graphic subject matter for the distinct images may be a character, vehicle, landscape, shape, pattern, or any other imaginable kind of graphic image. The multi-image film 106 is preferably made of a thin, transparent polymer sheet and lithographically printed or photographically processed with colored, translucent dyes and opaque inks, although other types of materials and structures should be considered. For example, the multi-image film 106 material could be a light polarizing sheet, holographic optical element, or diffraction grating such that the transmitted light contains special properties. Various mounting techniques exist for the film 106. In some embodiments, the multi-image film 106 is permanently fixed within the projection system 100. However, in other embodiments, the multi-image film 106 is a removable, rotating film diskette, such that the subject matter of the projection system 100 image may be readily modified by manually rotating or replacing the diskette.

Forward of the multi-image film 106, the array pack 130 includes a secondary light guide 108. The secondary light guide 108 further guides the light forward as it exits from the multi-image film 106. The secondary light guide 108 contains a collection of closely packed walled openings, similar to the primary light guide 104. The secondary light guide 108 should be assumed an optional feature of the system 100 and not required for all possible embodiments.

Finally, forward of the secondary light guide 108, the array pack 130 includes a bug-eyed lens 110. The bug-eyed lens 110 is an array of closely packed optical elements, focusing the light beams onto the projection surface. Preferably, the bug-eyed lens 110 is a single injection molded part containing a collection of light-refracting convex lens, although other types and combinations of optical elements and structures are clearly contemplated. For example, the bug-eyed lens 110 may include concave lens, fresnel lens, ball lens, diffractive optical elements, or simply a non-refracting window. The lens structure may contain compound lens to reduce spherical and chromatic aberration. Further, aspheric lens may facilitate projection at a low incidence angle relative to the projection surface, creating an undistorted image. Materials for the bug-eyed lens 110 include light transmissive polymer such as acrylic, polystyrene, vinyl, PET—or even glass if protection from breakage is provided. Various techniques for mounting and focusing the lens exist. In one embodiment the bug-eyed lens 110 has a fixed focal length relative to the multi-image film 106, and quite adequately focuses a projected image on a household wall. In another embodiment the bug-eyed lens 110 has an adjustable focal length, enabling a clear, projected image over greater distance.

Along with an array pack 130, the projection system 100 includes a data link 116. The data link 116 enables the system 100 to communicate with a remote apparatus or a second projection system. Preferably, the data link 116 is wireless, relying on modulated light for data messaging. For example, in one embodiment, there are both light emitters and light sensors contained within the light array 102. The light emitters and light sensors are in operative association with the control unit 120. The control unit 120 of the system 100 facilitates remote, two-way data communication using encoded modulated light. Although encoded light is one means of communication, clearly other types of data messaging are contemplated as being within the scope of the present invention. For example, the data link 116 may be a wireless RF data transceiver—or a wired data connection, such as a USB cable linkage between the system 100 and remote apparatus.

Along with the data link 116, the system 100 includes a memory unit 114. The memory unit 114 is in operative association with control unit 120 as a supportive resource. The memory unit 114 may be flash, dynamic RAM, ROM, hard drive, or other types of memory storage typically found in digital electronic devices. Memory unit 114 may be fixed within the device or a removable cartridge.

In addition to memory unit 114, the system 100 includes a sensory input module 122. The sensory input module 122 is also in operative association with the control unit 120, providing interactive, contextual information to the projection system 100. For example, the sensory input module 122 may contain a spatial sensor, such as an accelerometer. Based upon the sensed movement signals from the spatial sensor, the control unit 120 can modify the projected image of the projection system 100. Other kinds of sensory input elements may include a gyroscope, electronic compass, GPS device, microphone, or a CCD or CMOS image sensor.

Complimenting the sensory input module 122, the projection system 100 includes a sensory output module 124. The sensory output module 124 is in operative association with the control unit 120, providing additional sensory effects and utility to the system 100. The sensory output module 124 may include an LCD display for visual menu information, an audio synthesizer and loudspeaker for sound playback, or a haptic feedback element for providing tactile sensation. All of these created sensations may be synchronized with the projection system's 100 generated light output.

Finally, along with the sensory output module 124, the projection system 100 includes a power source 112. The power source 112 provides energy to the control unit 120, memory unit 114, data link 116, light array 102, sensory input module 122, and sensory output module 124. The power source 112 may be internal to the system, such as a penlight battery or rechargeable pack. Or the power source 112 may be external, where a power cord connects the system 100 to an external power supply.

First Embodiment—Overlaid Image Projection Device with Array Disk Pack

Figure 2:
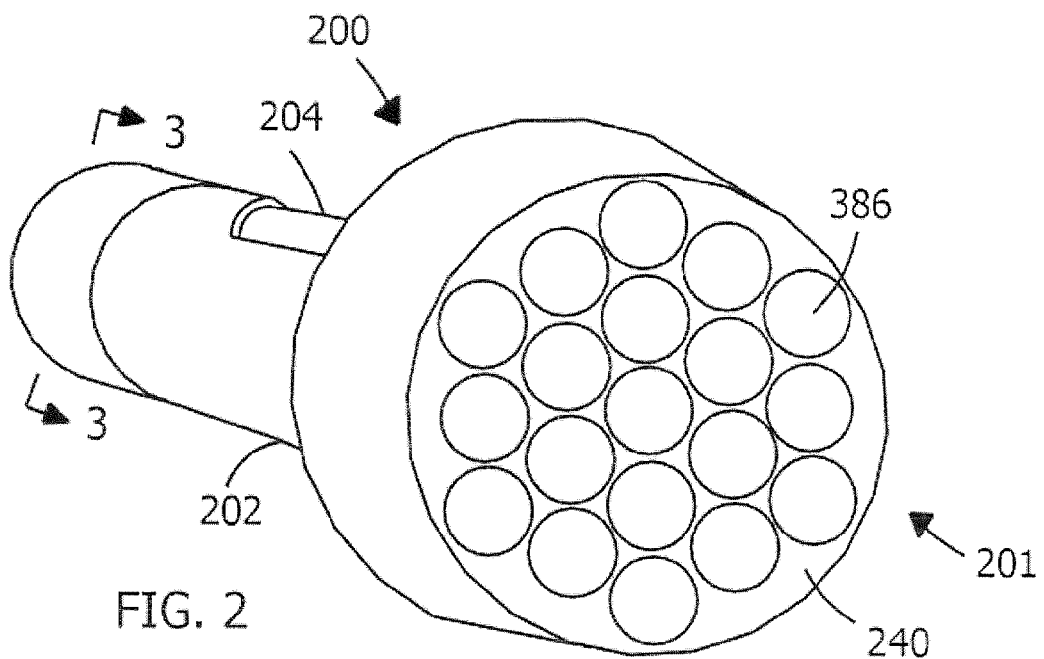
FIG. 2 is a perspective view of the first embodiment of a light projection device, containing an array disk pack.
Figure 3:
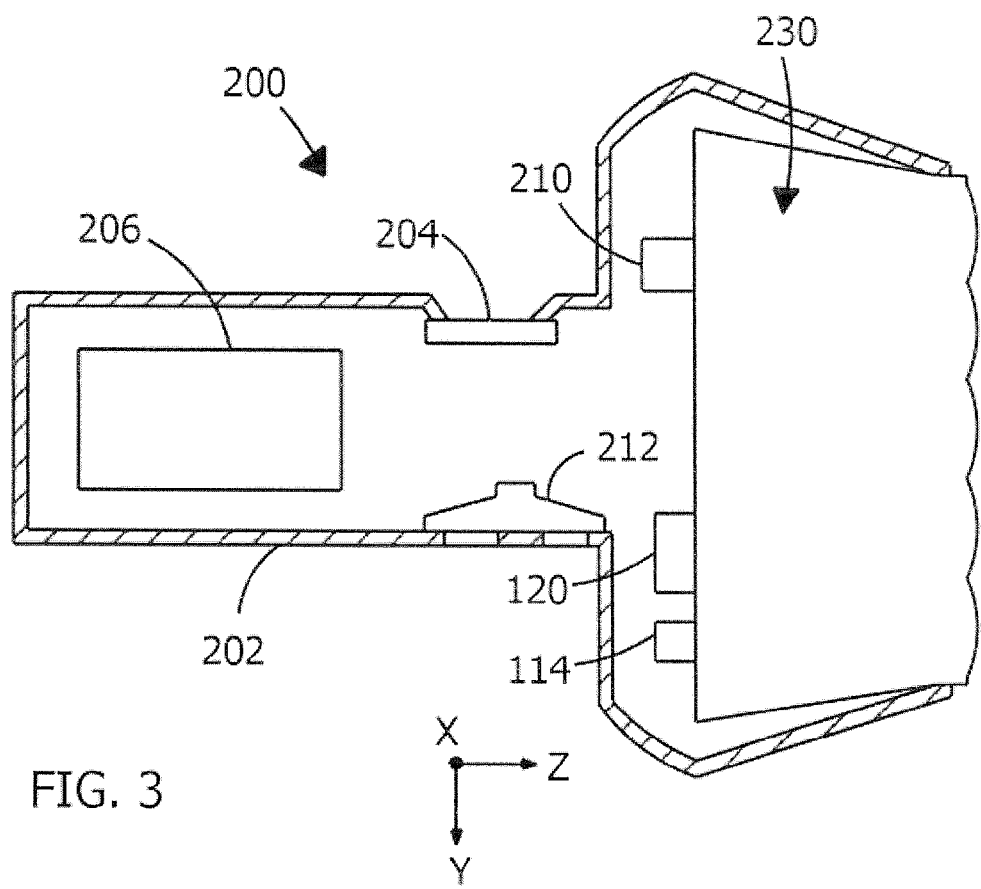
FIG. 3 is an interior view of the first embodiment of the light projection device, containing an array disk pack.

Turning now to FIGS. 2 and 3, thereshown is a first embodiment of a light projection device 200 constructed in accordance with the present invention. The light projection device 200 is designed to be of a size that can be held in the hand of a user. In the embodiment shown in FIGS. 2 and 3, the light projection device 200 has the general configuration and shape of a flashlight that includes a handle 202 sized to receive batteries 206. The batteries 206 are coupled to a touch pad 204. At the projection face 201, the light projection device 200 includes a bug-eyed lens disk 240 containing a plurality of convex lens 386. Turning specifically to FIG. 3, the light projection device 200 includes an array disk pack 230, which generates the projected light image. Mounted behind the array disk pack 230 is an accelerometer 210, which provides an electronic signal upon movement of the handle 202. Further, the light projection device 200 includes a sound generator 212 that produces auditory feedback to the user. Nearby, a memory unit 114 provides data storage. Finally, a control unit 120 is in operative association with the array disk pack 230, memory unit 114, accelerometer 210, sound generator 212, touch pad 204, and batteries 206.

Figure 4:
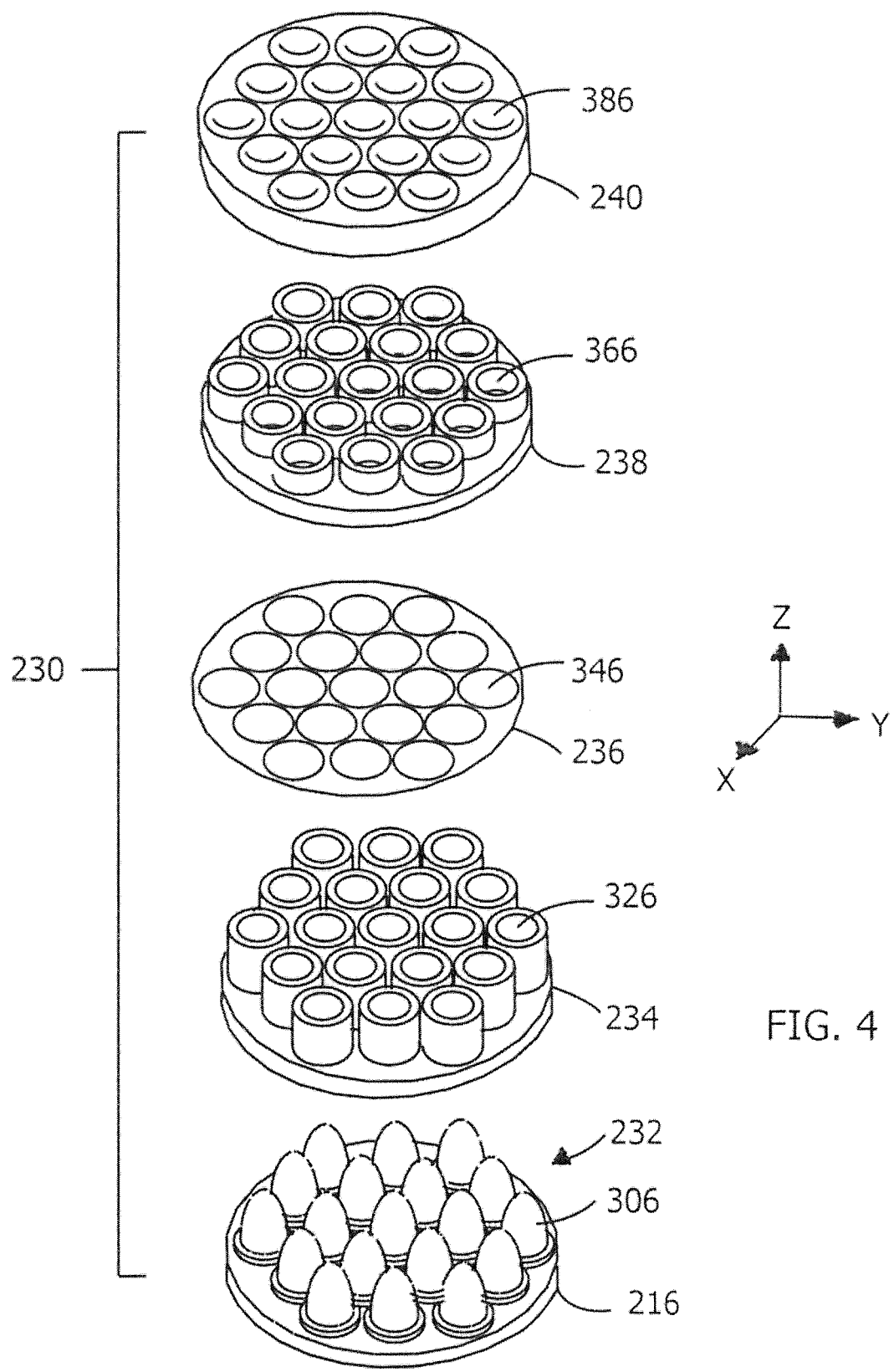
FIG. 4 is an exploded view of the first embodiment's array disk pack.

Turning now to FIG. 4, an exploded view of the array disk pack 230 can be seen. The array disk pack 230 is comprised of an assembly of five components: a light array disk 232, primary light guide disk 234, multi-image film disk 236, secondary light guide disk 238, and bug-eyed lens disk 240.

To begin with, thereshown at the bottom of FIG. 4 is the light array disk 232 containing a plurality of white LEDs 306. Preferably, each white LED 306 is 10 mm in diameter, having an emission angle of 10 degrees, and produces brilliant white light of at least 100,000 millicandela brightness. The white LEDs 306 are thru-hole mounted and soldered onto a printed circuit board 216.

Above the light array disk 232 can be seen the primary light guide disk 234. The primary light guide disk 234 is an injection-molded polystyrene part containing inert filler so that the part is light-opaque. As shown, there is a plurality of primary walled openings 326 molded into the primary light guide disk 234. During assembly, the primary light guide disk 234 fits snuggly over the light guide 102, where each primary walled opening 326 slides over each white LED 306, forming a light seal against the white LEDs 306 and printed circuit board 216, forbidding leakage of light along the sides and bottom. The primary light guide disk 234 is fixed onto the light array disk 232 using various fastening techniques, such as glue, pins, screws, or a friction fit.

Above the primary light guide disk 234 is the multi-image film disk 236. As shown, the multi-image film disk 236 contains a plurality of distinct film images 346 on the surface of a transparent plastic acetate sheet. The translucent images 346 may be printed or photo-processed with opaque and translucent color dyes or inks, such that filtered light passes through the multi-image film disk 236. During assembly, the multi-image film disk 236 is placed atop the primary light guide disk 234 and may be fixed with glue, pins, screws, or a friction fit.

Above the multi-image film disk 236 is the secondary light guide disk 238. The secondary light guide disk 238 is made in a similar manner and material as the primary light guide disk 234. Also, the secondary light guide disk 238 contains a plurality of secondary walled openings 366, which further control the light that exits from the multi-image film disk 236. During assembly, the secondary light guide disk 238 is fastened to the primary light guide disk 234, trapping the multi-image film disk 236 between the parts. The secondary light guide disk 238 is fixed with glue, pins, screws, or a friction fit.

Finally, above the secondary light guide disk 238 is the bug-eyed lens disk 240. The bug-eyed lens disk 240 is an injection-molded part of optically clear acrylic polymer and contains a plurality of convex lens 386 molded into its surface. Each convex lens 386 is double-convex and 14 mm in diameter, with a focal length of about 20 mm. During assembly, the bug-eyed lens disk 240 is fastened to the secondary light guide disk 238 using glue, pins, screws, or a friction fit.

Keep in mind that orientation and positioning is critical for all five components of the array disk pack 230. Whereby, it is preferred that all five components of the array disk pack 230 fit together as keyed interlocking pieces. That is, there is only one way the components can be assembled to avoid any assembly errors. Finally, an assembly technique has been presented herein for the array disk pack 230, although other types of construction are clearly contemplated as being within the scope of the present invention. For example, rather than mounting the bug-eyed lens disk 240 directly onto the secondary light guide disk 238, the bug-eyed lens disk 240 could be mounted onto the housing (not shown) of the projection device, forward of the secondary light guide disk 238.

First Embodiment—Introduction to Overlaid Image Projection

The first embodiment uses an overlaid image projection to animate a picture. Overlaid image projection is defined as two or more projected image frames that essentially overlap each other on the projection surface, the result being that when a series of images are overlaid and sequentially illuminated, a motion-picture effect occurs.

Figure 5:
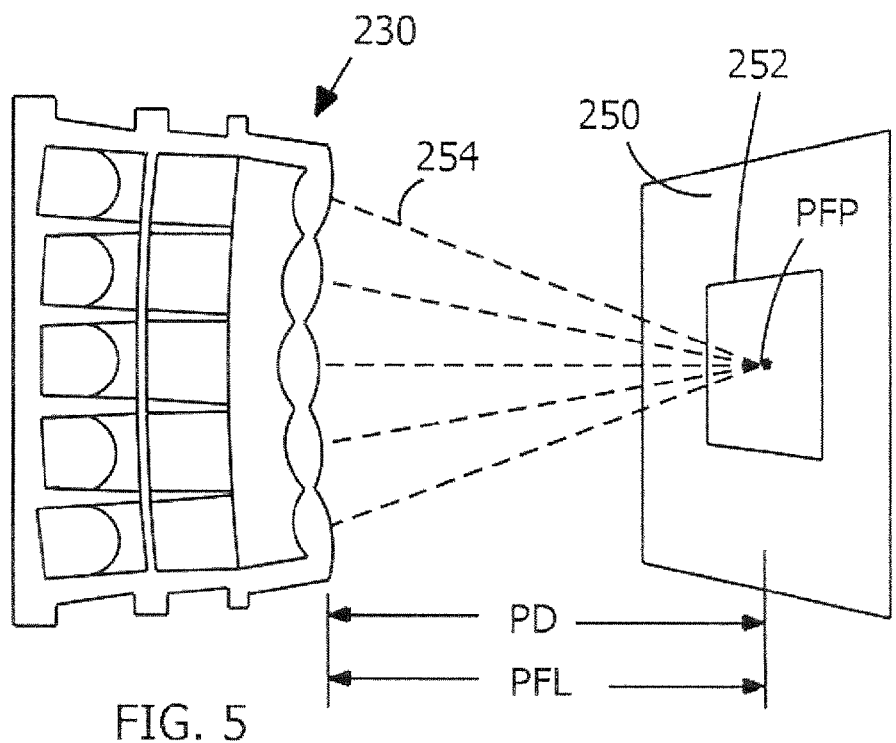
FIG. 5 is a diagram of the first embodiment's array disk pack producing an overlaid image.
Figure 6:
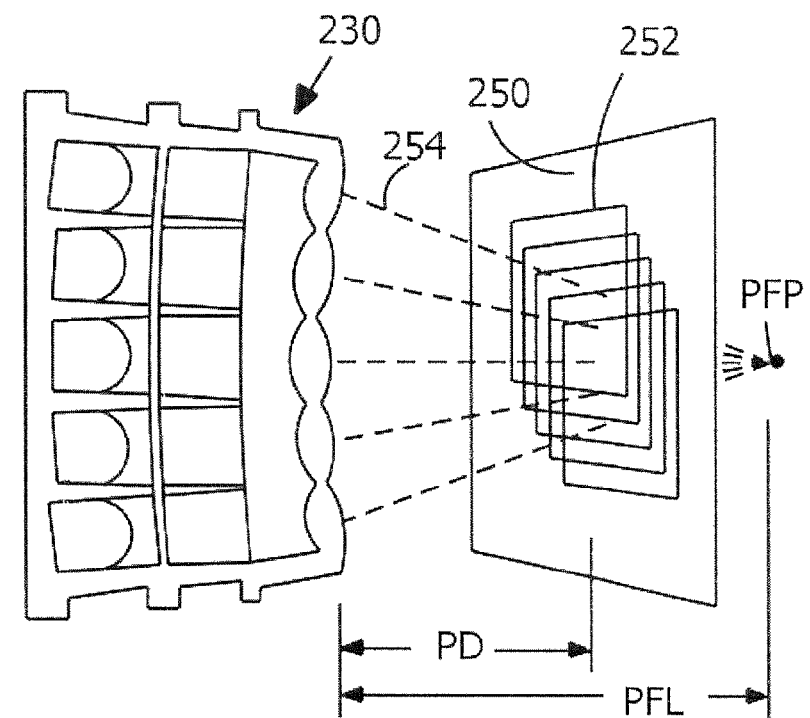
FIG. 6 is a diagram of the first embodiment's array disk pack producing a splayed, overlaid image.

Referring to FIGS. 5 and 6, thereshown are section views of the current embodiment's array disk pack 230 along with a projection surface 250. As can be seen in FIGS. 5 and 6, the array disk pack 230 produces multiple, converging light beams 254 that appear on the projection surface 250 and result in an overlaid, illuminated image 252. That is, all of the light beams 254 converge to the same projection focal point PFP. The projection focal length PFL is the distance between the array disk pack 230 and the projection focal point PFP. The projection distance PD is the arbitrary distance between the array disk pack 230 and the projection surface 250. Note that in FIG. 5, the projection distance PD equals the projection focal length PFL, where PD=PFL.

However, in FIG. 6 the array disk pack 230 has been positioned closer to the projection surface 250, such that the projection distance PD is less than the projection focal length PFL, where PD<PFL. Whereby, the overlaid, illuminated image 252 becomes splayed or spread apart on the projection surface 250. Further, a similar image splaying effect occurs when the array disk pack 230 is moved away from the projection surface 250, when PD>PFL (not shown). This is an inherent property of array projection having multiple converging light beams 254 used to illuminate the projection surface 250. To minimize the splaying effect, the projection focal length PFL needs to be optimized according to the current embodiment's design objectives.

First Embodiment—Design with Converging Light Beams

Figure 7:
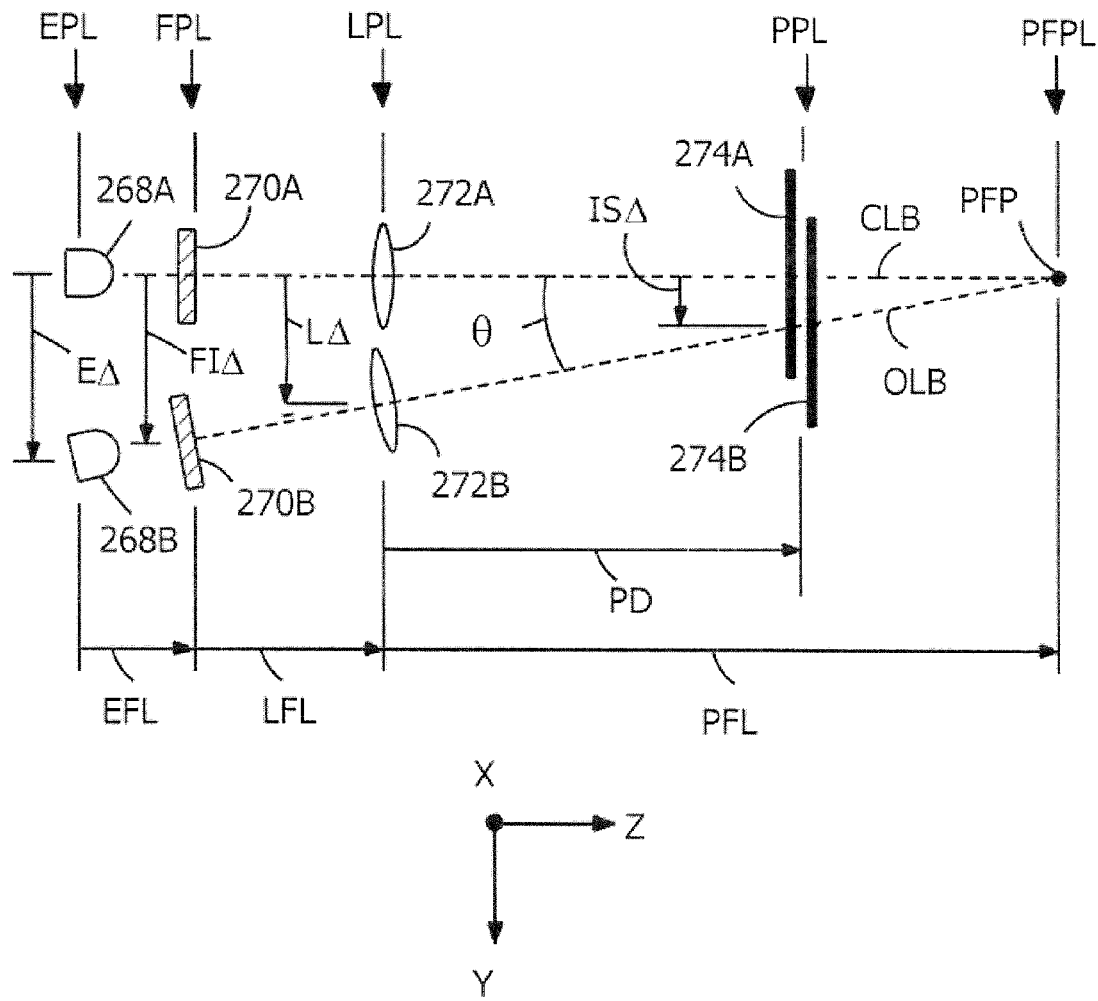
FIG. 7 is a geometrical diagram of the first embodiment's array pack having two converging light beams that create an overlaid image.

Turning now to FIG. 7, thereshown is a simplified, geometrical layout of array projection that uses two converging light beams to create an overlaid image. The intended use of the layout is to provide mathematical and design information for positioning the array disk pack components. As can be seen, the layout is comprised of a first light emitter 268A and a second light emitter 268B that exist on light emitter plane EPL. The first light emitter 268A and the second light emitter 268B are separated by spatial distance of a light emitter delta EΔ. Further, the layout is also comprised of a first film image 270A and a second film image 270B that exist on film plane FPL. The first film image 270A and the second film image 270B are separated by spatial distance of film image delta FIΔ. Next, the layout includes a first lens 272A and second lens 272B that exist on lens plane LPL. The first lens 272A and the second lens 272B are separated by spatial distance of lens delta LΔ. Finally, the layout includes a first projected image 274A and second projected image 274B that exist on a projection plane PPL. The first projected image 274A and the second projected image 274B are separated by spatial distance of image splay delta ISΔ.

As can be seen in FIG. 7, there are two light beams defined in the layout: 1) a central light beam CLB that contains the first light emitter 268A, first film image 270A, and first lens 272A and passes through a projection focal point PFP; and 2) an oblique light beam OLB that contains the second light emitter 268B, second film image 270B, and second lens 272B and also passes through the projection focal point PFP. Further, the central light beam CLB passes through the center of the array disk pack (not shown) on the x-y plane and is parallel to the z-axis. The oblique light beam OLB is off-center of the array disk pack (not shown) on the x-y plane and is non-parallel to the z-axis. Whereby, the central light beam CLB and the oblique light beam OLB converge towards each other, forming a converge angle θ.

Forward of the optical elements along the light beam paths is the projection plane PPL, which represents the projection surface. As shown, both light beams intersect the projection plane PPL and are separated by a spatial distance referred to as an image splay delta ISΔ. The image splay delta ISΔ is the amount of splaying or separation that two projected images 274A, 274B will have on the projection surface when using the two-beam layout of FIG. 7.

Measuring along the z-axis, the emitter focal length EFL is the distance between the light emitter plane EPL and the film plane FPL. The lens focal length LFL is the distance between the film plane FPL and the lens plane LPL. The projection distance PD is the distance between the lens plane LPL and the projection plane PPL, which varies according to how close or far the projection device is from the projection surface. Finally, the projection focal length PFL is the distance between the lens plane LPL and the projection focal point PFP, the point at which both light beams CLB and OLB converge and intersect.

Using the geometric layout in FIG. 7 as a reference, the following math formulas are provided to assist in the embodiment's design process, although other mathematical approaches are clearly contemplated as being within the scope of the current embodiment.

The formulas below define the converge angle θ of the oblique light beam OLB relative to the central light beam CLB, given a specific light emitter delta EΔ, film image delta FIΔ, or lens delta LΔ:

$$\theta = \text{Arctan}\left(\frac{E\Delta}{EFL + LFL + PFL}\right)$$

$$\theta = \text{Arctan}\left(\frac{FI\Delta}{LFL + PFL}\right)$$

$$\theta = \text{Arctan}\left(\frac{L\Delta}{PFL}\right)$$

The formulas below define the light emitter delta EΔ, film image delta FIΔ, or lens delta LΔ relative to a specific converge angle θ and projection focal length PFL:

$$E\Delta = \tan(\theta) \cdot (EFL + LFL + PFL)$$

$$FI\Delta = \tan(\theta) \cdot (LFL + PFL)$$

$$L\Delta = \tan(\theta) \cdot (PFL)$$

The formula below defines the image splay delta ISΔ that occurs at a specific projection distance PD, given a converge angle θ and a projection focal length PFL:

$$IS\Delta = \tan(\theta) \cdot (PFL - PD)$$

The critical formula below defines a light array system having converging beams of light:

$$E\Delta \geq FI\Delta > L\Delta$$

The most remarkable relationship of the above formula is the fact that FIΔ>LΔ, as this relationship (when implemented in the real world) is primarily responsible for creating converging light beams.

When designing the device using the math formulas, a table or spreadsheet is created and the various parameters are modified to see how the overall design is affected. A good design approach for the array disk pack is to take the following steps:

1) Define the embodiment's desired projection range PR, such as 0.30 (1 ft.) to 3.65 meters (12 ft.).

2) Define an arbitrary set of projection distances PD every 0.30 meters or so across the entire projection range, such as 0.30, 0.61, 0.91 meter, etc. Typically about four to six values are adequate.

3) Define an arbitrary set of projection focal lengths PFL every 0.30 meters or so, starting with the minimum projection range. For example, 0.30, 0.61, 0.91 meter, etc. Typically about three to six values are adequate.

4) Define all of the design constants for the embodiment, such as the emitter focal length EFL, lens focal length LFL, etc.

5) Using the math formulas, compute a set of converge angles θ using the projection focal lengths PFL (from step 3) and constants (from step 4).

6) Using the math formulas, compute a set of image splay deltas ISΔ using the projection focal lengths PFL (from step 3) and projection distances PD (from step 2).

7) Analyze all of recorded parameters and computed values. Select the optimum projection focal length PFL that produces the smallest image splay deltas ISΔ across the entire projection range PR.

So to begin designing the current first embodiment, the desired projection range PR is defined,
PR=0.30 to 3.65 meters (or 1 to 12 feet)
Next, a few projection distances PD are arbitrarily defined across the projection range PR as,
PD=0.30, 0.61, 0.91, and 3.65 meters (or 1, 2, 3, and 12 feet)

An arbitrary set of projection focal lengths PFL also needs to be defined. As discussed earlier, the projection focal length PFL largely determines the magnitude of the image splaying effect. Keep in mind, the appearance of the image splaying effect is very dependent on the psychology of human visual perception and not readily determined through quantitative analysis alone. For example, the image splaying effect is more noticeable when viewing a small image at a short distance than a large image at a large distance. Whereby, a suggested estimate for the optimum projection focal length PFL is, $$PR\_min < PFL < \frac{PR\_max - PR\_min}{3}$$

where
PR_min is the minimum projection range.
PR_max is the maximum projection range.

So for the current embodiment, the estimated projection focal length PFL is,
0.30<PFL<1.11 (meters)
With the estimate in mind, a few projection focal lengths PFL are arbitrarily defined as,
PFL=0.30, 0.46, 0.61, 0.91 (meters)

Next, the design constants for the current embodiment are defined, as indicated below. Note that the light emitter deltas EΔ are among the included constants, since the current embodiment will have a regular, fixed array spacing between its individual light emitters. In designing other embodiments, perhaps the lens deltas LΔ are assumed as constants. Either approach will work equally well, as well as other pre-defined constants. The goal is to define enough constants that allow the computation of the converge angle θ.
EΔ=15, 26, 30 mm (based on fixed array spacing between the emitters)
EFL=12 mm (provides an adequate gap between emitters and film)
LFL=20 mm (based on lens convexity and focal length)

Finally, using the math formulas discussed earlier, compute the various converge angles θ for the current embodiment. Then compute the various image splay deltas ISΔ using the sets of constants and arbitrary parameters. A simple computer program to automate the generation of the data set is quite helpful. Record all of the computed values in a table for analysis. For the current embodiment, the generated data is as follows:

TABLE 1

Computed Data for Overlaid Image Projection

| Projection Distance PD (m) | Projection Focal Length PFL (m) | Converge Angle θ (deg) | Light Emitter Delta EΔ (mm) | Film Image FIΔ (mm) | Lens Delta LΔ (mm) | Image Splay Delta ISΔ (mm) |
|---|---|---|---|---|---|---|
| 0.3 | 0.3 | 2.59 | 15 | 14.46 | 13.55 | 0 |
| 0.3 | 0.46 | 1.75 | 15 | 14.63 | 14.02 | 4.88 |
| 0.3 | 0.61 | 1.34 | 15 | 14.72 | 14.25 | 7.24 |
| 0.3 | 0.91 | 0.91 | 15 | 14.81 | 14.49 | 9.71 |
| 0.61 | 0.3 | 2.59 | 15 | 14.46 | 13.55 | −14.01 |
| 0.61 | 0.46 | 1.75 | 15 | 14.63 | 14.02 | −4.57 |
| 0.61 | 0.61 | 1.34 | 15 | 14.72 | 14.25 | 0 |
| 0.61 | 0.91 | 0.91 | 15 | 14.81 | 14.49 | 4.78 |
| 0.91 | 0.3 | 2.59 | 15 | 14.46 | 13.55 | −27.56 |
| 0.91 | 0.46 | 1.75 | 15 | 14.63 | 14.02 | −13.72 |
| 0.91 | 0.61 | 1.34 | 15 | 14.72 | 14.25 | −7.01 |
| 0.91 | 0.91 | 0.91 | 15 | 14.81 | 14.49 | 0 |
| 3.65 | 0.3 | 2.59 | 15 | 14.46 | 13.55 | −151.36 |
| 3.65 | 0.46 | 1.75 | 15 | 14.63 | 14.02 | −97.26 |
| 3.65 | 0.61 | 1.34 | 15 | 14.72 | 14.25 | −71.03 |
| 3.65 | 0.91 | 0.91 | 15 | 14.81 | 14.49 | −43.63 |
| 0.3 | 0.3 | 4.48 | 26 | 25.06 | 23.49 | 0 |
| 0.3 | 0.46 | 3.03 | 26 | 25.37 | 24.31 | 8.46 |
| 0.3 | 0.61 | 2.32 | 26 | 25.51 | 24.7 | 12.55 |
| 0.3 | 0.91 | 1.58 | 26 | 25.67 | 25.12 | 16.84 |
| 0.61 | 0.3 | 4.48 | 26 | 25.06 | 23.49 | −24.28 |
| 0.61 | 0.46 | 3.03 | 26 | 25.37 | 24.31 | −7.93 |
| 0.61 | 0.61 | 2.32 | 26 | 25.51 | 24.7 | 0 |
| 0.61 | 0.91 | 1.58 | 26 | 25.67 | 25.12 | 8.28 |
| 0.91 | 0.3 | 4.48 | 26 | 25.06 | 23.49 | −47.77 |
| 0.91 | 0.46 | 3.03 | 26 | 25.37 | 24.31 | −23.78 |
| 0.91 | 0.61 | 2.32 | 26 | 25.51 | 24.7 | −12.15 |
| 0.91 | 0.91 | 1.58 | 26 | 25.67 | 25.12 | 0 |
| 3.65 | 0.3 | 4.48 | 26 | 25.06 | 23.49 | −262.35 |
| 3.65 | 0.46 | 3.03 | 26 | 25.37 | 24.31 | −168.58 |
| 3.65 | 0.61 | 2.32 | 26 | 25.51 | 24.7 | −123.12 |
| 3.65 | 0.91 | 1.58 | 26 | 25.67 | 25.12 | −75.63 |
| 0.3 | 0.3 | 5.16 | 30 | 28.92 | 27.11 | 0 |
| 0.3 | 0.46 | 3.49 | 30 | 29.27 | 28.05 | 9.76 |
| 0.3 | 0.61 | 2.68 | 30 | 29.44 | 28.5 | 14.49 |
| 0.3 | 0.91 | 1.82 | 30 | 29.62 | 28.98 | 19.43 |
| 0.61 | 0.3 | 5.16 | 30 | 28.92 | 27.11 | −28.01 |
| 0.61 | 0.46 | 3.49 | 30 | 29.27 | 28.05 | −9.15 |
| 0.61 | 0.61 | 2.68 | 30 | 29.44 | 28.5 | 0 |
| 0.61 | 0.91 | 1.82 | 30 | 29.62 | 28.98 | 9.55 |
| 0.91 | 0.3 | 5.16 | 30 | 28.92 | 27.11 | −55.12 |
| 0.91 | 0.46 | 3.49 | 30 | 29.27 | 28.05 | −27.44 |
| 0.91 | 0.61 | 2.68 | 30 | 29.44 | 28.5 | −14.02 |
| 0.91 | 0.91 | 1.82 | 30 | 29.62 | 28.98 | 0 |
| 3.65 | 0.3 | 5.16 | 30 | 28.92 | 27.11 | −302.71 |
| 3.65 | 0.46 | 3.49 | 30 | 29.27 | 28.05 | −194.51 |
| 3.65 | 0.61 | 2.68 | 30 | 29.44 | 28.5 | −142.06 |
| 3.65 | 0.91 | 1.82 | 30 | 29.62 | 28.98 | −87.26 |

Understandably, the characteristics of emitters, film, lens, and projection surfaces vary in real world practice. Whereby, it's best to confirm the mathematically derived solution by creating a test apparatus. For example, in designing the current embodiment, a test apparatus was constructed using the embodiment's optical components. The following empirical test data was then collected and recorded:

TABLE 2

Test Data for Overlaid Image Projection

| Projection Focal Length PFL (m) | EΔ and FIΔ (mm) | LΔ (mm) | ISΔ at 0.30 m PD (mm) | ISΔ at 0.61 m PD (mm) | ISΔ at 0.91 m PD (mm) | Image Frame Width (mm) |
|---|---|---|---|---|---|---|
| 0.46 | 15.0 | 14.2 | 6.3 | — | — | 203 |
| 0.61 | 15.0 | 14.2 | 6.3 | 0.0 | −6.3 | 279 |
| 0.91 | 15.0 | 14.2 | 7.9 | 4.8 | 0.0 | 406 |
| 0.46 | 30.0 | 28.3 | 9.5 | — | −31.8 | 203 |
| 0.61 | 30.0 | 28.4 | 14.3 | 0.0 | −12.7 | 279 |
| 0.91 | 30.0 | 28.9 | 19.1 | 6.4 | 0.0 | 406 |
| 0.46 | 45.0 | 42.0 | 12.7 | — | −50.8 | 203 |
| 0.61 | 45.0 | 42.7 | 23.9 | 0.0 | −17.5 | 279 |
| 0.91 | 45.0 | — | — | — | 0.0 | 406 |

Finally, the optimum projection focal length PFL can be selected. In reviewing the computed and empirical test data above, the optimum projection focal length PFL with the least image splay delta ISΔ is selected.
Projection focal length PFL=0.61 meters (or 2.0 ft).

First Embodiment—Dimensions for Overlaid Image Projection

The dimensions of the array disk pack can now be defined, relying on many of the previously discussed math formulas, figures, and data tables. So thereshown in FIGS. 8-12 are orthogonal top views of the light array disk 232, primary light guide disk 234, multi-image film disk 236, secondary light guide disk 238, and the bug-eyed lens disk 240.

Figure 8:
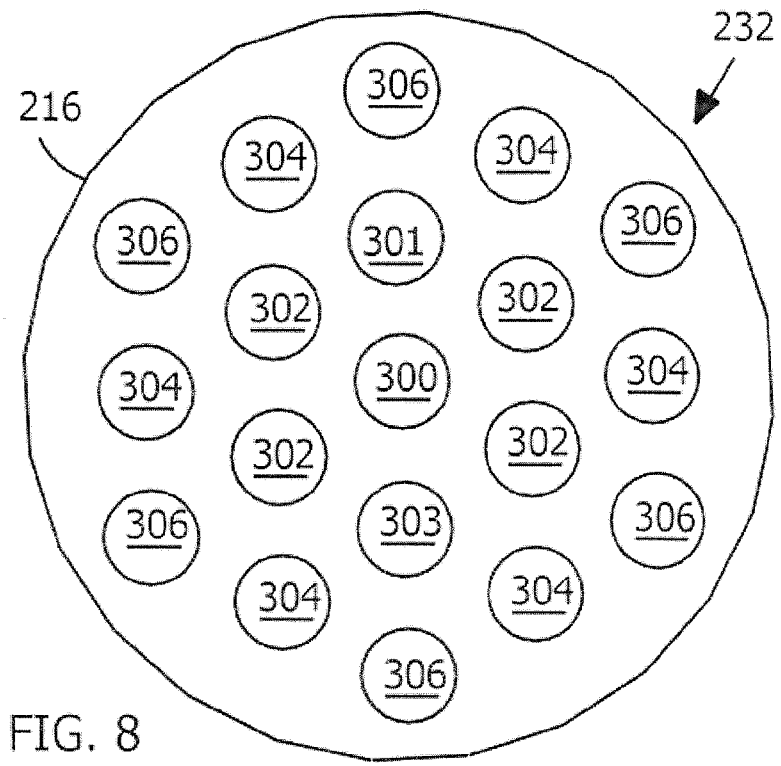
FIG. 8 is a top view of the first embodiment's light array disk.

Turning first to FIG. 8, a top view can be seen of the light array disk 232 with nineteen LEDs mounted on the printed circuit board 216. Thereshown is a center LED 300 surrounded by six inner LEDs 301, 302, and 303, six middle LEDs 304, and finally, six outer LEDs 306. Preferably, the LEDs are equal distance from each other and closely packed on a hexagonal lattice similar to a bee's honeycomb. This is no arbitrary design decision, as it is well known in mathematics that the densest circle packing on a plane is a hexagonal lattice, proven by Gauss, 1835, for regular circle packing, and by Toth, 1940, for irregular circle packing. Whereby, using a hexagonal lattice for the layout, the array disk pack is assured maximum projection capabilities within the smallest space. Albeit, other light emitter arrangements are clearly contemplated as being within the scope of the current embodiment.

Figure 9:
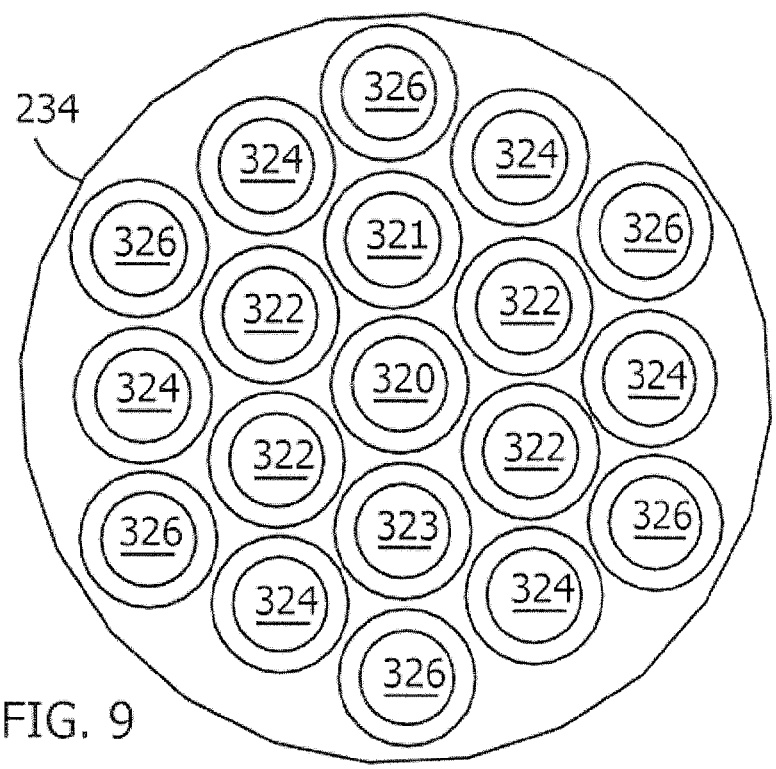
FIG. 9 is a top view of the first embodiment's primary light guide disk.

Turning now to FIG. 9, a top view can be seen of the primary light guide disk 234. Thereshown is a center primary opening 320 that exists at the center of the primary light guide disk 234. Surrounding the center primary opening 320 are six inner primary openings 321, 322, and 323, six middle primary openings 324, and finally, six outer primary openings 326. Again, the openings are closely packed and positioned on a hexagonal lattice, such that each opening is over an underlying LED (shown in FIG. 8).

Figure 10:
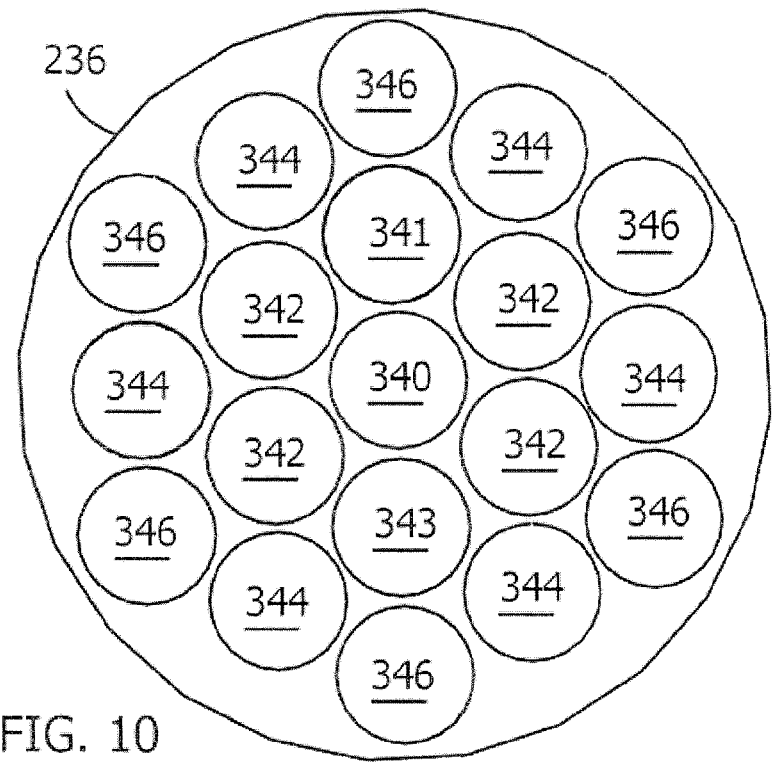
FIG. 10 is a top view of the first embodiment's multi-image film disk.

Turning now to FIG. 10, a top view can be seen of the multi-image film disk 236. Thereshown is a center film image 340 that exists at the center of the multi-image film disk 236. Surrounding the center film image 340 are six inner film images 341, 342, and 343, six middle film images 344, and finally, six outer film images 346. Again, the film images are closely packed and positioned on a hexagonal lattice, such that each film image is over an underlying primary opening (shown in FIG. 9).

Figure 11:
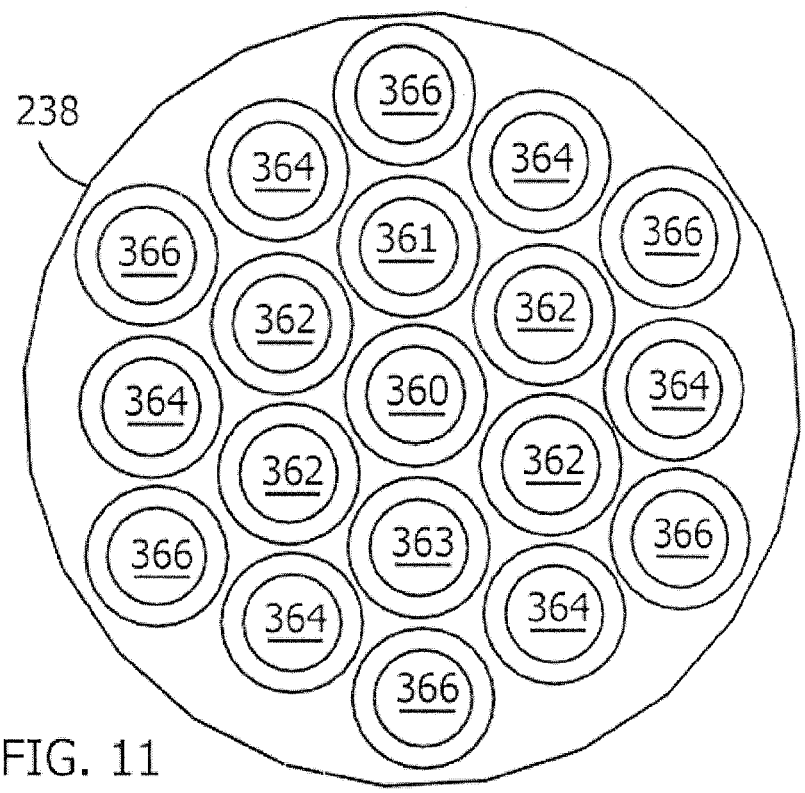
FIG. 11 is a top view of the first embodiment's secondary light guide disk.

Turning now to FIG. 11, a top view can be seen of the secondary light guide disk 238. Thereshown is a center secondary opening 360 that exists at the center of the secondary light guide disk 238. Surrounding the center secondary opening 360 are six inner secondary openings 361, 362, and 363, six middle secondary openings 364, and finally, six outer secondary openings 366. Again, the secondary openings are closely packed and positioned on a hexagonal lattice, such that each opening is over an underlying film image (shown in FIG. 10).

Figure 12:
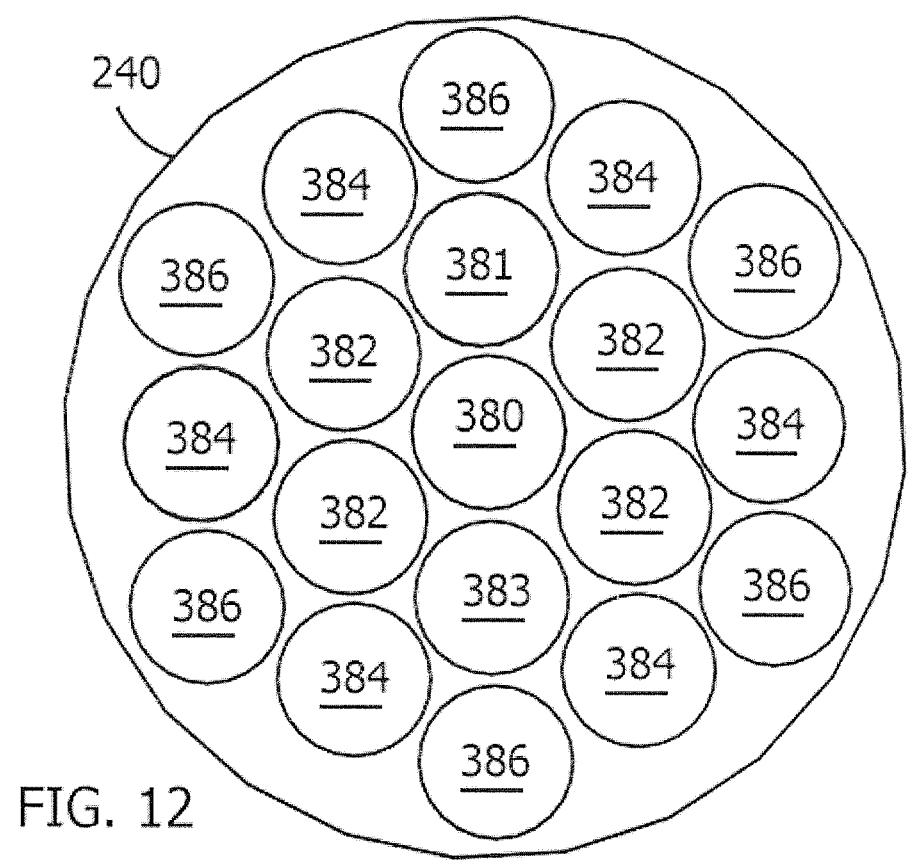
FIG. 12 is a top view of the first embodiment's bug-eyed lens disk.

Turning now to FIG. 12, a top view can be seen of the bug-eyed lens disk 240. Thereshown is a center lens 380 that exists at the center of the bug-eyed lens disk 240. Surrounding the center lens 380 are six inner lenses 381, 382, and 383, six middle lenses 384, and finally, six outer lenses 386. Again, the lens are closely packed and positioned on a hexagonal lattice, such that each lens is over an underlying secondary opening (shown in FIG. 11).

Having discussed FIGS. 8-12, the physical dimensions of the array disk pack are critical to its light projection abilities. Fortunately, the critical dimensions have already been defined in the Table 1, where the optimized projection focal length PFL=0.61. Whereby, the suggested dimensions for the array disk pack are defined as follows:

TABLE 3

Dimensions of Array Disk Pack

| Figure Number | Reference Numeral | Name | Distance to Center of Array Pack (mm) |
|---|---|---|---|
| FIG. 8 | 300 | Center LED | 0.0 |
| FIG. 8 | 301, 302, 303 | Inner LED | 15.0 |
| FIG. 8 | 304 | Middle LED | 26.0 |

TABLE 3-continued

Dimensions of Array Disk Pack

| Figure Number | Reference Numeral | Name | Distance to Center of Array Pack (mm) |
|---|---|---|---|
| FIG. 8 | 306 | Outer LED | 30.0 |
| FIG. 9 | 320 | Center primary opening | 0.0 |
| FIG. 9 | 321, 322, 323 | Inner primary opening | 15.0 |
| FIG. 9 | 324 | Middle primary opening | 26.0 |
| FIG. 9 | 326 | Outer primary opening | 30.0 |
| FIG. 10 | 340 | Center film image | 0.0 |
| FIG. 10 | 341, 342, 343 | Inner film image | 14.72 |
| FIG. 10 | 344 | Middle film image | 25.51 |
| FIG. 10 | 346 | Outer film image | 29.44 |
| FIG. 11 | 360 | Center secondary opening | 0.0 |
| FIG. 11 | 361, 362, 363 | Inner secondary opening | 14.72 |
| FIG. 11 | 364 | Middle secondary opening | 25.51 |
| FIG. 11 | 366 | Outer secondary opening | 29.44 |
| FIG. 12 | 380 | Center lens | 0.0 |
| FIG. 12 | 381, 382, 383 | Inner lens | 14.25 |
| FIG. 12 | 384 | Middle lens | 24.7 |
| FIG. 12 | 386 | Outer lens | 28.5 |

Figure 13:
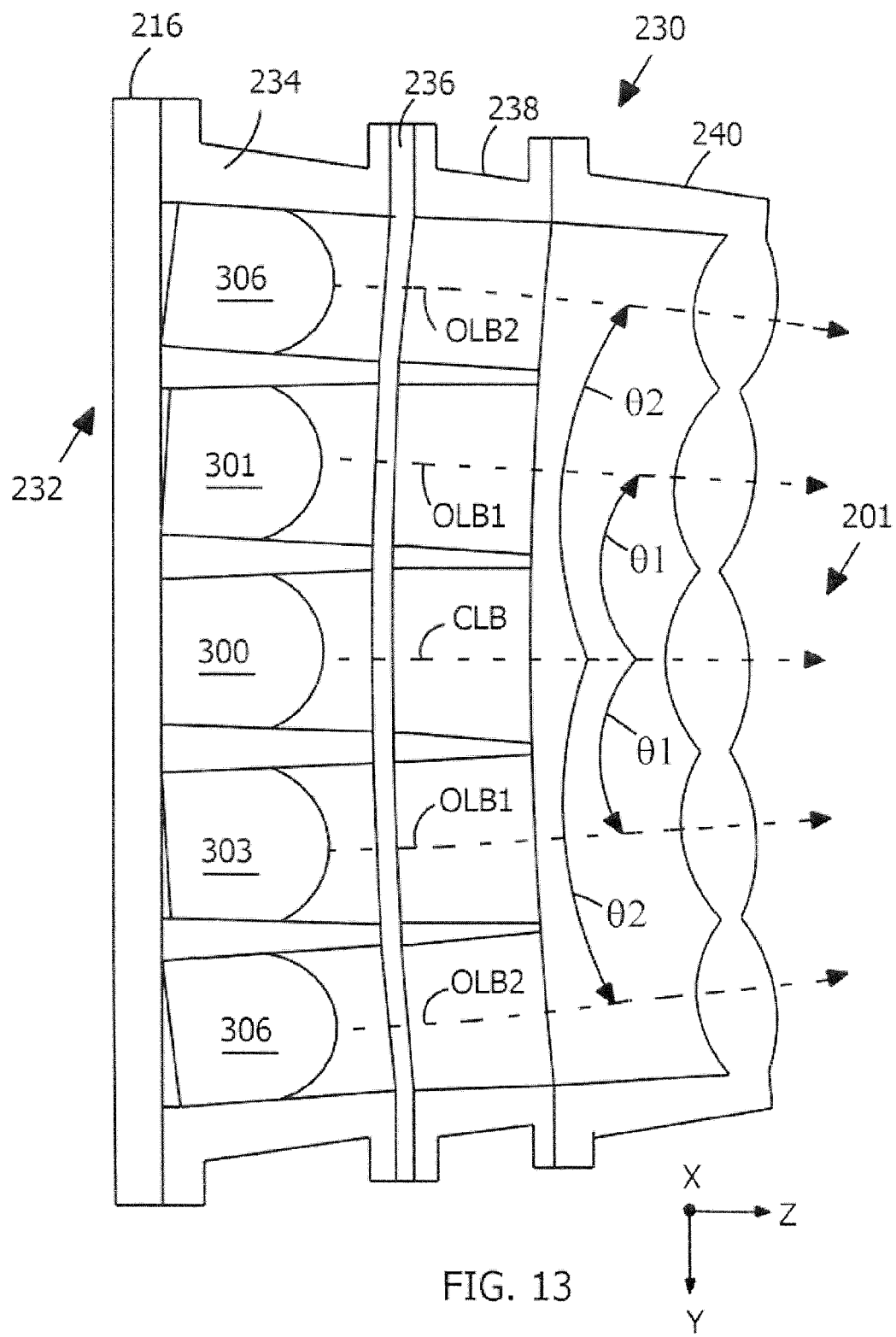
FIG. 13 is a section view of the first embodiment's array disk pack.

Turning now to FIG. 13, a section view of the assembled array disk pack 230 is shown. As indicated earlier, the components of the array disk pack 230 include the light array disk 232, primary light guide disk 234, multi-image film disk 236, secondary light guide disk 238, and bug-eyed lens disk 240. Mounted on the printed circuit board 216, the LEDs 306, 301, 300, and 303 are fitted into the primary light guide disk 234 and aimed at the multi-image film disk 236. Forward of the film disk 236 is the secondary light guide disk 238, capped by the bug-eyed lens disk 240. As exaggerated for explanation purposes, the array disk pack 230 shows converging, light beams, where oblique light beams OLB1, OLB2 converge towards the central light beam CLB.

Further, the components of the array disk pack 230 have been pitched or curved along the x-y plane so that their orientation is perpendicular to the light beams OLB2, OLB1, CLB. A first oblique pitch angle $\theta 1$ exists between oblique light beam OLB1 and central light beam CLB. Moreover, a second oblique pitch angle $\theta 2$ exists between oblique light beam OLB2 and central light beam CLB. Fortunately, most pitch angles have already been defined in Table 1, where the optimized projection focal length PFL=0.61 and pitch angle=converge angle $\theta$. For the sake of brevity, all pitch angles will not be given; however, one skilled in the art can further determine any undisclosed pitch angles. The suggested pitch angles are defined as follows:

TABLE 4

Pitch Angles of the Array Disk Pack

| Figure Number | Reference Numeral | Name | Pitch angle relative to z-axis (deg) |
|---|---|---|---|
| FIG. 13 | $\theta 1$ | First oblique pitch angle | 1.34 |
| FIG. 13 | $\theta 2$ | Second oblique pitch angle | 2.68 |

First Embodiment—Graphics for Overlaid Image Projection

Figure 14:
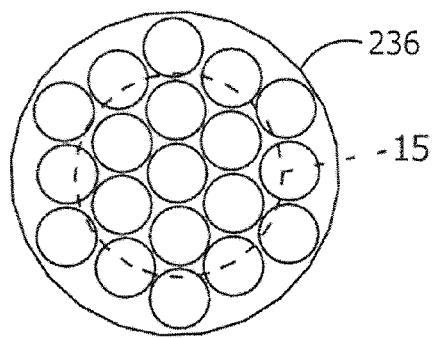
FIG. 14 is a top view of the first embodiment's multi-image film disk indicating a close-up region.
Figure 15:
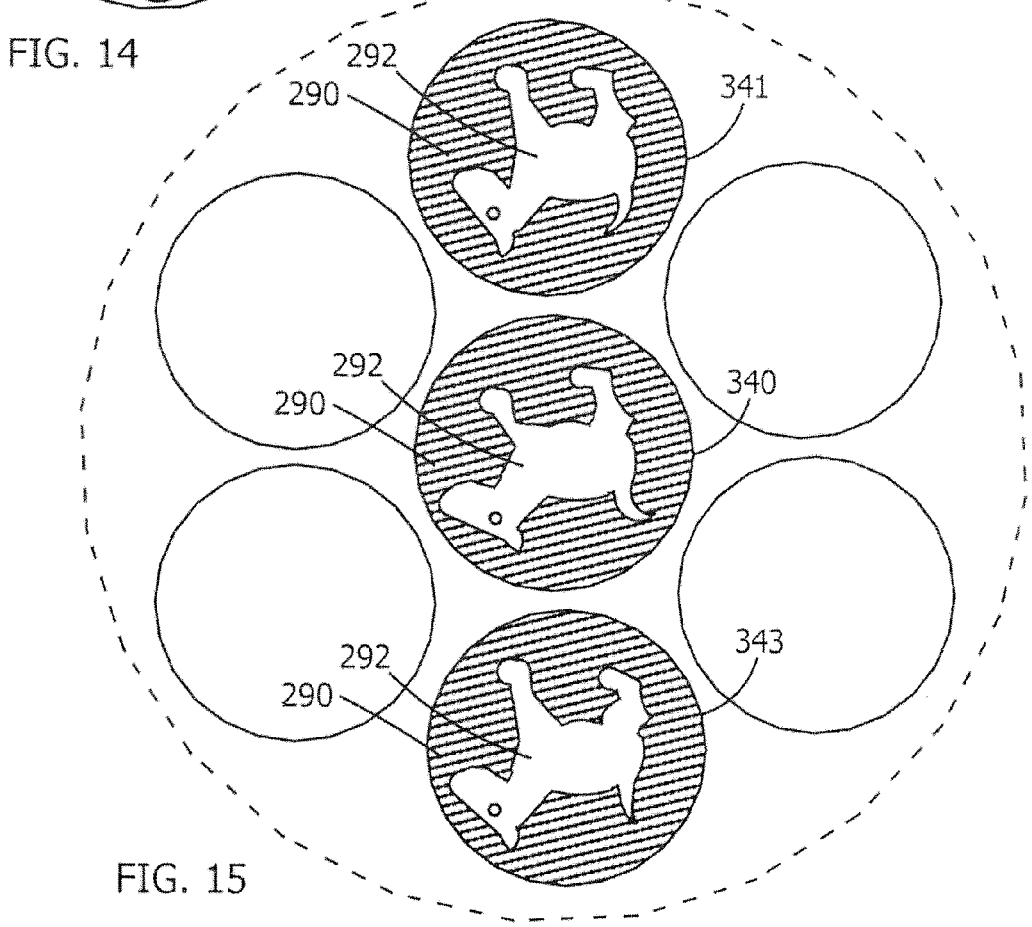
FIG. 15 is a close-up, top view of the first embodiment's multi-image film disk with pictures of a walking dog.

As mentioned earlier, the objective for the current embodiment is to illuminate an image of a walking dog. So there-shown in FIGS. 14 and 15 is the top view of the multi-image film disk 236. In FIG. 15, a close-up view of the multi-image film disk is presented, showing three film images having a picture of a walking dog. The multi-image film disk contains a first film image 341, second film image 340, and third film image 343. All three film images have a black background 290 printed with opaque black ink and a colored foreground 292 of translucent colored ink. Whereby, when light is transmitted through the film image, the light is blocked by the black background 290 and filtered by the colored foreground 292, rendering an illuminated dog image. Though the images appear upside down, this is not accidental but required, as the optical lens (not shown) will flip the illuminated image along the x and y dimensions during projection.

First Embodiment—Operation of Overlaid Image Projection

Figure 16:
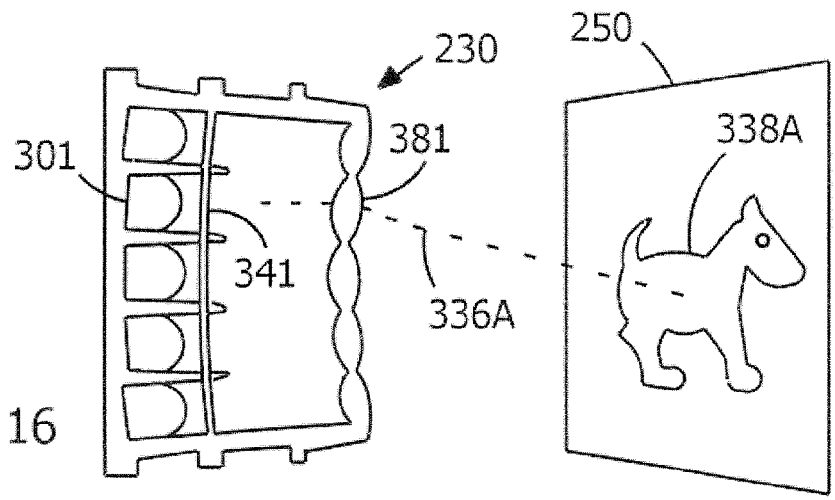
FIG. 16 is a diagram of the first embodiment's array disk pack producing a first overlaid image of a walking dog.
Figure 17:
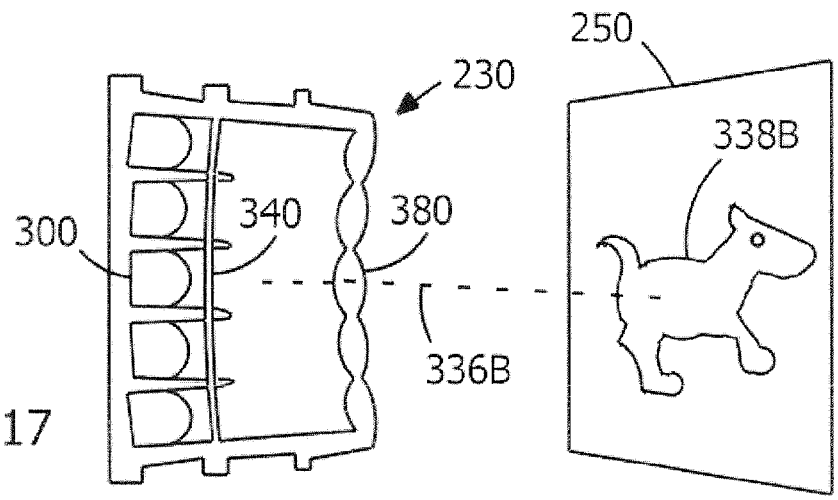
FIG. 17 is a diagram of the first embodiment's array disk pack producing a second overlaid image of a walking dog.
Figure 18:
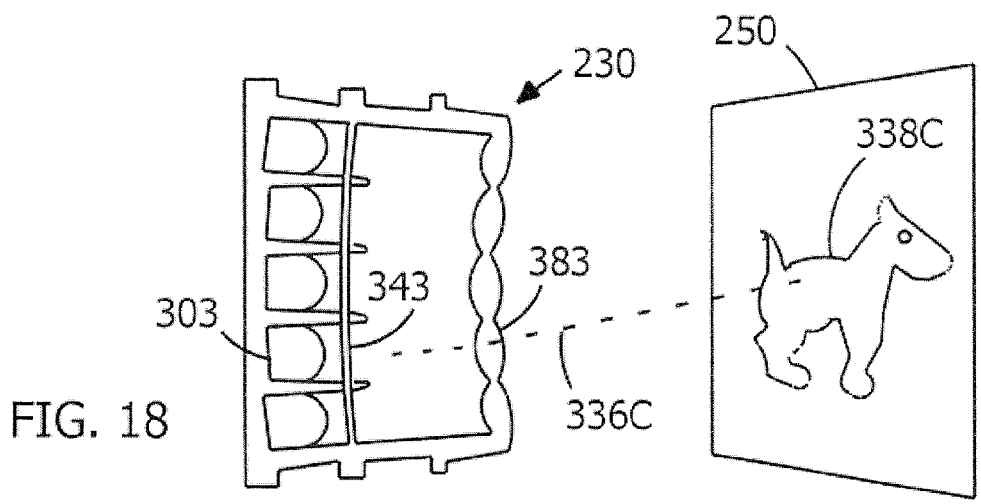
FIG. 18 is a diagram of the first embodiment's array disk pack producing a third overlaid image of a walking dog.

So turning to FIGS. 16-18, thereshown is a section view of the array disk pack 230 positioned in front of the projection surface 250. FIGS. 16-18 represent three different temporal views of the array disk pack 230 in operation. Further, the array disk pack 230 is assumed to be operatively associated with a control unit and power source (not shown). In FIG. 16 can be seen a white LED 301, film image 341, convex lens 381, projection beam 336A, and illuminated image 338A. In FIG. 17 can be seen a white LED 300, film image 340, convex lens 380, projection beam 336B, and illuminated image 338B. And finally, in FIG. 19 can be seen a white LED 303, film image 343, convex lens 383, projection beam 336C, and illuminated image 338C. The film images 341, 340, and 343 are assumed to contain images of a dog (as shown earlier in FIG. 15).

To illuminate and animate an overlaid image, the light sources contained in the array disk pack 230 are turned on in sequence. So starting with FIG. 16, the control unit (not shown) turns on the white LED 301, emitting a forward light beam. The light beam is then filtered by film image 341, passing through lens 381, and exits as projection beam 336A that illuminates the dog image 338A. About 0.10 second later, the white LED 301 is turned off.

Then in FIG. 17, the control unit (not shown) turns on the white LED 300, emitting a forward light beam. The light beam is then filtered by film image 340, passing through lens 380, and exits as projection beam 336B that illuminates the dog image 338B. About 0.10 second later, the white LED 300 is turned off.

Then in FIG. 18, the control unit (not shown) turns on the white LED 303, emitting a forward light beam. The light beam is then filtered by film image 343, passing through lens 383, and exits as projection beam 336C that illuminates the dog image 338C. About 0.10 second later, the white LED 303 is turned off.

Turning back to FIG. 16, the illumination cycle starts over again, and continues its operation defined by FIGS. 16-18 for a desired period of time. The end result being, an illuminated, animated dog appears to walk to the right on the projection surface 250. Understandably, the current embodiment can also project an animated dog walking to the left, simply by adding more dog images to the multi-image film disk (as shown in FIG. 15) and coordinating the activation of the associated light sources.

Now referring back to FIGS. 2 and 3, the light projection device 200 containing the array disk pack 230 can modify the animation sequence according to its context. As stated earlier, the device's control unit 120 is in operative association with the accelerometer 210 that generates a move signal when device's handle 202 is moved by a user. Subsequently, the control unit 120 can modify the activation of different light sources in the array pack 230, according to the direction of movement.

The result being, if a user grasps the handle 202 of the light projection device 200 and swings the device to the right, the illuminated dog walks to the right on the projection surface. If the user swings the device to the left, the illuminated dog walks to the left. Further, the control unit 120 activates the sound generator 212 to produce sound of tip-tapping dog feet while projecting the illuminated dog image. Understandably, any kind of graphic content, sequencing of overlaid images, and sound effects may be incorporated into the light projection device 200.

Power efficiency for the light projection device 200 is exceptional because there is typically only one light source active at any given time. Albeit, multiple light sources may be turned on concurrently to provide special visual effects. In fact, with three penlight AA batteries 206 as a power source, the device will operate for more than eighty hours before battery failure.

Further, alternative light array packs can be made as small as a few millimeters in diameter comprised of tiny light emitters. Whereby, the light array projection system can be embedded into products such as women's' earrings, rings, and broaches, children's toys, shoes, clothing, greeting cards, carpentry tools, and sports equipment.

Second Embodiment—Overlaid Image Projection Device with Planar Array Pack

Figure 19:
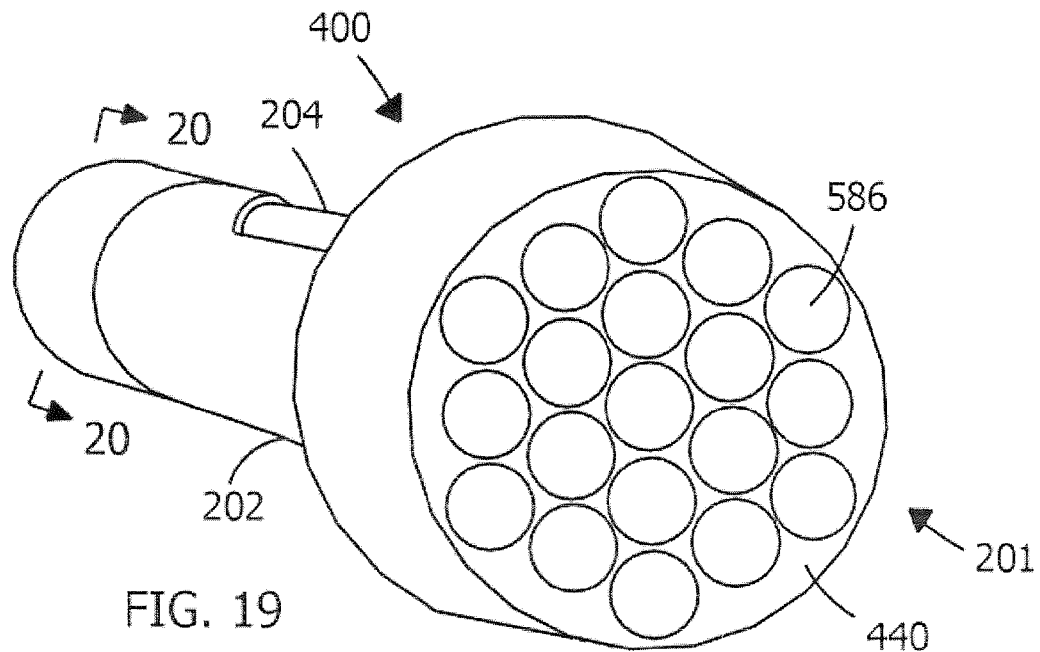
FIG. 19 is a perspective view of a second embodiment of a light projection device, containing a planar array pack.
Figure 20:
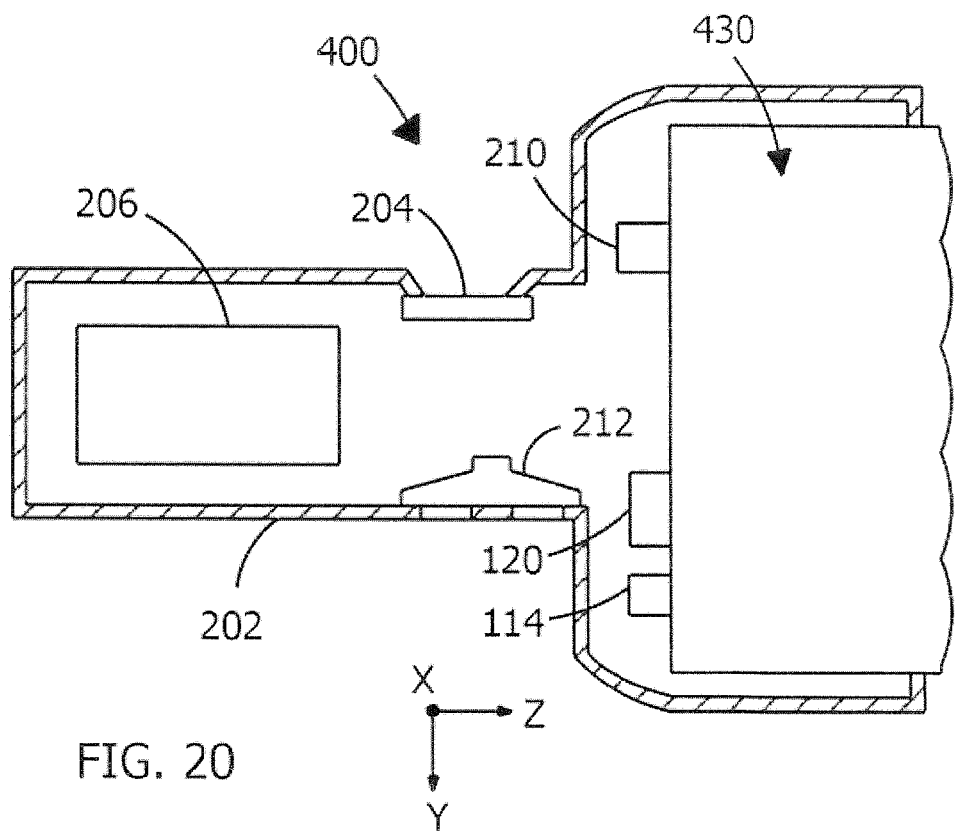
FIG. 20 is an interior view of the second embodiment of the light projection device, containing the planar array pack.

In FIGS. 19-20 an alternative second embodiment is shown, referred to as a planar projection device 400. The planar projection device 400 is similar in appearance and construction to the first embodiment. Whereby, in the second embodiment, similar reference numerals are utilized for common components with respect to the first embodiment shown in FIGS. 2-18.

The planar projection device 400 also has the shape of a flashlight that includes a handle 202 sized to receive batteries 206. The batteries 206 are coupled to a touch pad 204. At the projection face 201, the planar projection device 400 includes a planar bug-eyed lens 440 containing a plurality of convex lens 586. Turning specifically to FIG. 20, the planar projection device 400 includes a planar array pack 430, which generates the projected light image. The planar array pack 430 is an alternate version of the array disk pack of the first embodiment. Thereshown in FIG. 20, mounted behind the planar array pack 430 is an accelerometer 210, which provides a move signal upon movement of the handle 202. Further, the planar projection device 200 includes a sound generator 212 that produces auditory feedback to the user. Nearby, a memory unit 114 provides data storage. Finally, a control unit 120 is in operative association with the planar array pack 430, memory unit 114, accelerometer 210, sound generator 212, touch pad 204, and batteries 206.

Second Embodiment—Dimensions of the Planar Array Pack

The second embodiment will rely on the same design objectives and behave in the same manner as the first embodiment. Therefore, the dimensions of the planar array pack may be defined, relying on many of the previously discussed math formulas, figures, and data tables of the first embodiment. So thereshown in FIGS. 21-25 are orthogonal top views of a planar light array 432, planar primary light guide 434, planar film disk 436, planar secondary light guide 438, and planar bug-eyed lens 440.

Figure 21:
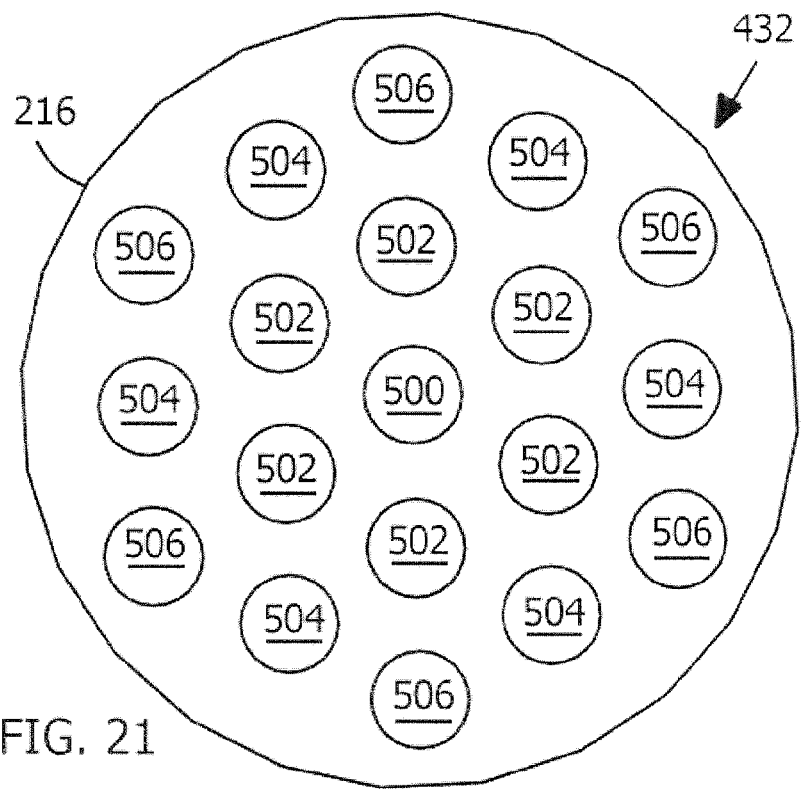
FIG. 21 is a top view of the second embodiment's planar light array.

Turning first to FIG. 21, a top view can be seen of the planar light array 432 with a plurality of white LEDs mounted on the printed circuit board 216. Thereshown is a center LED 500 that exists at the center of the planar light array 432. Surrounding the center LED 500 are six inner LEDs 502, six middle LEDs 504, and finally, six outer LEDs 506. Preferably, all of the LEDs are spaced equal distance apart from each other and arranged in a hexagonal lattice similar to a bee's honeycomb.

Figure 22:
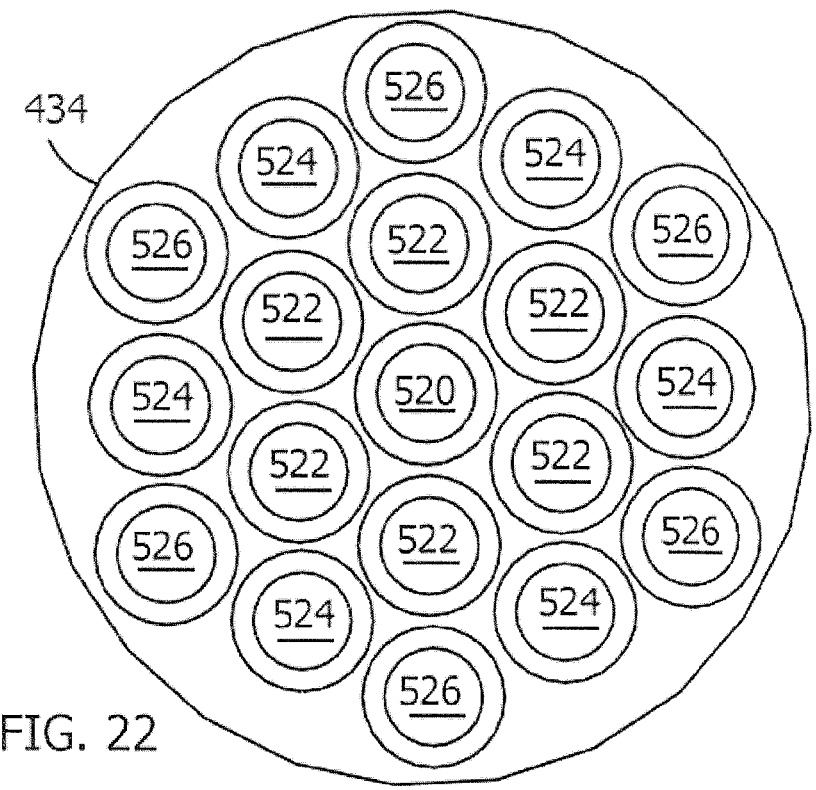
FIG. 22 is a top view of the second embodiment's planar primary light guide.

Turning now to FIG. 22, a top view can be seen of the planar primary light guide 434. Thereshown is a center primary opening 520 that exists at the center of the planar primary light guide disk 434. Surrounding the center primary opening 520 are six inner primary openings 522, six middle primary openings 524, and finally, six outer primary openings 526. Again, the primary openings 520, 522, 524, 526 have been positioned on a hexagonal lattice, such that each opening is over an underlying LED (shown in FIG. 21).

Figure 23:
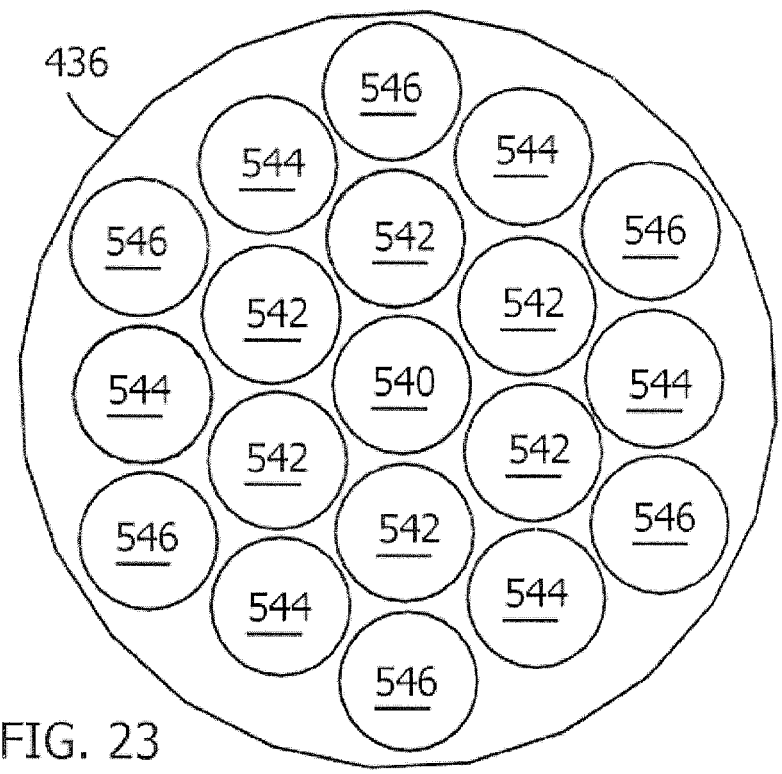
FIG. 23 is a top view of the second embodiment's planar image film.

Turning now to FIG. 23, a top view can be seen of the planar image film 436. Thereshown is a center film image 540 that exists at the center of the planar image film 436. Surrounding the center film image 540 are six inner film images 542, six middle film images 544, and finally, six outer film images 546. Again, the film images 540, 542, 544, 546 have been positioned on a hexagonal lattice, such that each image is over an underlying primary opening (shown in FIG. 22).

Figure 24:
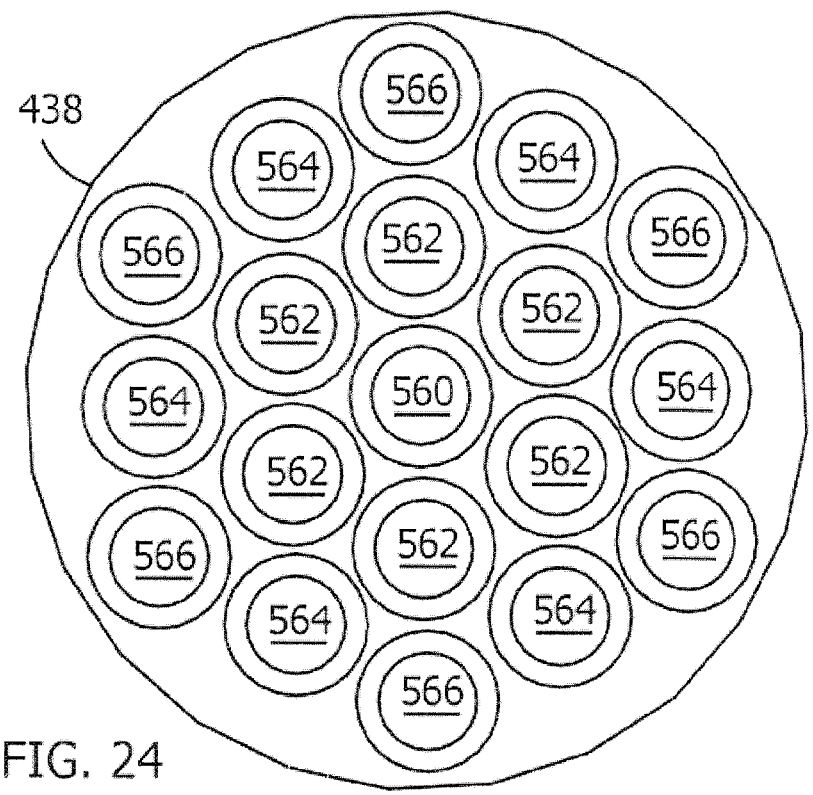
FIG. 24 is a top view of the second embodiment's planar secondary light guide.

Turning now to FIG. 24, a top view can be seen of the planar secondary light guide 438. Thereshown is a center secondary opening 560 that exists at the center of the planar secondary light guide 438. Surrounding the center secondary opening 560 are six inner secondary openings 562, six middle secondary openings 564, and finally, six outer secondary openings 566. Again, the secondary openings 520, 522, 524, 526 have been positioned on a hexagonal lattice, such that each opening is over an underlying film image (shown in FIG. 23).

Figure 25:
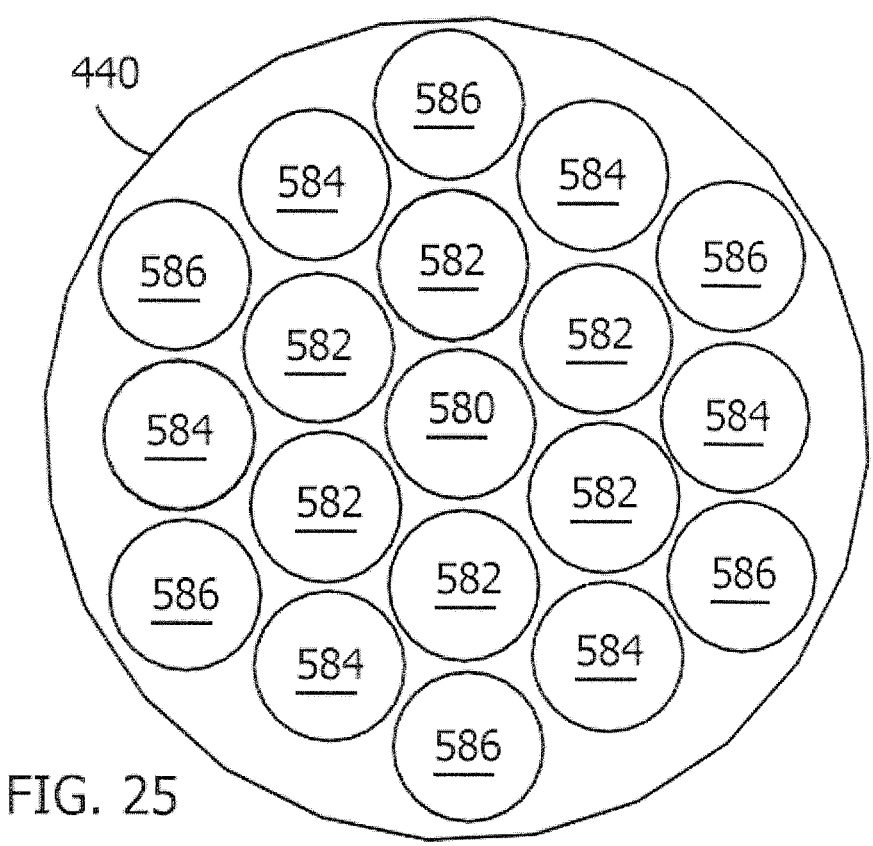
FIG. 25 is a top view of the second embodiment's planar bug-eyed lens.

Turning now to FIG. 25, a top view can be seen of the planar bug-eyed lens 440. Thereshown is a center lens 580 that exists at the center of the planar bug-eyed lens 440. Surrounding the center lens 580 are six inner lenses 582, six middle lenses 584, and finally, six outer lenses 586. Again, the lens 580, 582, 584, 586 have been positioned on a hexagonal lattice, such that each lens is over an underlying secondary opening (shown in FIG. 24).

Having discussed FIGS. 21-25, the physical dimensions of the planar array disk pack are critical to its light projection abilities. Fortunately, the critical dimensions have already been defined in the Table 1, where the optimized projection focal length PFL=0.61. Whereby, the suggested dimensions for the planar array disk pack are defined as follows:

TABLE 5

Dimensions of Planar Array Disk Pack

| Figure Number | Reference Numeral | Name | Distance to Center of Planar Array Pack (mm) |
|---|---|---|---|
| FIG. 21 | 500 | Center LED | 0.0 |
| FIG. 21 | 502 | Inner LED | 15.0 |
| FIG. 21 | 504 | Middle LED | 26.0 |
| FIG. 21 | 506 | Outer LED | 30.0 |
| FIG. 22 | 520 | Center primary opening | 0.0 |
| FIG. 22 | 522 | Inner primary opening | 15.0 |
| FIG. 22 | 524 | Middle primary opening | 26.0 |
| FIG. 22 | 526 | Outer primary opening | 30.0 |
| FIG. 23 | 540 | Center film image | 0.0 |
| FIG. 23 | 542 | Inner film image | 15.0 |
| FIG. 23 | 544 | Middle film image | 26.0 |
| FIG. 23 | 546 | Outer film image | 30.0 |
| FIG. 24 | 560 | Center secondary opening | 0.0 |
| FIG. 24 | 562 | Inner secondary opening | 15.0 |
| FIG. 24 | 564 | Middle secondary opening | 26.0 |
| FIG. 24 | 566 | Outer secondary opening | 30.0 |
| FIG. 25 | 580 | Center lens | 0.0 |
| FIG. 25 | 582 | Inner lens | 14.25 |
| FIG. 25 | 584 | Middle lens | 24.7 |
| FIG. 25 | 586 | Outer lens | 28.5 |

Figure 26:
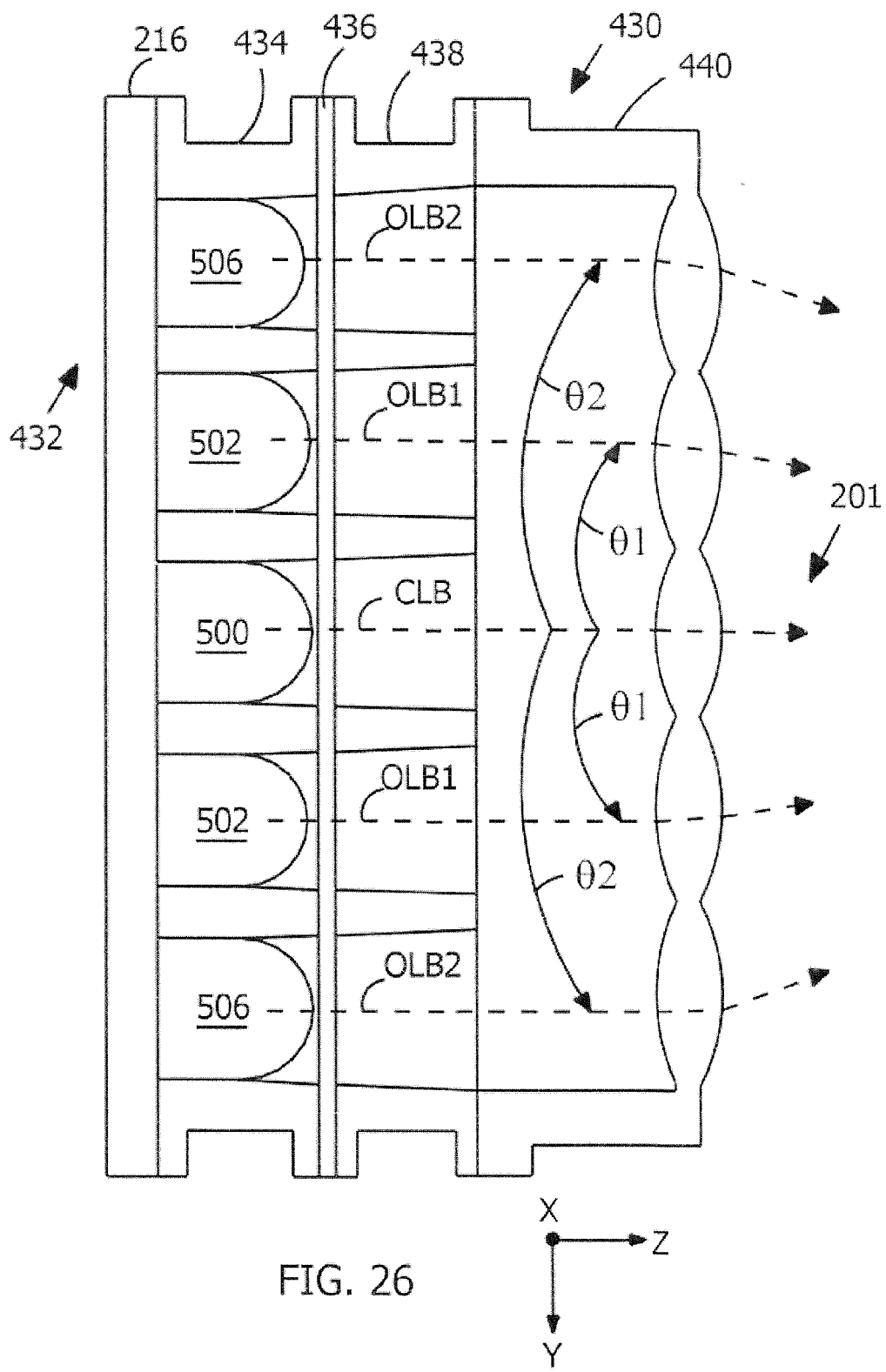
FIG. 26 is a section view of the second embodiment's planar array pack.

Turning now to FIG. 26, a section view of the assembled planar array pack 430 is shown. The distinctive feature of the planar array pack 430 is that its components reside on planar surfaces parallel to the x-y plane, rather than on curved surfaces as the array disk pack of the first embodiment (shown earlier in FIG. 13). In FIG. 26, the components of the planar array pack 430 include the planar light array 432, planar primary light guide 434, planar image film 436, planar secondary light guide 438, and the planar bug-eyed lens 440.

The planar light guide 432 is composed of the printed circuit board 216 and flush-mounted, white LEDs 500, 502, and 506. Surrounding the LEDs, a planar primary light guide 434 contains walled openings for the LEDs to reside. Nearby, the planar image film 236 is fitted between the planar primary light guide 434 and the planar secondary light guide 438, which is capped by the planar bug-eyed lens 440.

In the interior of the planar array pack 430, note oblique light beams OLB1, OLB2 are parallel to the central light beam CLB and the device's z-axis. However, beyond the projection face 201, the oblique light beams OLB1. OLB2 converge towards the central light beam CLB.

Further, the components of the planar array pack 430 are oriented perpendicular to the light beams OLB2, OLB1, CLB. That is, a first oblique pitch angle θ1 exists between oblique light beam OLB1 and central light beam CLB. A second oblique pitch angle θ2 exists between oblique light beam OLB2 and central light beam CLB. The suggested pitch angles are defined as follows:

TABLE 6

Pitch Angles of the Planar Array Pack

| Figure Number | Reference Numeral | Name | Pitch angle relative to z-axis (deg) |
|---|---|---|---|
| FIG. 26 | θ1 | First planar pitch angle | 0.0 |
| FIG. 26 | θ2 | Second planar pitch angle | 0.0 |

Even with pitch angles equal to zero (as indicated above), the planar array pack 430 still produces converging projection beams at the projection face 201. The reason being, the pitch angle essentially affects the amount of edge aberration of the projected image—not the converging projection beam aspect. Moreover, since the current embodiment has a projection beam convergence of less than 5 degrees, any edge aberration effect is essentially unnoticeable.

So continuing with FIG. 26, during the operation of the planar array pack 430, light beams emanate from the planar light array 432, and pass through the planar primary light guide 434. The light beams are then filtered by the planar image film 436, passing through the planar secondary light guide 438, and into the planar bug-eyed lens 440. All of the light beams are parallel within the planar array pack 430. Yet surprisingly, when the parallel light beams pass through the planar bug-eyed lens 440 and exit from the projection face 201, the light beams converge. This is a unique feature of the planar array disk pack 430. The light beams converge because of the unique spatial positions of the lens within the planar bug-eyed lens 440 relative to the images on the planar image film 436. (For more details regarding this concept, see the first embodiment's math formula defining a light array system having converging beams of light.)

Second Embodiment—Operation of Planar Array Pack

Referring back to FIGS. 19 and 20, the second embodiment essentially operates in the same manner as first embodiment. That is, even though the array disk pack of the first embodiment (not shown) was replaced with the planar array pack 430, no operational changes exist. Whereby, for the sake of brevity, the reader may refer to the first embodiment discussion regarding operation.

Third Embodiment—Overlaid Image Sensing Device with Sensing Array Pack

Figure 27:
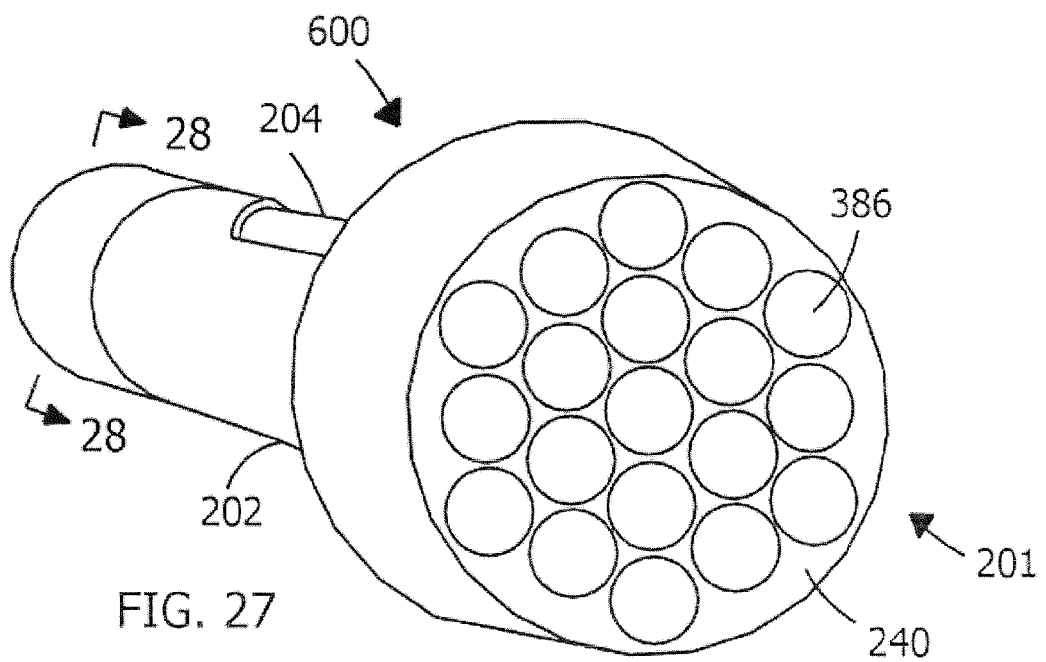
FIG. 27 is a perspective view of the third embodiment of a light sensing device, containing a sensing array pack.
Figure 28:
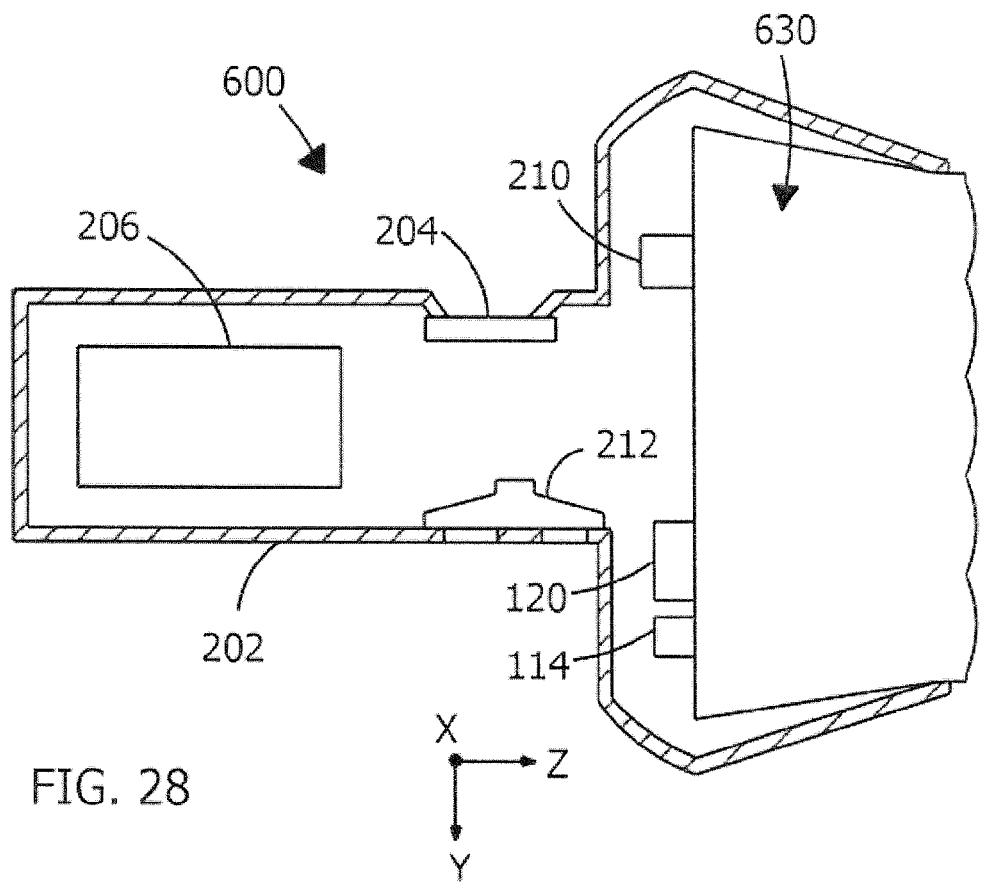
FIG. 28 is an interior view of the third embodiment of the light sensing device, containing the sensing array pack.

In FIGS. 27-28 an alternative third embodiment is shown, referred to as a light sensing device 600 having the capability to detect light images. The light sensing device 600 is similar in appearance and construction to the first embodiment. Whereby, in the third embodiment, similar reference numerals are utilized for common components with respect to the first embodiment shown in FIGS. 2-18.

Thereshown in FIGS. 27-28, the light sensing device 600 has the shape of a flashlight that includes a handle 202 sized to receive batteries 206. The batteries 206 are coupled to a touch pad 204. At the projection face 201, the light sensing device 600 includes a bug-eyed lens disk 240 containing a plurality of convex lens 386. Turning specifically to FIG. 28, the light sensing device 600 includes a light sensing array pack 630, which can detect light images forward the projection face 201. The light sensing array pack 630 is an alternate version of the array disk pack of the first embodiment (not shown). Mounted behind the light sensing array pack 630 is an accelerometer 210, which provides a move signal upon movement of the handle 202. Further, the light sensing device 600 includes a sound generator 212 that produces auditory feedback to the user. Nearby, a memory unit 114 provides data storage. Finally, a control unit 120 is in operative association with the light sensing array pack 630, memory unit 114, accelerometer 210, sound generator 212, touch pad 204, and batteries 206.

Figure 29:
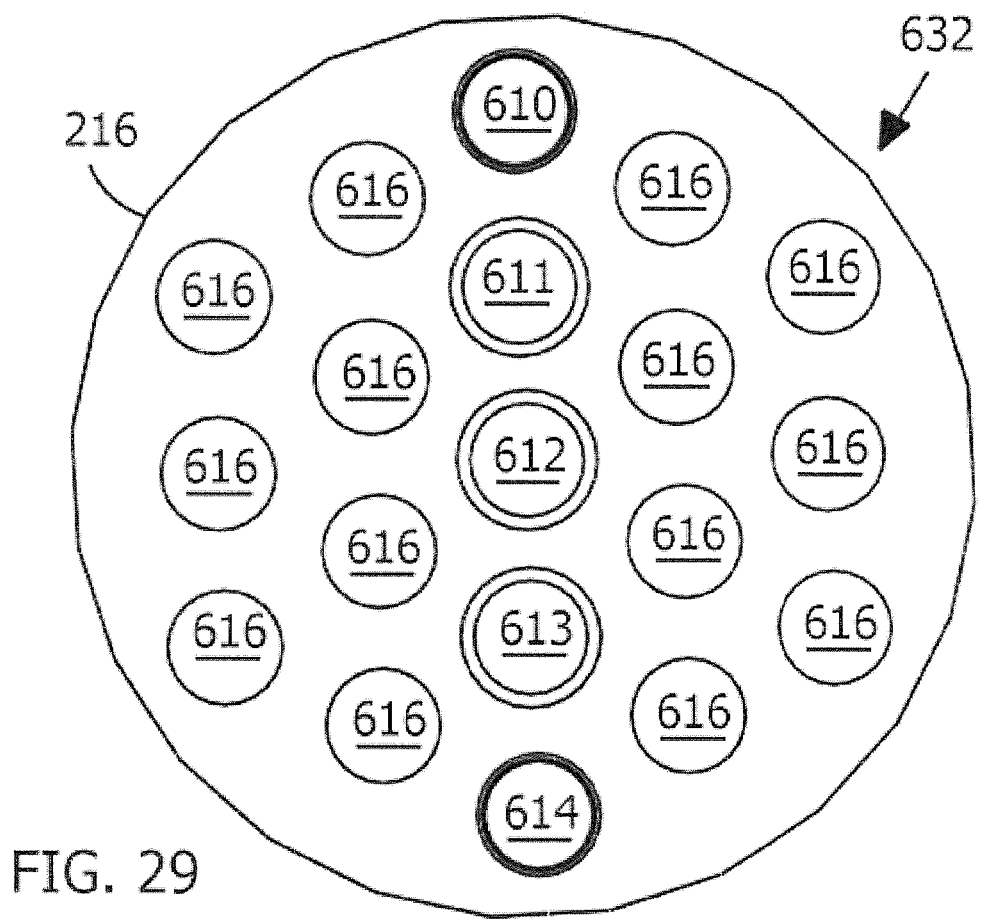
FIG. 29 is a top view of the third embodiment's sensing array disk.

So turning to FIG. 29, thereshown is a top view of a sensing array disk 632 of the current embodiment, which replaces the light array disk (in FIG. 8) of the first embodiment. As can be seen in FIG. 29, the sensing array disk 632 contains three infrared photodiodes 611, 612, and 613. Preferably, each photodiode has a view angle of 15 degrees and detects infrared light at 880-950 nanometers wavelength. In addition, the sensing array disk 632 contains two infrared LEDs 610 and 614. Preferably, each infrared LED has an emission angle of 15 degrees and produces infrared light of 880-950 nanometers wavelength. In addition, the sensing array disk 632 contains white LEDs 616 that produce brilliant beams of white light. The photodiodes and LEDs are thru-hole mounted, soldered onto the printed circuit board 216, and operatively coupled to the control unit (not shown).

Third Embodiment—Graphics for Overlaid Image Sensing

Figure 30:
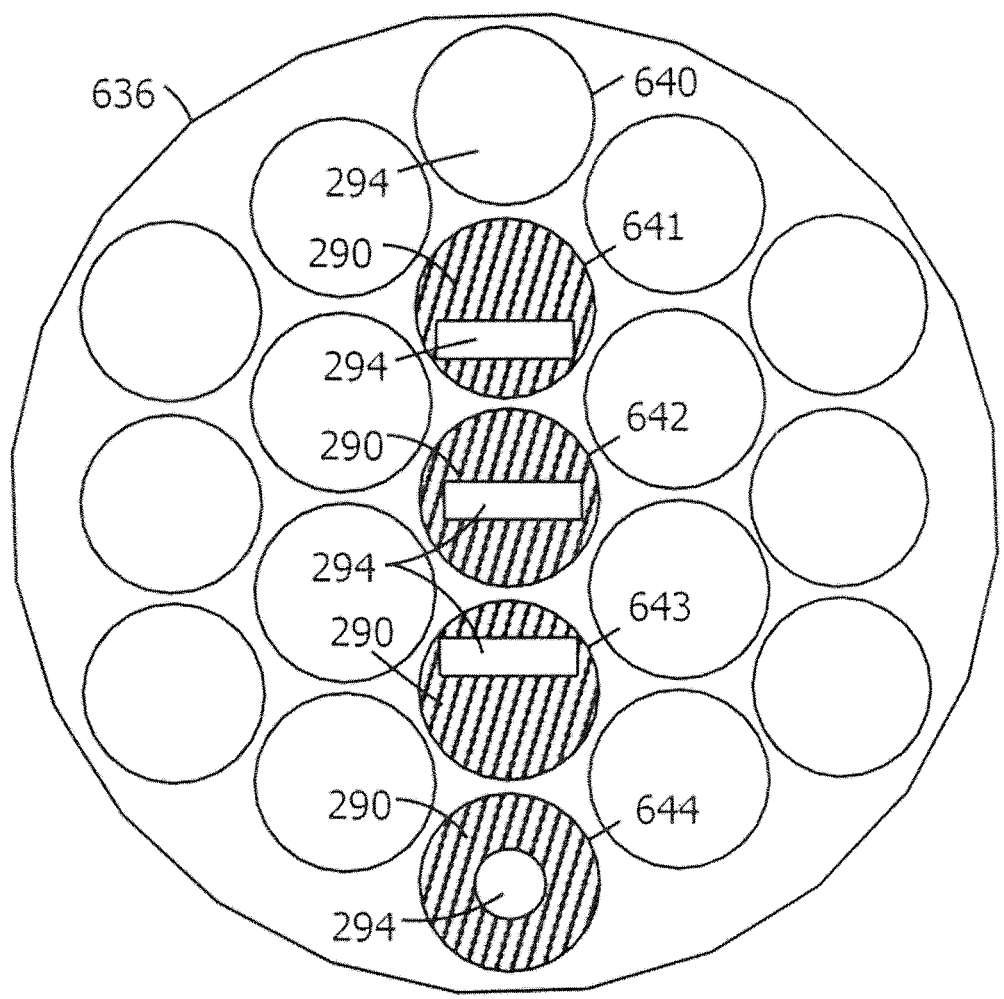
FIG. 30 is a close-up, top view of the third embodiment's sensing film disk with pictures of bar shapes.

To define a sensing region, the device's light-transmissive graphics need to be modified such that a light mask is formed. So thereshown in FIG. 30 is the top view of a sensing film disk 636 of the current embodiment, which replaces the multi-image film disk (in FIG. 15) of the first embodiment. The sensing film disk 636 is a thin, transparent acrylic sheet. The sensing film disk 636 contains five film images: a blank film image 640, first bar film image 641, second bar film image 642, third bar film image 643, and spot film image 644. Further, four of the film images 641, 642, 643, 644 have a black background 290 that is printed with opaque black ink, along with a transparent foreground 294. The blank film image 640 is wholly transparent. Whereby, when light is transmitted through the film images 641, 642, 643, 644 the light is blocked by the black background 290 and passes through the transparent foreground 294. The film images appear upside down, as the optical lens (not shown) will flip the light sensing image along x and y dimensions during the light sensing operation.

Third Embodiment—Operation of Overlaid Image Sensing

Figure 31A:
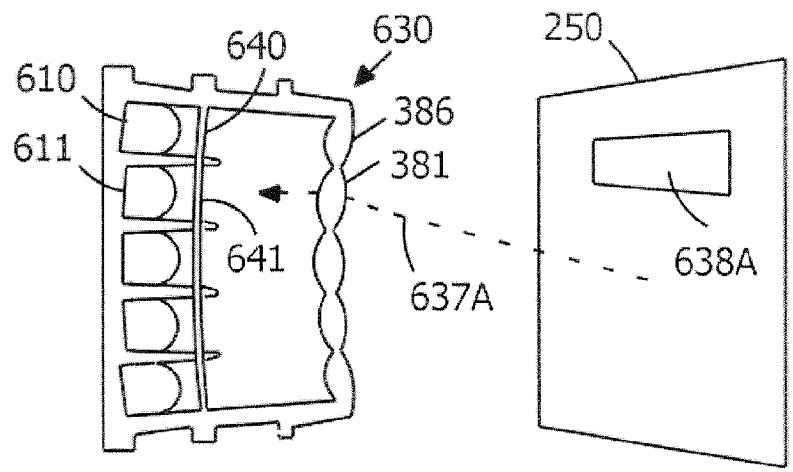
FIG. 31A is a diagram of the third embodiment's sensing array pack viewing a first bar shape.
Figure 31B:
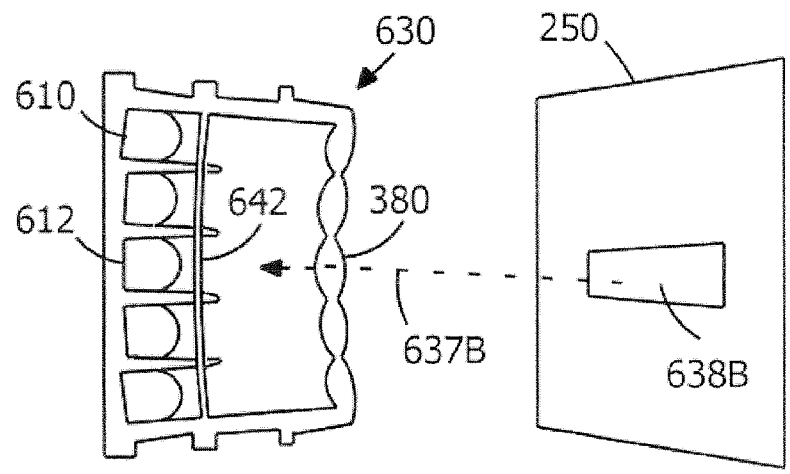
FIG. 31B is a diagram of the third embodiment's sensing array pack viewing a second bar shape.
Figure 31C:
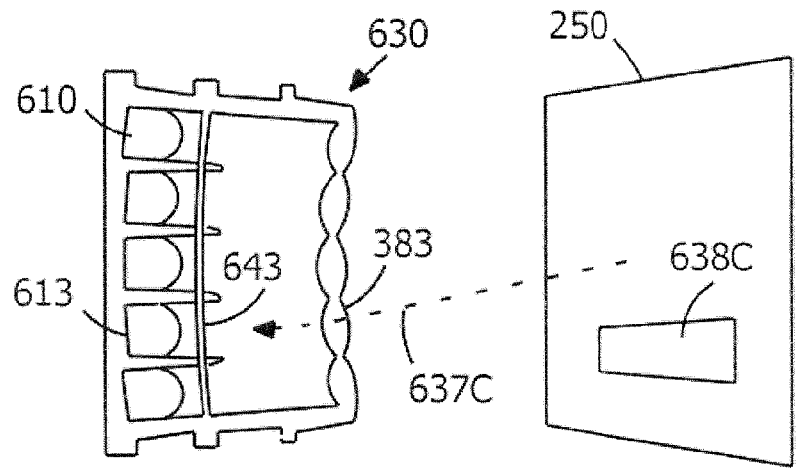
FIG. 31C is a diagram of the third embodiment's sensing array pack viewing a third bar shape.

So turning to FIGS. 31A, 31B, 31C thereshown is a section view of the sensing array pack 630 positioned in front of a projection surface 250. FIGS. 31A, 31B, 31C represent three different temporal views of the sensing array pack 630 in operation. Further, the sensing array pack 630 is assumed to be operatively associated with the control unit and power source (not shown). FIG. 31A shows an infrared LED 610, blank film image 640, convex lens 386, infrared photodiode 611, first bar film image 641, convex lens 381, reflected light ray 637A, and view region 638A. In FIG. 31B can be seen infrared LED 610, infrared photodiode 612, second bar film image 642, convex lens 380, reflected light ray 637B, and view region 638B. And finally, in FIG. 31C can be seen an infrared LED 610, infrared photodiode 613, third bar film image 643, convex lens 383, reflected light ray 637C, and view region 638C. The bar film images 641, 642, 643 are assumed to contain bar images and the blank film image 640 contains no image (as shown earlier in FIG. 30).

To begin the light sensing operation in FIG. 31A, the infrared LED 610 contained in the sensing array pack 630 is turned on. The infrared LED 610 emits infrared light that passes through the blank image film 640 and convex lens 386, which exits the device and illuminates the projection surface 250.

Then shown in FIG. 31A, emitted infrared light falls on the view region 638A of the projection surface 250, which produces the reflected light ray 637A heading towards the sensing array pack 630. The reflected light ray 637A passes into lens 381, gets filtered by the first bar film image 641, and illuminates the infrared photodiode 611. The control unit (not shown) then reads the infrared photodiode 611 signal value, and stores the value in the light sensing device's memory (not shown).

Then shown in FIG. 31B, emitted infrared light falls on the view region 638B of the projection surface 250, which produces the reflected light ray 637B heading towards the sensing array pack 630. The reflected light ray 637B passes into lens 380, gets filtered by the second bar film image 642, and illuminates the infrared photodiode 612. The control unit (not shown) then reads the infrared photodiode 612 signal value, and stores the value in the light sensing device's memory (not shown).

Then shown in FIG. 31C, emitted infrared light falls on the view region 638C of the projection surface 250, which produces the reflected light ray 637C heading towards the sensing array pack 630. The reflected light ray 637C passes into lens 383, gets filtered by the third bar film image 643, and illuminates the infrared photodiode 613. The control unit (not shown) then reads the infrared photodiode 613 signal value, and stores the value in the light sensing device's memory (not shown).

Turning back to FIG. 31A, the light sensing cycle starts all over again, and continues its operation defined by FIGS. 31A, 31B, 31C for the desired period of time. The end result being, the light sensing device can perceive three distinct bar-shaped regions on the projection surface 250 at designated instances of time. The current embodiment can also sense or perceive other kinds of shapes and patterns, simply by adding more graphic film images to the sensing film disk (as shown in FIG. 30) and coordinating the signal reading of the associated infrared photodiodes. For improved light sensing ability, the generated and received infrared light may be modulated (e.g. 30 to 500 KHz), such that the device's light is differentiable from the ambient light. Further, other kinds of sensors, emitters, and lens, used in part or in combination, could be used for light detection, although other sensing approaches are clearly contemplated as being within the scope of the present invention.

One application for the light sensing capability is object proximity detection and position sensing. So thereshown in FIGS. 32A, 32B, 33A, 33B is an example of object detection using the light sensing capability previously discussed. That is, FIG. 32A is a side view showing the light sensing device 600 aimed at a projection surface 250. For enhanced light detection ability, the device 600 produces an infrared light beam 605 that illuminates the ambient surrounding. Moreover, the device can sense the projection surface 250 along a light view path 604. Positioned away from the light view path 604 is a box shaped object 602.

Now turning to FIG. 32B, a sensor view 606 from within the device is presented. The sensor view 606 corresponds to an aggregated view made by the three photodiodes of the three view regions 638A, 638B, 638C (shown earlier in FIGS. 31A, 31B, 31C). As noted in FIG. 32B, the outer black background 290 of the sensing film images (shown earlier in FIG. 30) blocks the inbound light. However, three regions 638A, 638B, 638C observe the projection surface 250 forward of the device, as indicated in FIG. 32B.

Now turning to FIG. 33A, a second side view is shown of the light sensing device 600 aimed at the projection surface 250. Again, the device 600 produces an infrared light beam 605 that illuminates the ambient surrounding. The device can also sense the projection surface 250 along a light view path 604. However, this time, the box shaped object 604 has been moved into the light view path 604.

So turning to FIG. 33B, the sensor view 606 from within the device is presented again. Again, the sensor view 606 shows the black background 290 of the associated film image blocking the inbound light. In addition, the lower view region 638C still shows the projection surface 250. But more importantly, a portion of the box shaped object 602 has appeared in the view regions 638A and 638B. The reason is the box shaped object has entered the sensing regions of the light sensing device 600.

Subsequently, the light sensing device 600 can detect the object 602, but also determine its position on the x-y plane. With a plurality of sensors, the device's 600 sensing array pack (not shown) is similar to an image sensor made of many pixels. That is, each sensor has a specific view region of the x-y plane; and thereby, each sensor is associated with an x-y position. For example, in FIG. 33B, the device 600 observes the box shaped object 602 is in the upper half of the x-y plane. Understandably, with more sensors and varied film images, the device 600 would be capable of even greater sensing resolution. Further, other kinds of objects may be detectable by the device 600, such as a human hand for hand gesture input, or a walking pedestrian for toll counting, although other object types and applications are clearly contemplated as being within the scope of the present invention.

Figure 34A:
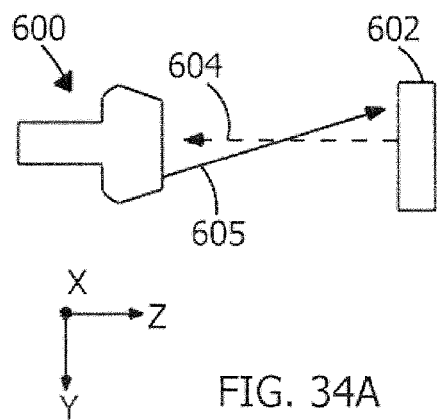
FIG. 34A is a side view of the third embodiment with an object that is far away.

For instance, thereshown in FIG. 34A, 34B, 35A, 35B is the light sensing device 600 determining the distance to an object—or object ranging. That is, FIG. 34A is a side view showing the light sensing device 600 aimed at a distant object 602. Further, the device 600 can sense a light view path 604 and region on the surface of the object 602. In addition, the device 600 produces an infrared light beam 605, which is narrow and bright. The light beam 605 is emitted by the infrared emitter 614, in FIG. 29, and filtered by the spot image film 644, in FIG. 30. Then in FIG. 35A, the device 600 is constructed so that the infrared light beam 605 converges towards the device's light view path 604. More importantly, note that the infrared light beam 605 illuminates a bright spot on the object's 602 surface above the light view path 604.

Figure 34B:
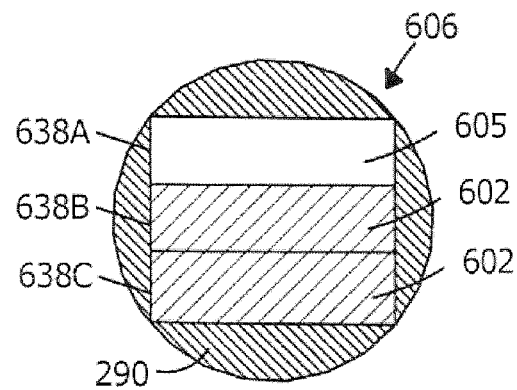
FIG. 34B is a front view of the third embodiment's light sensor view, indicating that the object is far away.

Now turning to FIG. 34B, a sensor view 606 from within the device is presented. The sensor view 606 corresponds to an aggregated view made by the three photodiodes of the three view regions 638A, 638B, 638C (shown earlier in FIGS. 31A, 31B, 31C). As noted in FIG. 34B, the outer black background 290 of the sensing film images (shown earlier in FIG. 30) blocks the inbound light. However, the upper view region 638A observes the infrared light beam 605 on the object's 602 surface; thereby, the view region 638A appears bright. The other two view regions 638B, 638C are observing the unlit surface of the object 602; thereby appearing dark.

Figure 35A:
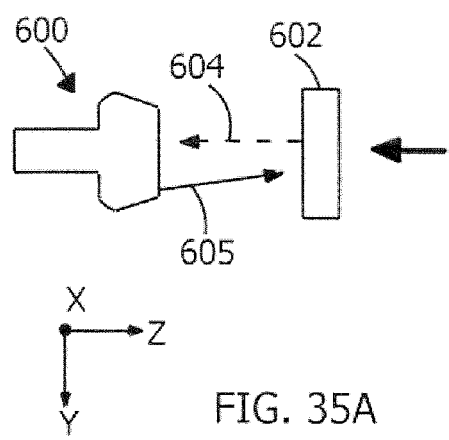
FIG. 35A is a side view of the third embodiment with an object is nearby.

Now turning to FIG. 35A, a second side view is shown of the light sensing device 600 aimed at the object 602. Again, the device can sense the object 602 along a light view path 604. However, this time, the object 602 has been moved closer to the device 600, shortening the light view path 604 and the infrared light beam 605. Moreover, the infrared light beam 605 has now illuminated a bright spot on the object's 602 surface below the light view path 604.

Figure 35B:
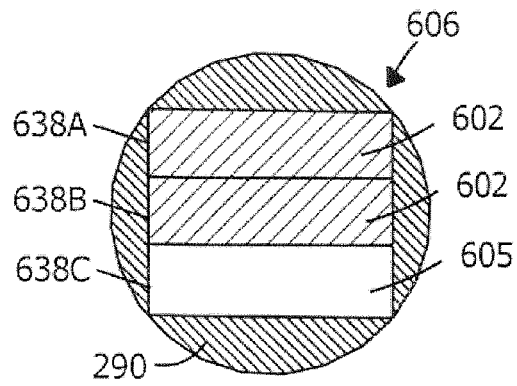
FIG. 35B is a front view of the third embodiment's light sensor view, indicating that an object is nearby.

So turning to FIG. 35B, the sensor view 606 from within the device is presented again. Again, the sensor view 606 shows the black background 290 of the associated film image blocking the inbound light. However, now the view regions 638A, 638B show the unlit object 602. Further, the lower view region 638C now observes the infrared light beam 605 on the object's 602 surface; thereby, the view region 638C appears brightly lit.

Subsequently, referring to both FIGS. 34A and 35A, the light sensing device 600 can determine the range or distance to the object 602 using invisible, infrared light. That is, the device 600 can activate its infrared light beam 605, and collect and retain a list of signal values read from multiple light sensors in the sensor array pack (not shown) included in the device 600. Then by comparing the signal values over an interval of time, the light sensing device 600 can detect a light intensity change across a plurality of sensing view regions. Using a technique of triangulation, the device 600 can determine the distance between itself and the object 602. Distance ranging by triangulating light beams requires a converging or diverging angle between the light beam and the view path. Understandably, the distance ranging may be conducted on other kinds of objects, such as an approaching ball in a sports game, or a receding shipping package on a conveyer belt, although other objects and distance ranging applications are clearly contemplated as being within the scope of the present invention.

Referring back to FIGS. 27 and 28, the light sensing device 600 can also modify the view region according to device context. As stated earlier, the device's control unit 120 is in operative association with the accelerometer 210 that generates a move signal when device's handle 202 is moved by a user. Subsequently, the control unit 120 can modify the read sequence for a plurality of light sensors in the sensing array pack 630, according to the direction of movement.

For example, if a user grasps the handle 202 of the light sensing device 600 and swings the device upwards, the device reads a view region on the top side of the projection surface (not shown). If the user swings the device to the downward, the device reads the view region on the bottom side of the projection surface (not shown). Moreover, if an object is detected by the light sensing device 600, the control unit 120 may activate a white light emitter (not shown) to project an illuminated, visible image on the surface of the detected object, such as a yellow yield sign. If the object moves closer to the light sensing device 600, the control unit 120 activates another white light emitter (not shown) and a red stop sign is illuminated on the object. Further, the control unit 120 may activate the sound generator 212 to produce a beep tone indicating an object has been detected nearby Clearly any type of sensing view region shapes, projected light images, and sound effects may be incorporated into the light sensing device 600.

Figure 36A:
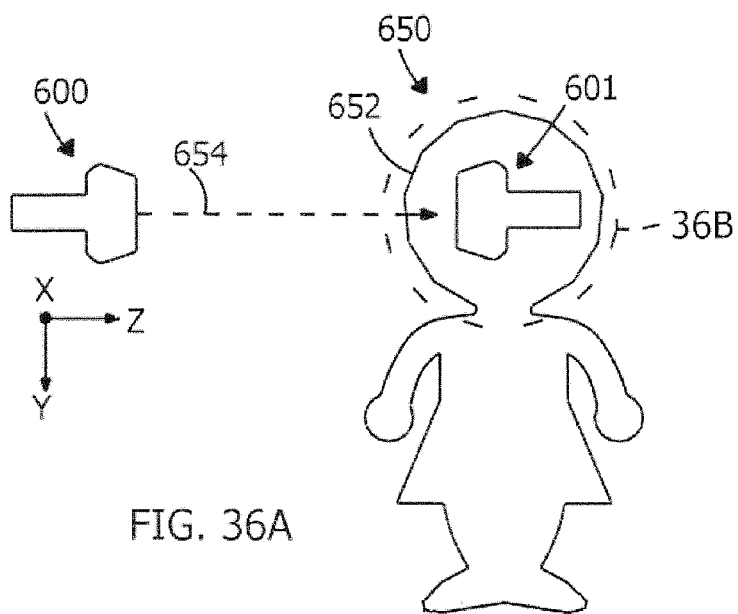
FIG. 36A is a side view of the third embodiment defined sending a data message to a responsive object.
Figure 36B:
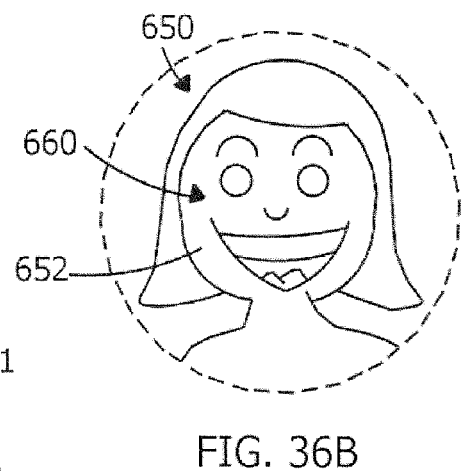
FIG. 36B is a close-up, front view of the third embodiment's responsive object.
Figure 36C:
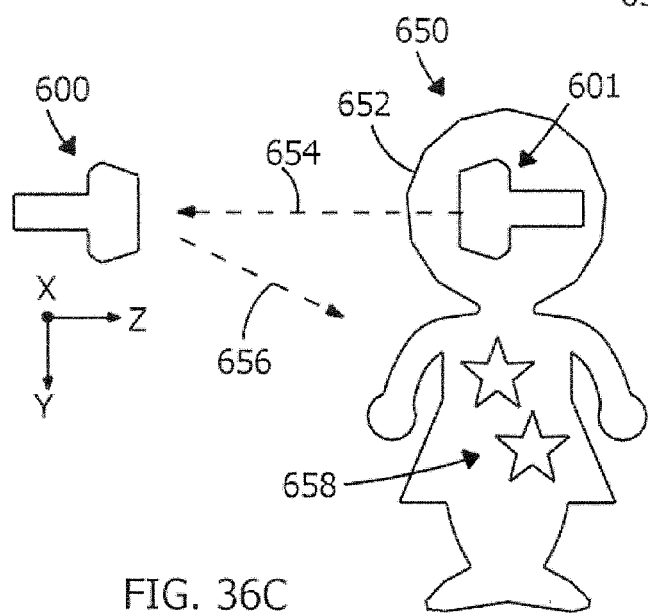
FIG. 36C is a side view of the third embodiment receiving a data message from the responsive object.

Remarkably, shown in FIGS. 36A, 36B, 36C, the light sensing device 600 also has the ability to communicate with a remote object as well. Preferably, the light sensing device 600 uses modulated, data encoded light to send and receive information. So thereshown in FIG. 36A and FIG. 36C is a first light sensing device 600 pointed towards a responsive object 650, about two meters away. As can be seen, the responsive object 650 is a toy doll that contains within its body a second light sensing device 601. Keep in mind both the first light sensing device 600 and second light sensing device 601 are constructed in a similar manner. That is, both devices contain the sensing array pack (not shown). Further, the responsive object 650 is made of a light-transmissive covering 652, such that light can pass between its exterior and interior.

Turning specifically to FIG. 36A, a side view is presented of the first light sensing device 600 creating an encoded infrared light beam 654. To transmit a data message, the control unit (not shown) of the first light sensing device 600 modulates the infrared LED 610 contained on its sensing light array 632, as shown earlier in FIG. 29. The modulation process involves taking the digitally represented data message, such as the message "Make me laugh," and converting the data bits into a light modulated encoding (e.g. Manchester, variable rate, etc.) known in the art. Subsequently, in FIG. 36A, the modulated infrared light moves forward along the z-axis of light sensing device 600, and exits from the device, creating the encoded infrared light beam 654.

Then when the encoded infrared light beam 654 happens to sweep over the surface of the responsive object 650, the light passes through the light-transmissive covering 652. Whereupon, the second light sensing device 601 receives the encoded infrared light beam 654 from the first light sensing device 601.

To demodulate the encoded light, the second light sensing device 600 has its control unit (not shown) monitor the infrared photodiode 611 contained on its sensing light array 632, as shown earlier in FIG. 29. The demodulation process involves the control unit monitoring the photodiode and converting its light intensity signal into data bits of the digitally represented data message. The same light modulated encoding scheme is used for both sending and receiving. As a result, in FIG. 36A, the encoded infrared light beam 654 is received by the second light sensing device 601 and decoded back into the data message reading: "Make me laugh."

Having received the data message, the second light sensing device 601 can respond in a meaningful way. For example, in FIG. 36B, the second device's 601 control unit has activated white LEDs (not shown) so that an illuminated face 660 is projected onto the light-transmissive covering 652. Whereby, on the exterior of the responsive object 650, the animated, illuminated face 660 delightfully appears. The second device's 601 control unit then activates the sound generator (not shown) and produces the accompanying sound of a giggling girl.

Turning now to FIG. 36C, the responsive object 650 can also send a message, such as "I'm happy," to the first light sensing device 600. Since the responsive object 650 also contains the light sensing device 601, the data messaging is exactly the same. The light sensing device 601 transmits an encoded infrared light beam 654, which passes through the light-transmissive covering 652 and moves towards the first light sensing device 600. Subsequently, the first light sensing device 600 receives the data encoded light and deciphers the message: "I'm happy."

The first device 600 responds by activating white LEDs (not shown) so that a visible light beam 656 is projected forth, creating illuminated spinning stars 658 that appear on the responsive object 650. In addition, the first device 600 also activates its sound generator (not shown) and plays a musical harp.

Understandably, other kinds of data requests and responses are possible as well. In fact, the light sensing device 600 and responsive object 650 can come in many forms, such as a wand, fishing pole, doll, vehicle, airplane, pen, ball, hat, shoe, ring, book, lamp, or bulletin board, although other alternatives are clearly contemplated as being within the scope of the current invention.

Fourth Embodiment—Tiled Image Display Device with Clustered Array Pack

Figure 37:
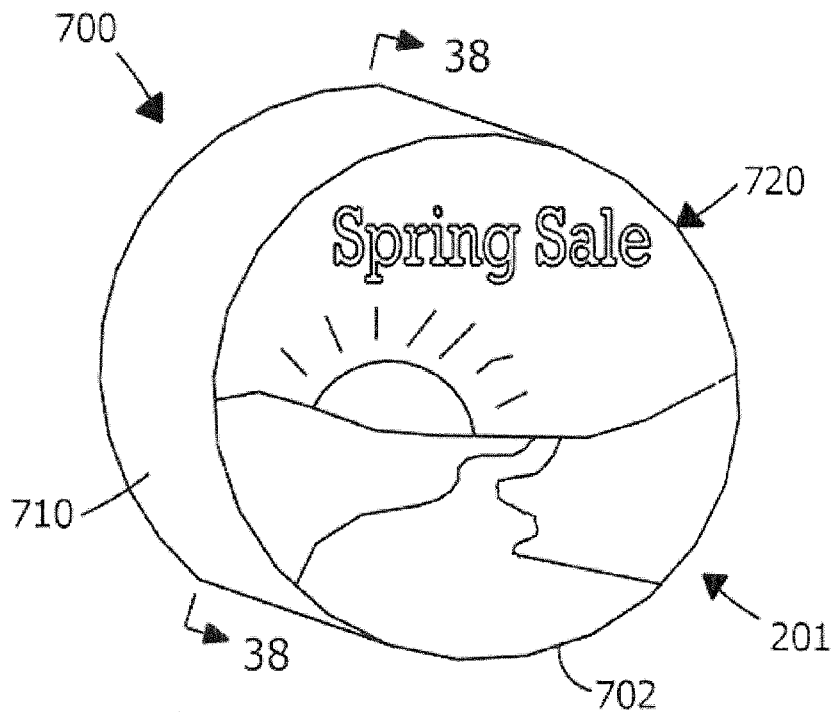
FIG. 37 is a perspective view of the fourth alternative embodiment of a tiled display device, containing a clustered array pack.
Figure 38:
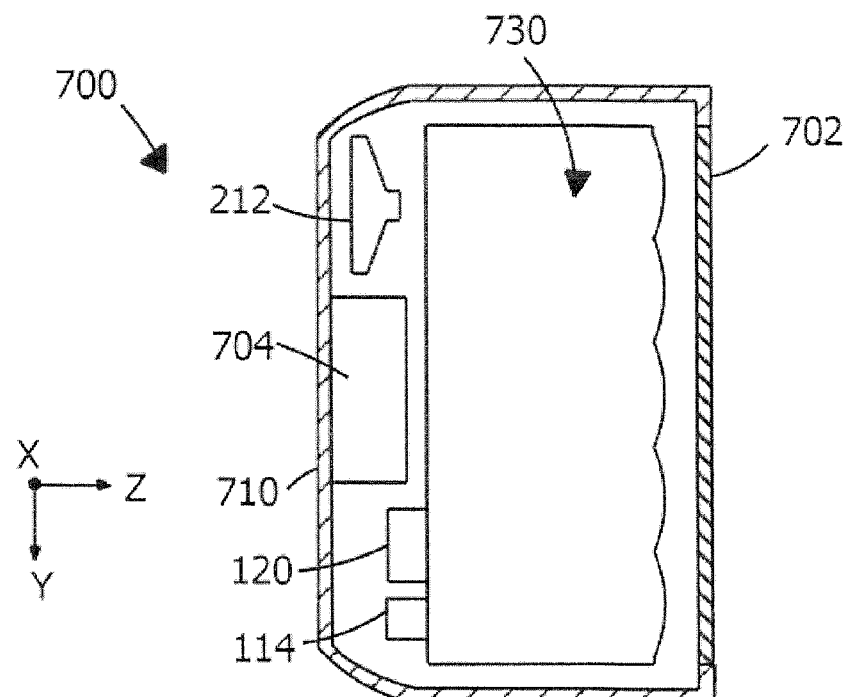
FIG. 38 is a section view of the fourth embodiment of the tiled display device, containing the clustered array pack.

In FIGS. 37 and 38 an alternative fourth embodiment is shown, referred to as a tiled display device 700. The tiled display device 700 is similar in construction to the first embodiment. Whereby, in the fourth embodiment, similar reference numerals are utilized for common components with respect to the first embodiment shown in FIGS. 2-18.

Thereshown in FIGS. 37-38, the tiled display device 700 has the shape of a round platter that includes a panel housing 710 that forms the sides and back. The panel housing 710 is made of a rigid, light-opaque material, such as metal. At the projection face 201, the tiled display device 700 includes a translucent display screen 702 that is back-lit with an illuminated tiled image 720 of an advertisement having a picturesque landscape and text. Turning specifically to FIG. 38, thereshown is a section view of the tiled display device 700. The device 700 includes a clustered array pack 730, which can project a tiled image onto the translucent display screen 702. The clustered array pack 730 is an alternate version of the array disk pack of the first embodiment (not shown). Further, the clustered array pack 730 is light sensitive; whereby, the translucent display screen 702 is touch sensitive. Mounted behind the clustered array pack 730 is a sound generator 212 that produces auditory feedback to the device users. In addition, a power supply unit 704 provides energy to the device Being multi-functional, the power supply unit 704 may be connected to an exterior power conduit, or rely on a rechargeable battery pack for portability. A memory unit 114 provides data storage. Nearby, a control unit 120 is in operative association with the clustered array pack 730, memory unit 114, sound generator 212, and power supply unit 704.

Figure 39:
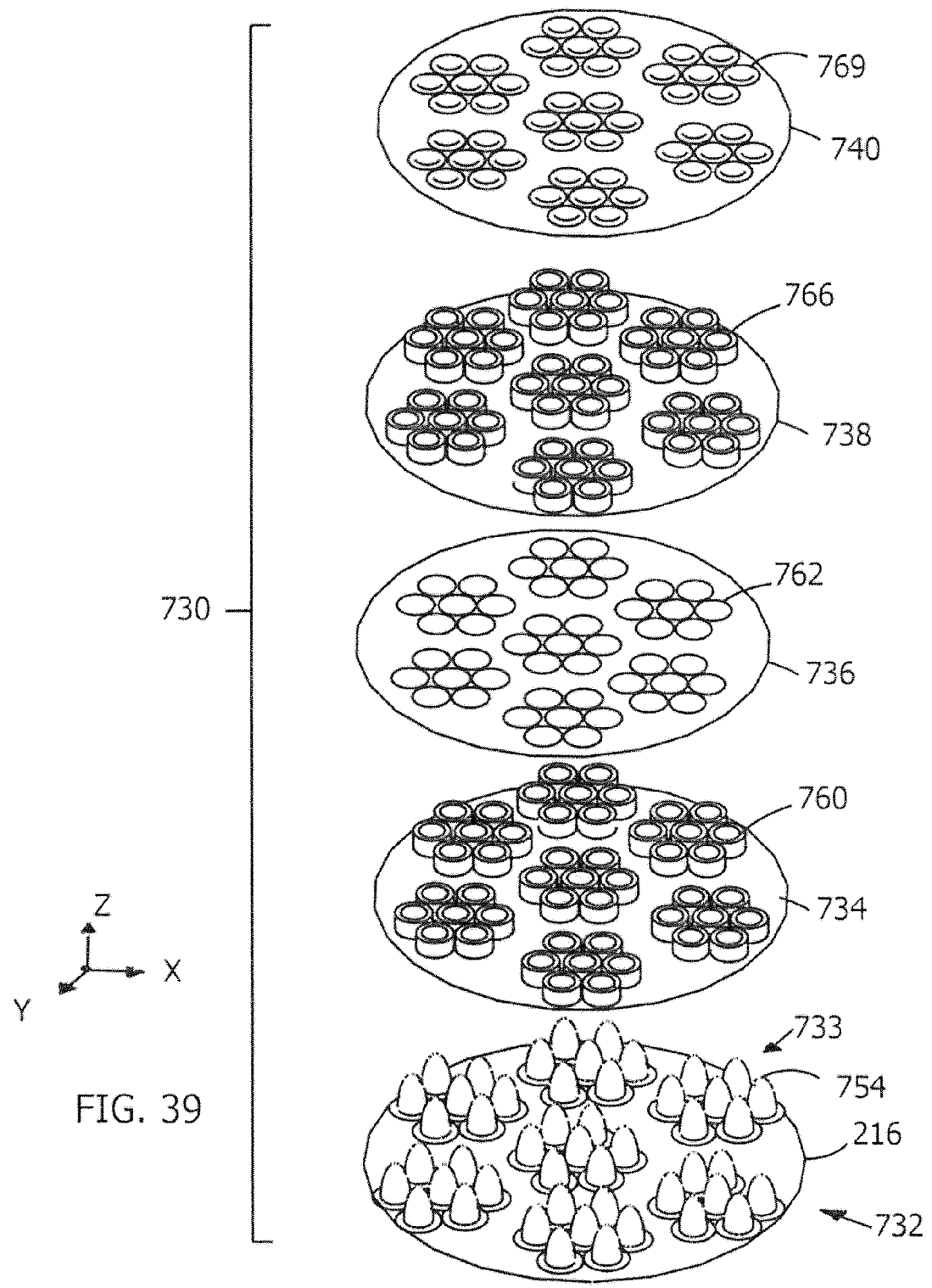
FIG. 39 is an exploded view of the fourth embodiment's clustered array pack.

Turning now to FIG. 39, an exploded view of the clustered array pack 730 can be seen. The clustered array pack 730 is comprised of an assembly of five components: a clustered light array 732, clustered primary light guide 734, clustered image film 736, clustered secondary light guide 738, and clustered bug-eyed lens 740. The term "cluster" is meant to encompass all possible means to group or aggregate array elements such as light sources/sensors, light guides, and lens.

So to begin, thereshown at the bottom of FIG. 39 is the clustered light array 732 composed of a printed circuit board 216 that contains a plurality of cluster regions 733. Each cluster region 733 contains white LEDs 754 mounted on the printed circuit board 216, which are operatively associated with the control unit (not shown). The cluster region 733 also contains an infrared sensor and emitter (not indicated), which will be discussed later in further detail.

Above the clustered light array 732 can be seen the clustered primary light guide 734. The clustered primary light guide 734 is a thermoformed and die-cut polyethylene sheet that is light-opaque. As shown, there are primary openings 760 molded into the clustered primary light guide 734. During assembly, the clustered primary light guide 734 fits snugly over the clustered light array 732, where each primary walled opening 760 slides over each white LED 754, forming a light seal against the white LEDs 754 and printed circuit board 216. The clustered primary light guide 734 is fixed onto the clustered light array 732 using various fastening techniques, such as glue, pins, screws, or a friction fit.

Above the clustered primary light guide 734 can be seen the clustered image film 736. As shown, the clustered image film 736 contains distinct film images 762 on the surface of a transparent plastic acetate sheet. The film images 762 may be printed or photo-processed with opaque and translucent color dyes or inks, such that filtered light passes through the clustered image film 736. During assembly, the clustered image film 736 is placed atop the clustered primary light guide 734 and may be fixed with glue, pins, screws, or a friction fit.

Above the clustered image film 736 can be seen the clustered secondary light guide 738. The clustered secondary light guide 738 is made in a similar manner and material as the clustered primary light guide 734. Further, the secondary light guide disk 738 contains secondary openings 766, which further control the light that exits from the clustered image film 736. During assembly, the clustered secondary light guide 738 is fastened to the clustered primary light guide 734, trapping the clustered image film disk 736 between the parts. The clustered secondary light guide 734 may be attached with glue, pins, screws, or a friction fit.

Finally, thereshown above the clustered secondary light guide 738 is the clustered bug-eyed lens 740. The clustered bug-eyed lens 740 is an injection-molded part of optically clear acrylic polymer and contains double-convex lens 769 molded into its surface. Each double-convex lens 769 is 14 mm in diameter and has a focal length of about 20 mm. During assembly, the clustered bug-eyed lens 740 is fastened to the clustered secondary light guide 738 using glue, pins, screws, or a friction fit.

Preferably, all five components of the clustered array pack 730 fit together as keyed interlocking pieces. That is, there is only one way the components can be assembled to avoid any assembly errors. In addition, it is preferred that the clustered image film 736 can be easily replaced so that the current embodiment can display an alternative set of images. For example, the clustered secondary light guide 738 may unsnap from the clustered primary light guide 734, so that the clustered image film 735 can readily be removed and replaced. Finally, an assembly technique has been presented for the clustered array pack 730, although other construction types are clearly contemplated as being within the scope of the present invention. For example, the clustered bug-eyed lens 740 may be comprised of optical lens panels snapped into a fiberglass framework.

Fourth Embodiment—Design with Parallel Light Beams

Figure 40:
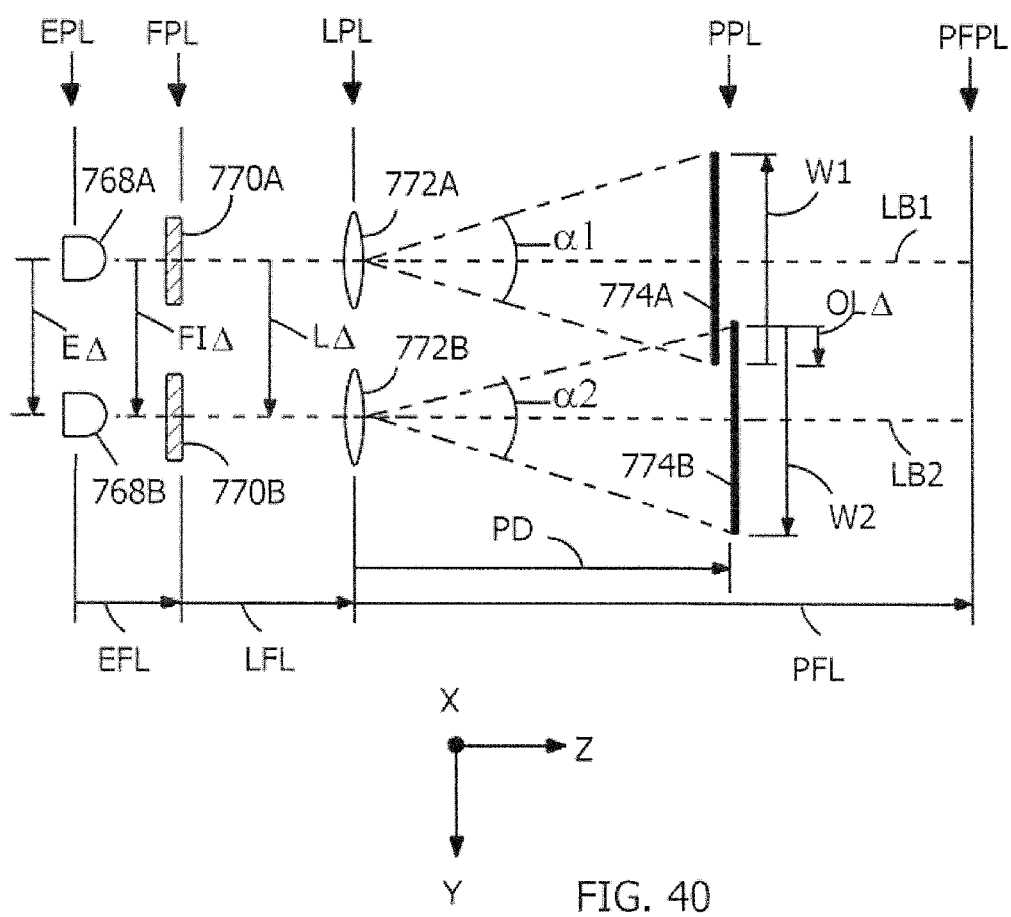
FIG. 40 is a geometrical diagram of the fourth embodiment's array pack having two parallel light beams that create a tiled image.

Turning now to FIG. 40, thereshown is a simplified, geometrical layout of array projection that uses two parallel light beams to create a tiled image. The intended use of the layout is to provide mathematical and design information for positioning the clustered array pack components. As can be seen, the layout is comprised of a first light cluster 768A and a second light cluster 768B that exist on light emitter plane EPL. The first light cluster 768A and the second light cluster 768B are separated by spatial distance of a light emitter delta EΔ. Further, the layout is also comprised of a first film image cluster 770A and a second film image cluster 770B that exist on film plane FPL. The first film image cluster 770A and the second film image cluster 770B are separated by spatial distance of film image delta FIΔ. Finally, the layout includes a first lens cluster 772A and second lens cluster 772B that exist on lens plane LPL. The first lens cluster 772A and the second lens cluster 772B are separated by spatial distance of lens delta LΔ.

As can be seen in FIG. 40, there are two light beams defined in the layout: 1) a first light beam LB1 that contains the first light cluster 768A, first film image cluster 770A, and first lens cluster 772A that creates a first projected image 774A; and 2) a second light beam LB2 that contains the second light cluster 768B, second film image cluster 770B, and second lens cluster 772B that creates a second projected image 774B. Abstractly speaking, the light beams LB1 and LB2 are adjacent light beams that may exist anywhere on the x-y plane within the clustered array pack (not shown). Both light beams LB1 and LB2 are always parallel to each other and the z-axis. Also, note that beyond the cluster lens 772A, 772B, the light beams LB1, LB2 refract into ever widening, projection beams. That is, light beam LB1 has a projection angle α1 and light beam LB2 has a projection angle α2.

Forward of the optical elements along the light beam paths is the projection plane PPL, which represents the projection surface. As shown, both light beams LB1, LB2 intersect the projection plane PPL and are separated by a spatial distance referred to as a projected image delta PIΔ. The projected image delta PIΔ is the amount of separation that two projected images 774A, 774B will have on the projection surface when using the two-beam layout of FIG. 40. Further, the projected images 774A, 774B overlap by an image overlap delta IOΔ.

Measuring along the z-axis, the emitter focal length EFL is the distance between the light emitter plane EPL and the film plane FPL. The lens focal length LFL is the distance between the film plane FPL and the lens plane LPL. The projection distance PD is the distance between the lens plane LPL and the projection plane PPL, which varies according to how close or far the projection device is from the projection surface. Finally, the projection focal length PFL is the distance between the lens plane LPL and the projection focal plane PFPL, where both projected images have the desired image overlap delta IOΔ.

Using the geometric layout in FIG. 40 as a reference, a collection of math formulas are provided to assist in the current embodiment's design, although other mathematical approaches are clearly contemplated as being within the scope of the current embodiment. For two light clusters having parallel light beams LB1, LB2 that create a tiled image, the following are assumed to be true:

LB1∥LB2
EΔ=FIΔ=LΔ=PIΔ
α1=α2
W1=W2

Since the projected images are tiled together to create a larger image, various tiling patterns may be used such as squares, triangles, etc. For the current embodiment, the tiled image will be constructed of tightly packed hexagon shapes. Whereby, the following ratio is given defining a hexagon's minimum width (side to side) in respect to its maximum width (outer diameter):

$$W_{min\_hex} = \frac{\sqrt{3} \cdot W_{max\_hex}}{2}$$

where
Wmin_hex is the minimum width of a hexagon shape.
Wmax_hex is the maximum width of a hexagon shape.

As a result, a tile scaling factor given below should be included in the subsequent math formulas:

$$\text{tile\_scale} = \frac{\sqrt{3}}{2}$$

where
tile_scale is the scaling factor that is dependent on the tiling pattern shape. If a different tiling pattern is used, simply replace the above scaling factor.

In FIG. 40, the formula below defines the projected image width W1 given a specific projection angle α1 and projection distance PD:

$$W1 = \tan\left(\frac{\alpha 1}{2}\right) \cdot 2 \cdot PD \cdot \text{tile\_scale}$$

The formula below defines the projected image delta PIΔ between two tiled images given a specific image overlap delta IO:

PIΔ=W1−IOΔ

Substituting terms, the formula below defines the projected image delta PIΔ given the projection distance PD and image overlap delta IOΔ:

$$PI\Delta = 2 \cdot PD \cdot \text{tile\_scale} \cdot \tan\left(\frac{\alpha 1}{2}\right) - IO\Delta$$

Whereupon, the formula below defines the projection distance PD as a function of projected image delta PIΔ and image overlap delta IOΔ:

$$PD = \frac{PI\Delta + IO\Delta}{2 \cdot \text{tile\_scale} \cdot \tan\left(\frac{\alpha 1}{2}\right)}$$

The critical formula below defines a light array system having parallel beams of light:

EΔ=FIΔ=LΔ

Fourth Embodiment—Dimensions of the Clustered Array Pack

Referring again to FIG. 40, a few design assumptions can be made for the array clusters. For example, the projection distance PD is invariant since the distance between the lens and display surface does not vary, so PD=PFL. In addition, no image overlap is desired for the current embodiment. So the following dimensions and angles are defined for the array cluster layout:
PFL=PD=0.10 meters
α1=α2=30.0 degrees
IOΔ=0.0 meters Then using the above math formulas for parallel light beams, the projected image delta PIΔ between the array clusters is computed:
PIΔ=50 mm Moreover, each array cluster contains individual emitters, film images, and lens that require design criteria:

emitter focal length EFL=12 mm (gap between emitters and film)
lens focal length LFL=20 mm (dependent on lens convexity and focal length)
emitter delta EΔ=15 mm (based on fixed spacing between the emitters)

Further, each array cluster will create an overlaid image using converging light beams. So the math formulas of the first embodiment will be used to make the following computations. The convergence angle and spatial distances between the individual film images and lens are then computed:
converge angle θ=6.5 degrees
film image delta FIΔ=13.7 mm
lens delta LΔ=11.4 mm Now it's time to layout the clustered array pack. So turning to FIG. 41A, thereshown is a top view of the clustered light array 732. In FIG. 41B, a close-up top view of the clustered light array 732 is presented showing a single cluster region 733 of light emitters and sensors positioned on a hexagon lattice. The cluster region 733 contains five white LEDs 754, an infrared emitter 752, and an infrared sensor 750. Preferably, each white LED 754 is 10 mm in diameter, having an emission angle of 10 degrees, and produces a brilliant white light of at least 20,000 millicandela. Since there are five white LEDs 754, the display device will be capable of displaying up to five distinct tiled images. Further, the infrared sensor 750 has a view angle of 15 degrees and detects infrared light at 880-950 nanometers wavelength. The infrared LED 752 has an emission angle of 15 degrees and produces infrared light of 880-950 nanometers wavelength. Finally, the white LEDs 754, infrared sensor 750, and infrared emitter 752 are all thru-hole mounted on the printed circuit board 216 and operatively coupled to the control unit (not shown).

Turning to FIG. 42A, a top view can be seen of the clustered primary light guide 734. In FIG. 42B, a close-up top view of the clustered primary light guide 734 is shown with a cluster of openings comprised of a center primary opening 756 and outer primary openings 758. Again, the primary openings 756, 758 have been positioned on a hexagonal lattice, such that each opening is over an underlying light source or sensor (shown in FIG. 41B).

Figure 43A:
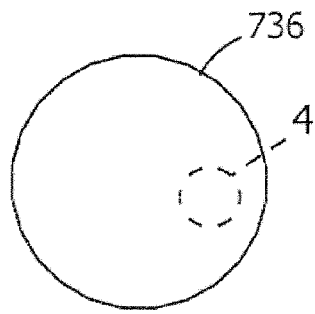
FIG. 43A is a top view of the fourth embodiment's clustered image film.
Figure 43B:
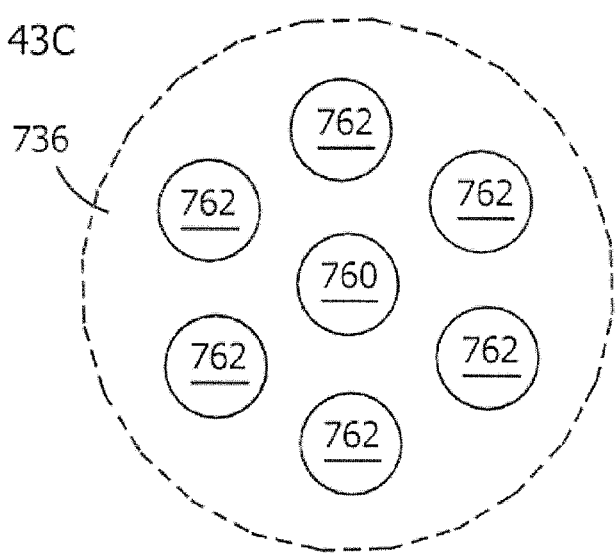
FIG. 43B is a close-up view of the fourth embodiment's clustered image film.
Figure 43C:
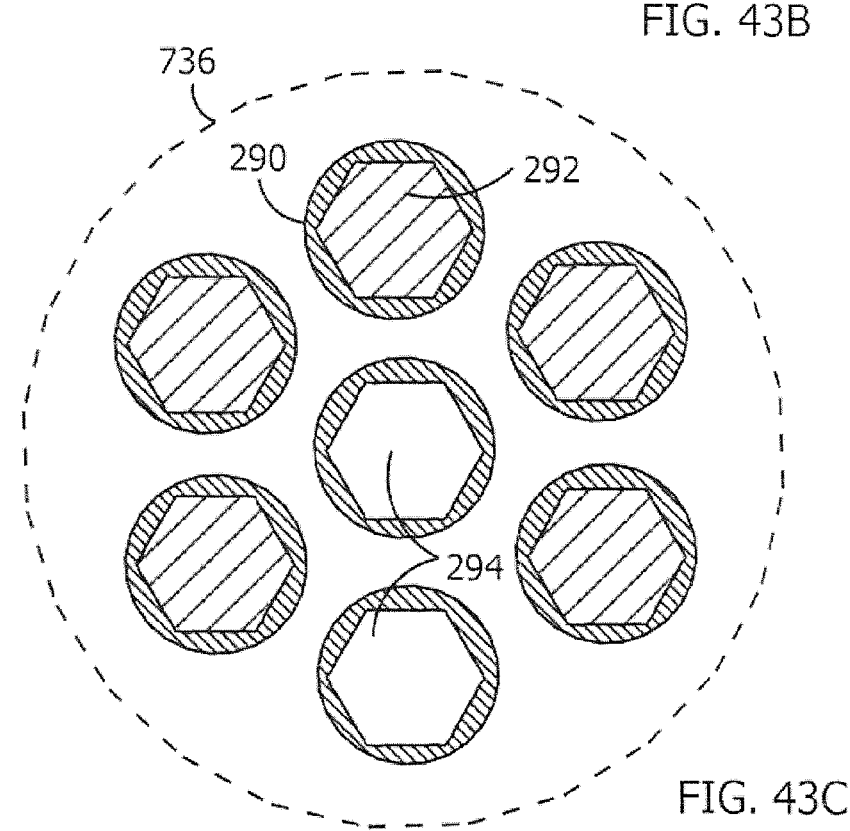
FIG. 43C is a close-up view of the fourth embodiment's clustered image film, containing a background of hexagon shapes.

Turning to FIG. 43A, a top view can be seen of the clustered image film 736. In FIG. 43B, a close-up top view of the clustered image film 736 is shown with a cluster of film images comprised of a center film image 760 and outer film images 762. Again, the film images 760, 762 have been positioned on a hexagonal lattice, such that each film image is over an underlying primary opening (shown in FIG. 42B). Thereshown in FIG. 43C is a close-up top view of the clustered image film 736 showing seven hexagon-shaped, film images. The images have a black background 290 that is printed of opaque black ink, a colored foreground 292 of translucent colored ink, and a transparent foreground 294. Whereby, when light is transmitted through the film images, the light is blocked by the black background 290, filtered by the colored foreground 292, and unaltered by the transparent foreground 294.

Figure 44A:
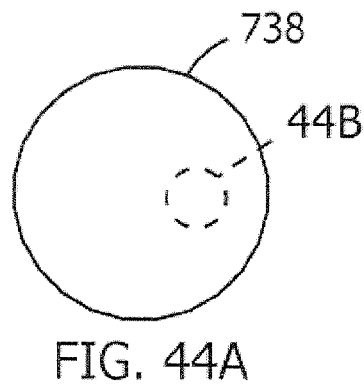
FIG. 44A is a top view of the fourth embodiment's clustered secondary light guide.
Figure 44B:
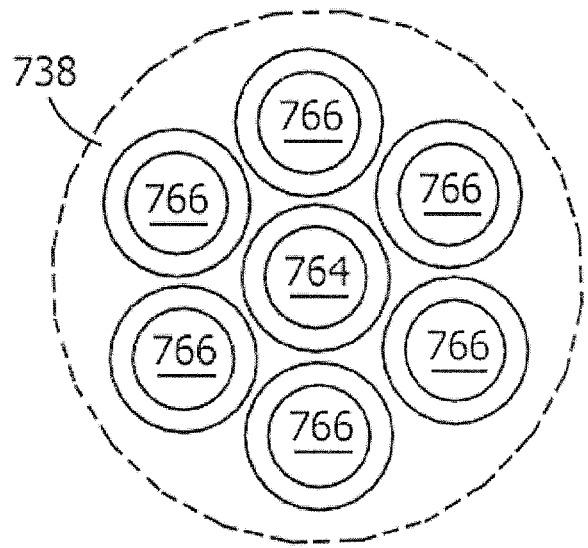
FIG. 44B is a close-up view of the fourth embodiment's clustered secondary light guide.

Turning to FIG. 44A, a top view can be seen of the clustered secondary light guide 738. In FIG. 44B, a close-up top view of the clustered secondary light guide 738 is shown with a cluster of secondary openings comprised of a center secondary opening 764 and outer secondary openings 766. Again, the secondary openings 764, 766 have been positioned on a hexagonal lattice, such that each opening is over an underlying film image (shown in FIG. 43B).

Figure 45A:
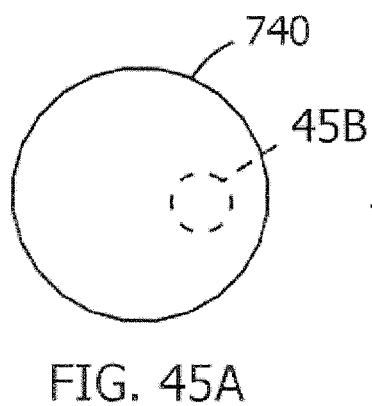
FIG. 45A is a top view of the fourth embodiment's clustered bug-eyed lens.
Figure 45B:
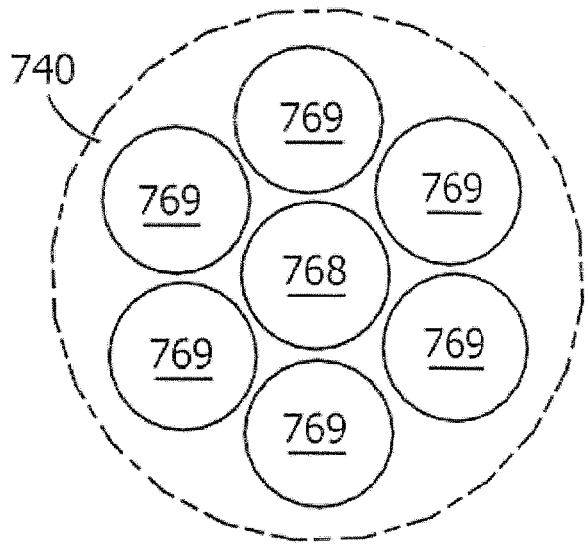
FIG. 45B is a close-up view of the fourth embodiment's clustered bug-eyed lens.

Turning to FIG. 45A, a top view can be seen of the clustered bug-eyed lens 740. In FIG. 45B, a close-up top view of the clustered bug-eyed lens 740 is shown with a cluster of convex lens comprised of a center convex lens 768 and outer convex lens 769. Again, the convex lens 768, 769 have been positioned on a hexagonal lattice, such that each lens is over an underlying secondary opening (shown in FIG. 44B).

Subsequently, the suggested physical dimensions of the clustered array pack are defined as follows:

TABLE 7

Dimensions of Array Cluster

| Figure Number | Reference Numeral | Name | Distance to Cluster Center (mm) |
| --- | --- | --- | --- |
| FIG. 41B | 750 | Center light sensor | 0.0 |
| FIG. 41B | 752, 754 | Outer white/infrared LEDs | 15.0 |
| FIG. 42B | 756 | Center primary opening | 0.0 |
| FIG. 42B | 758 | Outer primary opening | 15.0 |
| FIG. 43B | 760 | Center film image | 0.0 |
| FIG. 43B | 762 | Outer film image | 13.7 |
| FIG. 44B | 764 | Center secondary opening | 0.0 |
| FIG. 44B | 766 | Outer secondary opening | 13.7 |
| FIG. 45B | 768 | Center lens | 0.0 |
| FIG. 45B | 769 | Outer lens | 11.4 |

Fourth Embodiment—Operation of the Touch Sensitive Display Surface

Figure 46A:
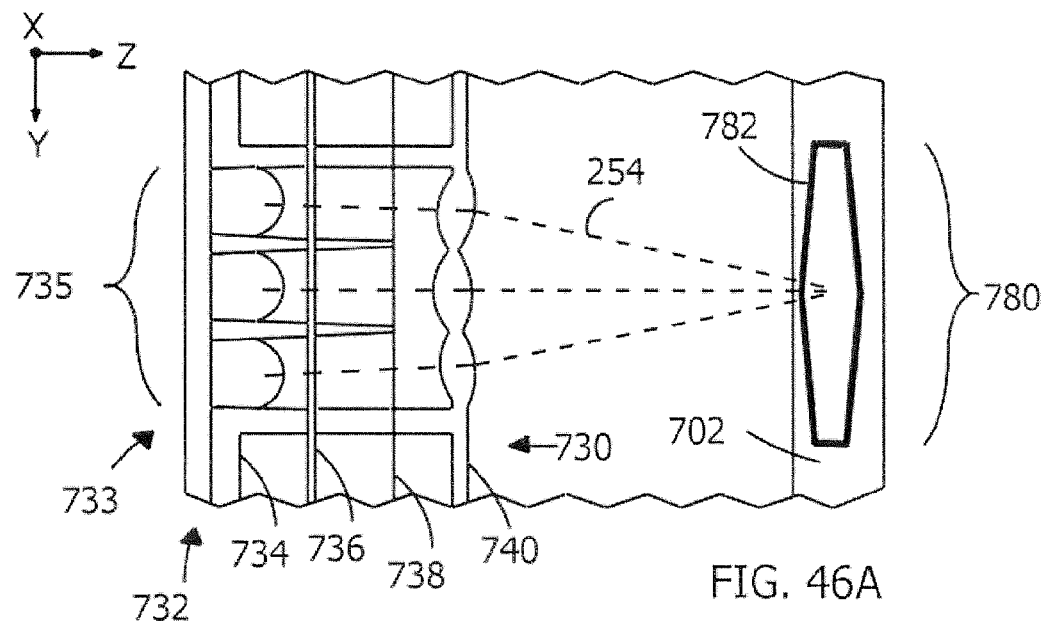
FIG. 46A is a section view of the fourth embodiment's array cluster and the display screen, showing a single, projected image cell.
Figure 46B:
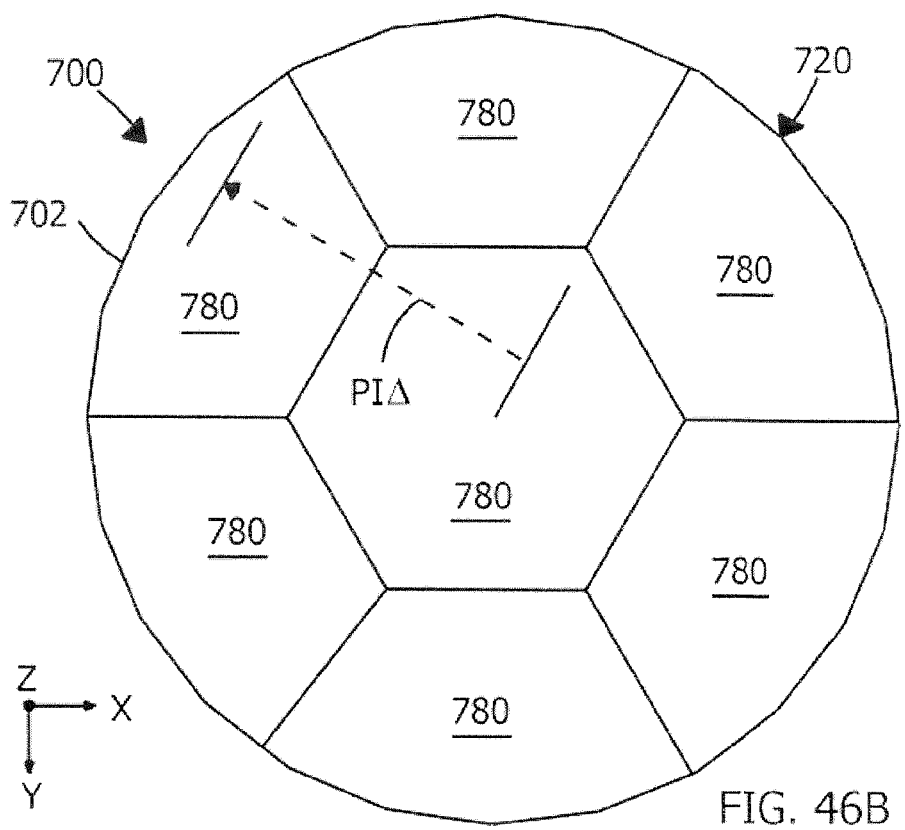
FIG. 46B is a front view of the fourth embodiment's display screen, showing a multitude of image cells within a large, tiled image.

Turning now to FIGS. 46A and 46B, the current embodiment will project multiple image cells to build a tiled image. Whereby, each array cluster lights an image cell on the display surface. So in FIG. 46A, there shown is a cutaway view of the clustered array pack 730 sitting behind the translucent display screen 702. Within the array pack 730 is an array cluster 735 comprised of the cluster region 733 of the clustered light array 732, clustered primary light guide 734, clustered image film 736, clustered secondary light guide 738, and clustered bug-eyed lens 740.

In operation, the array cluster 735 produces beams of light that move forward through the pack, exiting as converging light beams 254. The light beams 254 then converge on the backside of the display screen 702, producing an illuminated image cell 780 that is a colored image having a hexagon shape 782. Since the display screen 702 is translucent, the illuminated image cell 780 is readily visible from the exterior of the device.

Then turning to FIG. 46B, there shown is the result of a plurality of array clusters in operation that create the large, illuminated tiled image 720. For purposes of explanation, all of the illuminated image cells 780 have been delineated on the display screen 702. However, during operation the illuminated image cells 780 would typically blend and fit together producing a large, coherent image having no outlined regions on the display screen 702. In addition, each illuminated image cell 780 is separated by the projected image delta PIΔ=50 mm, which was computed earlier.

Figure 47A:
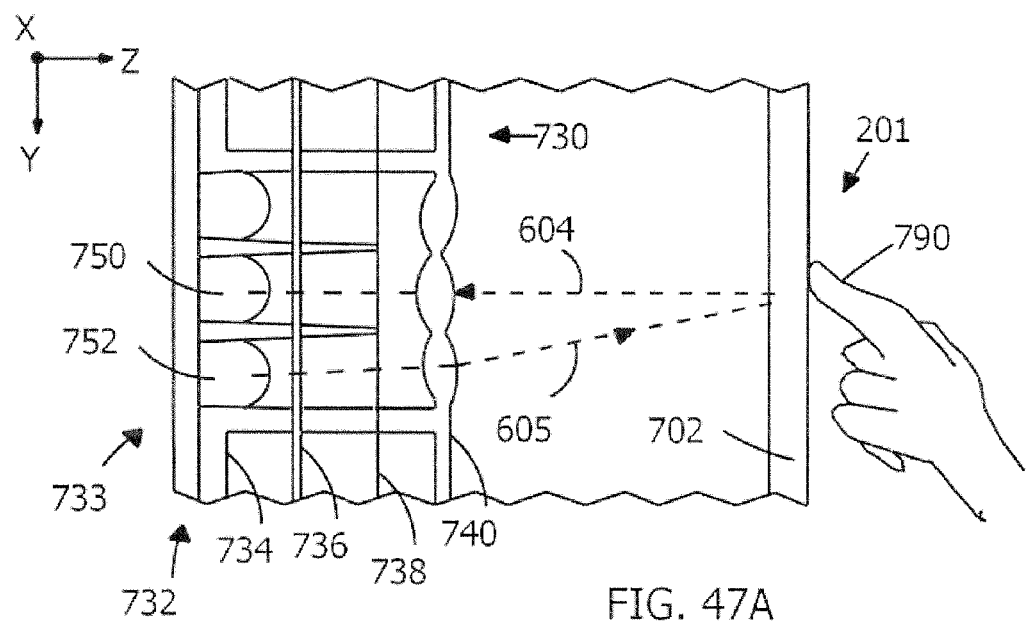
FIG. 47A is section view of the fourth embodiment's touch sensitive display screen.

Turning now to FIG. 47A, there shown is cutaway section view of the clustered array pack 730 with the display screen 720 that is touch sensitive. As noted on the right of FIG. 47A, a human fingertip 790 is touching the display screen 720 at the projection face 201. Specifically, FIG. 47A shows the cluster region 733 portion of the clustered light array 732, clustered primary light guide 734, clustered image film 736, clustered secondary light guide 738, and clustered bug-eyed lens 740. In addition, the cluster region 733 is comprised of the infrared sensor 750 and the infrared emitter 752, which are both operatively associated with the control unit (not shown).

To start the touch sensing operation in FIG. 47A, the infrared emitter 752 is turned on by the control unit (not shown), producing an infrared light beam that passes through the clustered primary light guide 734 and the clustered film image 736. Subsequently, the beam then passes through the clustered secondary light guide 738 and clustered bug-eyed lens 740, exiting as a converging infrared beam 605. Whereupon, the infrared beam 605 illuminates an area on the backside of the display screen 702. Since the display screen 702 is translucent, the infrared light passes through the screen and illuminates the fingertip 790 that is touching the display screen 702 on the device's exterior surface.

The result being that infrared light is reflected off the fingertip 790. Whereupon, the infrared light returns along the light view path 604 towards the clustered array pack 730. Then the infrared light enters the clustered bug-eyed lens 740, passes through the clustered secondary light guide 738, and is filtered by the clustered image film 736. Whereupon, the infrared light passes through the clustered primary light guide 734 and into the infrared sensor 750 of the clustered light array 732. The infrared sensor 750 then produces an electronic signal that is in proportion to the intensity of light received, which can be read by the control unit (not shown).

Figure 47B:
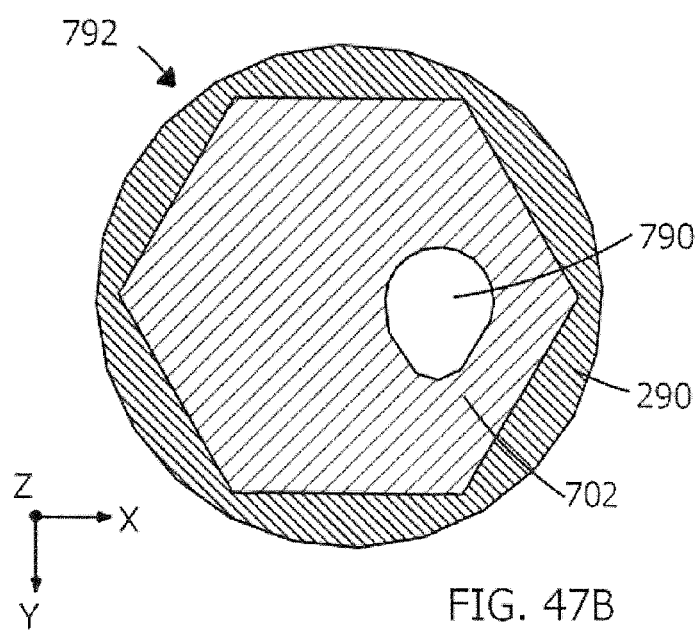
FIG. 47B is a front view of the fourth embodiment's sensor view of the display screen.

Turning now to FIG. 47B, the infrared sensor view 792 is shown. As indicated in FIG. 47B, the brightly lit fingertip 790 appears against the dark display screen 702 background. Surrounding the infrared sensor view 792 is the hexagonal shaped black background 290 of the clustered image film (as shown earlier in FIG. 44C). This ensures the view is limited to one image cell within the tiled image.

Now turning to FIG. 47A again, if the fingertip 790 moves away from the display screen 702, understandably, the fingertip 790 will disappear in the sensor view 792 of FIG. 47B. Preferably, the best light contrast occurs when the display screen 792 is made of high-density polyethylene sheet material, 2-3 millimeters thick.

Hence the described array sensing mechanism can be constructed so that the entire display screen 702 is touch sensitive. For example, the control unit (not shown) may read all of the device's infrared sensors 750 associated with all the tiled image cells at 0.1 second intervals and record a list of sensor values. Then whenever the control unit sees a substantial increase in one of the sensor values from a prior read of the same sensor, the control unit assumes a finger touch has occurred on the display screen 702. Further, the x-y coordinate of the finger touch may be determined by simply relying on the sensor's own x-y position behind the display screen 702.

Turning back to FIGS. 36 and 37, the tiled display device 700 can now be interactive, relying on the touch sensitive display screen 702. For example, as can be seen in FIG. 36, the device is displaying a picture advertisement. Subsequently, a nearby user may decide to touch a specific portion of the display screen 702, such as the "Spring Sale" text. The device's control unit (shown in FIG. 37) then detects the finger touch at the text region, and projects on the display screen 702 a new image showing a collection of shoes for sale. Moreover, the control unit activates the sound generator 212 so that enticing music accompanies the displayed shoes for sale. Other visual display features may include drop down menus or popup boxes, indicating the store address or shopping hours. Keep in mind the current embodiment can sequentially show five full size images or dozens of popup images across its display screen 702. Further, by increasing the size of the clustered array pack 730 with more light sources and images, the size of the display screen 702 is indefinite. The tiled display device 700 can operate well beyond ten meters square.

Fifth Embodiment—Tiled Image Projection Device with Rotating Array Pack

Figure 48:
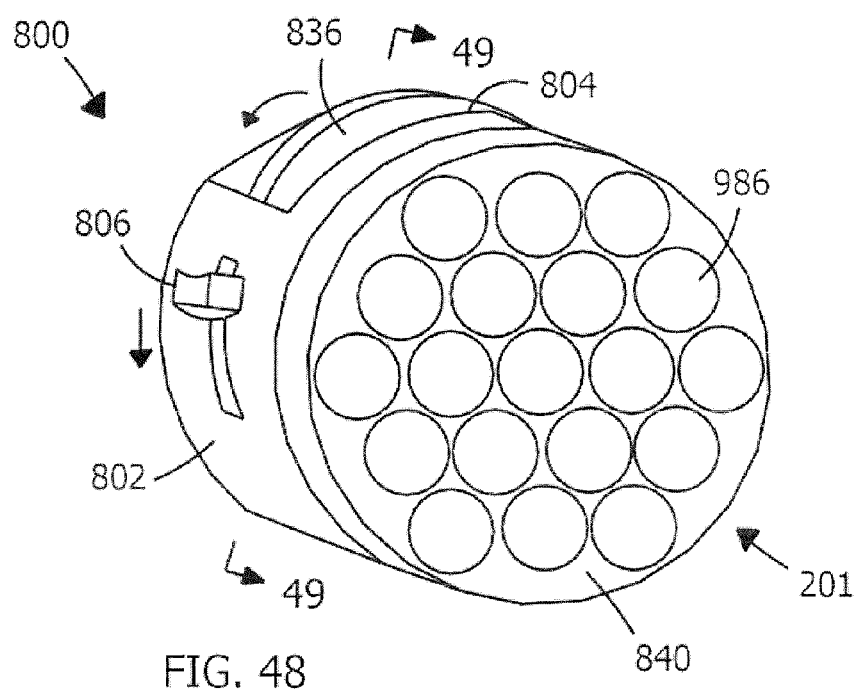
FIG. 48 is a perspective view of the fifth alternative embodiment of a rotating projection device, containing a rotating array pack.
Figure 49:
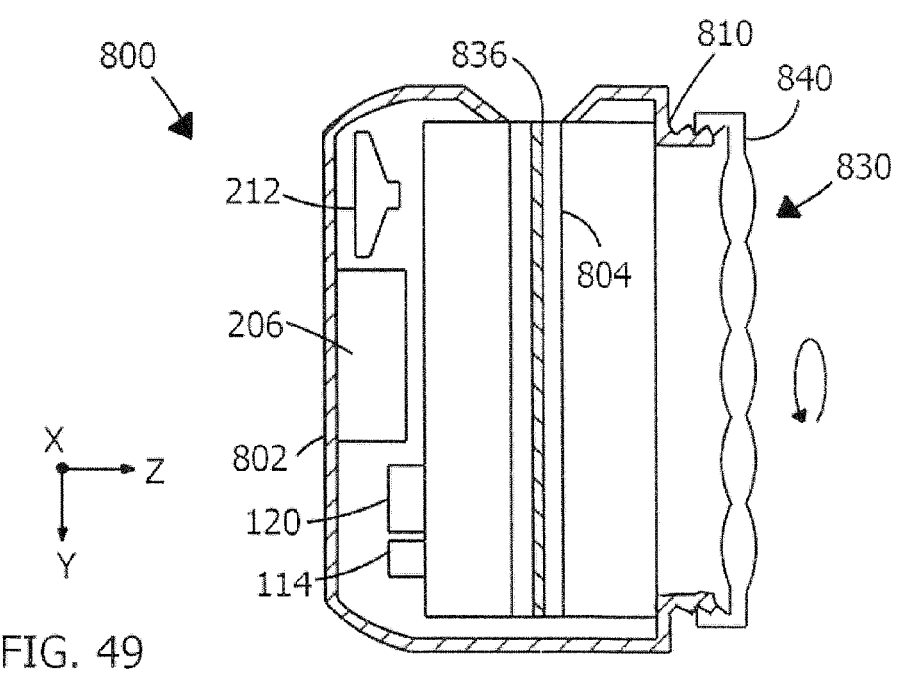
FIG. 49 is an interior view of the fifth embodiment of the rotating projection device, containing the rotating array pack.

In FIGS. 48 and 49 an alternative fifth embodiment is shown, referred to as a rotating projection device 800. The rotating projection device 800 is similar in construction to the first embodiment. Whereby, in the fifth embodiment, similar reference numerals are utilized for common components with respect to the first embodiment shown in FIGS. 2-18.

To begin, in FIG. 48 a perspective view shows the rotating projection device 800 having a round housing 802. The round housing 802 is made of a rigid, light-opaque material, such as metal, plastic, or wood. At a projection face 201, the device 800 includes a bug-eyed lens plate 840 containing a plurality of convex lens 986. At the top of the round housing 802 is a film slot 804 sized to receive a replaceable film plate 836. The replaceable film plate can be removed and replaced from the top of the device 800. At the device's side, a film shift lever 806 is mechanically linked to the replaceable film plate 836 using a ratchet and pawl like mechanism (not shown). That is, pressing down and releasing the film shift lever 806 causes the replaceable film plate 836 to rotate ⅓ turn within the device's housing.

Moving to FIG. 49, a section view is presented of the device's 800 interior. On the right side, the bug-eyed lens plate 840 is loosely threaded onto a housing barrel 810, such that the lens plate 840 can be manually gripped and turned. With detents on its thread, lens plate 840 locks into an aligned position. Further, by turning the bug-eyed lens plate 840 clockwise or counterclockwise, the lens plate 840 moves towards or away from the replaceable film plate 836 respectively.

The bug-eyed lens plate 840 is part of a rotating array pack 830, which is an alternate version of the array disk pack of the first embodiment. As shown in FIG. 49, the rotating array pack 830 contains the replaceable film plate 836, which can rotate on its central z-axis within the film slot 804. Mounted left of the rotating array pack 830 is a sound generator 212 that produces auditory feedback to the user. In addition, a battery 206 provides the required energy for device operation. A memory unit 114 provides data storage. Nearby, a control unit 120 is in operative association with the rotating array pack 830, memory unit 114, sound generator 212, and battery 206.

Fifth Embodiment—Design with Diverging Light Beams

Figure 50:
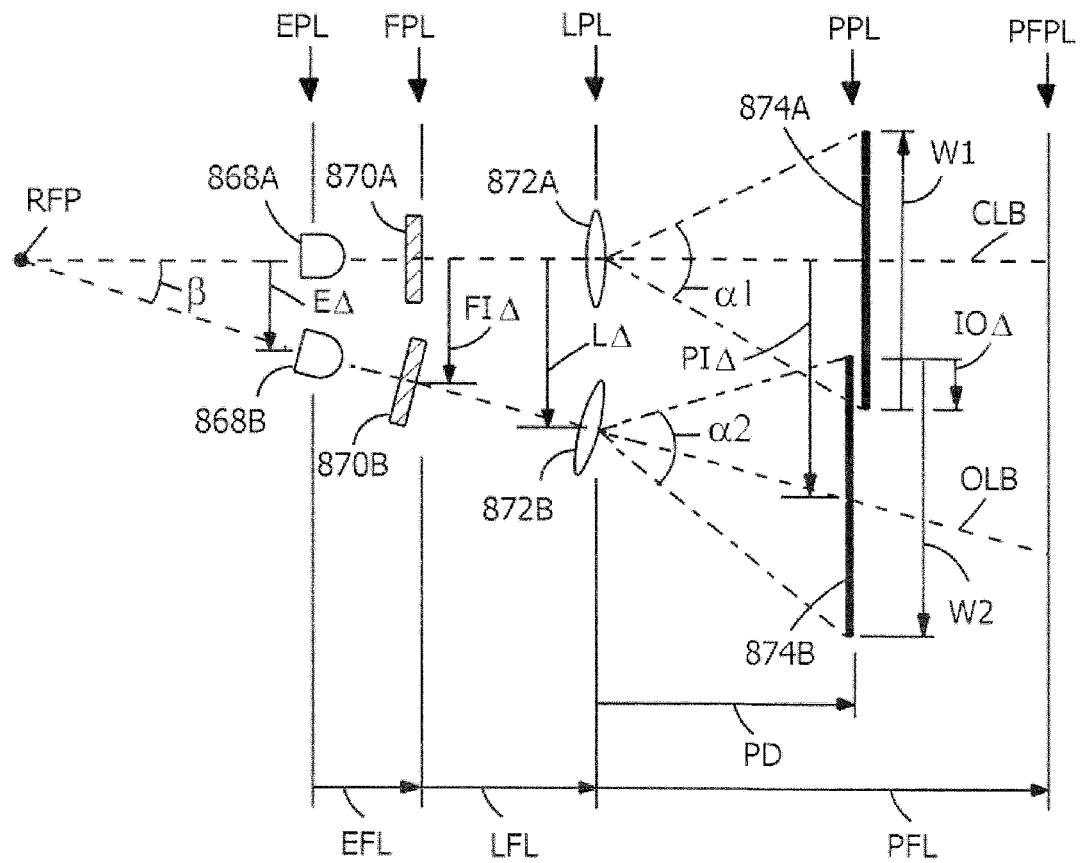
FIG. 50 is a geometrical diagram of the fifth embodiment's array pack having two diverging light beams that create a tiled image.

Turning now to FIG. 50, thereshown is a simplified, geometrical layout of array projection that uses two diverging light beams to create a tiled image. The intended use of the layout is to provide mathematical and design information for positioning the rotating array pack components. As can be seen, the layout is comprised of a first light emitter 868A and a second light emitter 868B that exist on light emitter plane EPL. The first light emitter 868A and the second light emitter 868B are separated by spatial distance of a light emitter delta EΔ. Further, the layout is also comprised of a first film image 870A and a second film image 870B that exist on film plane FPL. The first film image 870A and the second film image 870B are separated by spatial distance of film image delta FIΔ. Finally, the layout includes a first lens 872A and second lens 872B that exist on lens plane LPL. The first lens 872A and the second lens 872B are separated by spatial distance of lens delta LΔ.

As can be seen in FIG. 50, there are two light beams defined in the layout: 1) a central light beam CLB that contains the first light emitter 868A, first film image 870A, and first lens 872A that creates a first projected image 874A; and 2) an oblique light beam OLB that contains the second light emitter 868B, second film image 870B, and second lens 872B that creates a second projected image 874B. Abstractly speaking, the light beams CLB and OLB are adjacent light beams that may exist anywhere on the x-y plane within the array pack (not shown). The central light beam CLB is parallel to the z-axis. However, the oblique light beam OLB diverges away from the central light beam CLB. Moreover, both light beam paths originate at a rear focal point RFP and form a divergent angle β. Also, note that beyond the lens 872A, 872B, the light beams CLB and OLB refract into ever widening, projection beams. That is, the central light beam CLB has a projection angle α1 and the oblique light beam OLB has a projection angle α2.

Forward along the light beam paths is the projection plane PPL, which represents the projection surface. As shown, both light beams CLB, OLB intersect the projection plane PPL and are separated by a spatial distance referred to as a projected image delta PIΔ. The projected image delta PIΔ is the amount of separation that two projected images 874A, 874B will have on the projection surface when using the two-beam layout of FIG. 50. Further, the projected images 874A, 874B overlap by an image overlap delta IOΔ.

Measuring along the z-axis, the emitter focal length EFL is the distance between the light emitter plane EPL and the film plane FPL. The lens focal length LFL is the distance between the film plane FPL and the lens plane LPL. The projection distance PD is the distance between the lens plane LPL and the projection plane PPL, which varies according to how close or far the projection device is from the projection surface. Finally, the projection focal length PFL is the distance between the lens plane LPL and the projection focal plane PFPL, where both projected images 874A, 874B have the desired image overlap delta IOΔ.

Using the geometric layout in FIG. 50 as a reference, a collection of math formulas are provided to assist in the current embodiment's design, although other mathematical approaches are clearly contemplated as being within the scope of the current embodiment. For two light emitters having divergent light beams CLB, OLB that create a tiled image, the following are assumed to be true:

β>0

CLB ∦ OLB

α1=α2, W1=W2, PD=PFL

Since the projected images are combined together to create a large tiled image, various tiling patterns may be used such as squares, triangles, etc. For the current embodiment, the tiled image will be constructed of tightly packed hexagon shapes. As a result, a tile scaling factor given below should be included in the subsequent math formulas:

$$\text{tile\_scale} = \frac{\sqrt{3}}{2}$$

where
tile_scale is the scaling factor that is dependent on the tiling pattern shape. If a different tiling pattern is used, simply replace the above scaling factor.

In FIG. 50, the formula below defines the projected image width W1 given a specific projection angle α1 and projection focal length PFL:

$$W1 = \tan\left(\frac{\alpha 1}{2}\right) \cdot 2 \cdot PFL \cdot \text{tile\_scale}$$

The formula below defines the projected image delta PIΔ between two tiled images given a specific image overlap delta IOΔ:

PIΔ=W1−IOΔ

Substituting terms, the formula below defines the projected image delta PIΔ given the projection focal length PFL and image overlap delta IOΔ:

$$PI\Delta = \tan\left(\frac{\alpha 1}{2}\right) \cdot 2 \cdot PFL \cdot \text{tile\_scale} - IO\Delta$$

Further, the formula below defines the divergent angle β as a function of the projected focal length PFL, projected image delta PIΔ, and lens delta LΔ:

$$\beta = \arctan\left(\frac{PI\Delta - L\Delta}{PFL}\right)$$

Combining factors, the formula below defines the divergent angle β as a function of projected focal length PFL and lens delta LΔ:

$$\beta = \arctan\left(\frac{\tan\left(\frac{\alpha 1}{2}\right) \cdot 2 \cdot PFL \cdot \text{tile\_scale} - IO\Delta - L\Delta}{PFL}\right)$$

Whereupon, other array deltas may be computed with the formulas:

EΔ=LΔ−tan(β)·2·(EFL+LFL)

FIΔ=LΔ−tan(β)·2·(LFL)

The critical formula below defines a light array system having diverging beams of light:

EΔ≤FIΔ<LΔ

Fifth Embodiment—Dimensions of the Rotating Array Pack

Referring again to FIG. 50, a few design assumptions can be made for the current embodiment, where the following dimensions and angles are defined:
PFL=PD=1.0 meter
α1=α2=30.0 degrees
IOΔ=0.0 meters
LΔ=0.0, 30.0 mm (based on fixed spacing between lens)
EFL=12 mm (provides an adequate gap between emitters and film)
LFL=20 mm (defined by the molded lens convexity and focal length)

Then using the above math formulas for tiled image projection having diverging light beams, the following dimensions and angles are computed:
PIΔ=0.0, 0.46 meters
β=0.0, 23.3 degrees
EΔ=0.0, 16.2 mm
FIΔ=0.0, 21.4 mm Moreover, since the current embodiment will also include image sensing using converging light beams, the math formulas from the first embodiment are used to compute the following dimensions:
EΔ=0.0, 30.6 mm
FIΔ=0.0, 30.3 mm
LΔ=0.0, 30.0, 54.0 mm (based on fixed spacing between lens)

Finally, the dimensions of the rotating array pack can be defined, relying on many of the previously discussed math formulas, figures, and data tables. So thereshown in FIGS. 51-55 are orthogonal top views of the light array plate 832, primary light guide plate 834, multi-image film plate 836, secondary light guide plate 838, and the bug-eyed lens plate 840. All of these components form the rotating array pack assembly.

Figure 51:
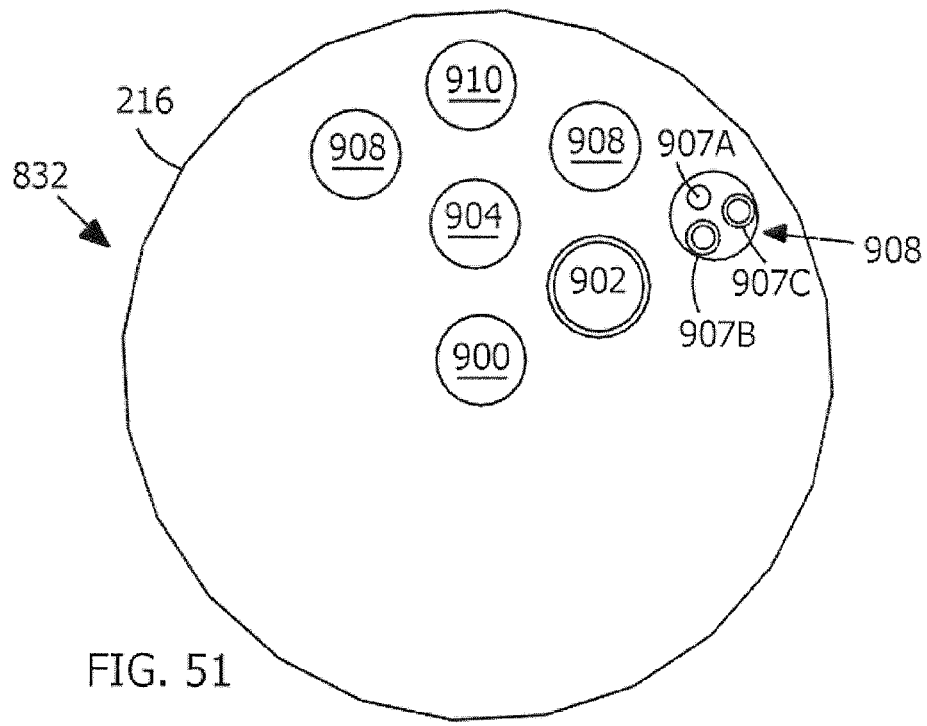
FIG. 51 is a top view of the fifth embodiment's light array plate.

Turning first to FIG. 51, a top view can be seen of the light array plate 832. Note that only a portion of a printed circuit board 216 is occupied and most of it is blank. This is not accidental, but a design choice that will be explained later in the discussion. In FIG. 51, there is a center LED 904 and inner LEDs 908, 910 mounted on the printed circuit board 216. The center LED 904 is associated with the central light beam (shown earlier in FIG. 50). That is, the center LED 904 produces a central light beam parallel to the z-axis and perpendicular to the light array plate 832 of FIG. 51. Further, the inner LEDs 908 and 910 produce light beams that diverge away from the z-axis. The white LEDs are 10 mm in diameter and have at least 100,000 millicandela brightness. Next to the center LED 904, an inner infrared emitter 900 produces infrared light at 30 degrees emission angle at 880-960 nanometers wavelength. Nearby, there is inner infrared sensor 902 having a view angle of 30 degrees and sensitive to 880-960 nanometers wavelength light. At the outside of the light array plate 832 is a rotation indicator 906. The rotation indicator 906 is comprised of a rotation infrared emitter 907A and rotation infrared sensors 907B, 907C. All the light emitters/sensors are coupled to the control unit (not shown).

Figure 52:
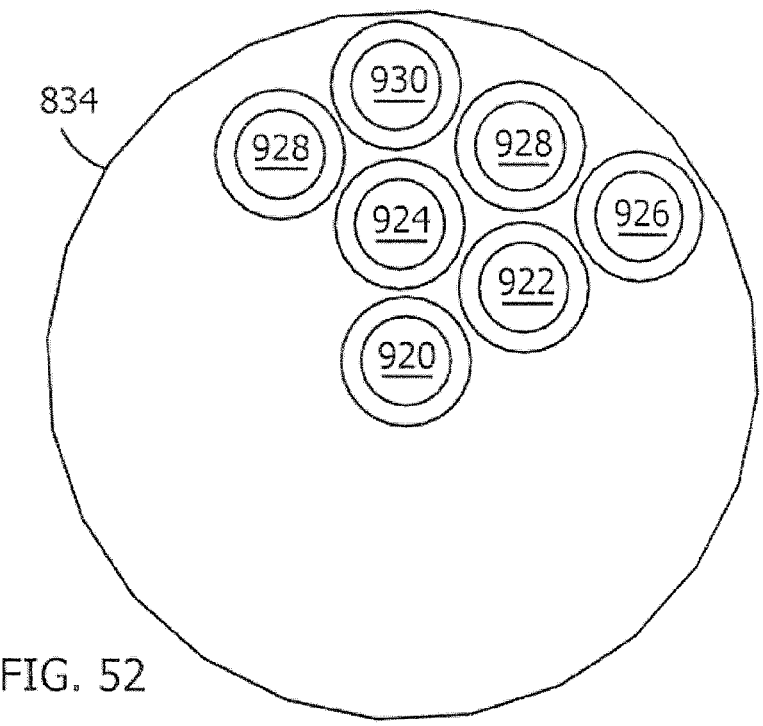
FIG. 52 is a top view of the fifth embodiment's primary light guide plate.

Turning now to FIG. 52, a top view can be seen of the primary light guide plate 834. Thereshown is a center primary opening 924, surrounded by inner primary openings 920, 922, 928, 930 and an outer primary opening 926. The primary openings 920, 922, 924, 926, 928, 930 have been positioned on a hexagonal lattice, such that each opening is over an underlying emitter/sensor of the light array plate (shown in FIG. 51).

Figure 53A:
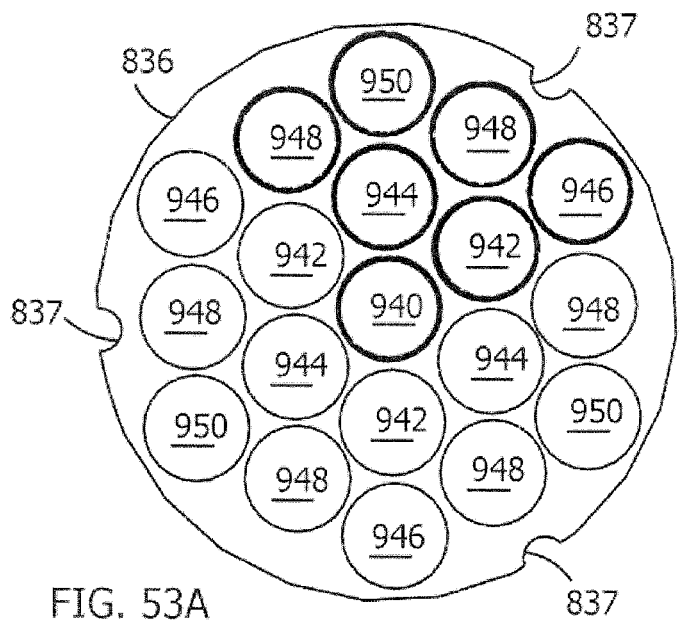
FIG. 53A is a top view of the fifth embodiment's replaceable film plate.

Turning now to FIG. 53A, a top view can be seen of the replaceable film plate 836. Thereshown is a center film image 944, surrounded by inner film images 940, 942, 948, 950 and an outer film image 946. Again, the film images 940, 942, 944, 946, 948, 950 have been positioned on a hexagonal lattice, such that a portion of them is over an underlying primary opening (shown in FIG. 52). The replaceable film plate 836 is made of transparent plastic sheet material and may be further reinforced with an outer paper or plastic wrapping. In addition, the film plate 836 contains shift notches 837 positioned every 120 degrees at three locations around its perimeter. The shift notches 837 enable the film plate 836 to be grabbed and rotated by the film shift lever (shown earlier in FIG. 48).

Figure 53B:
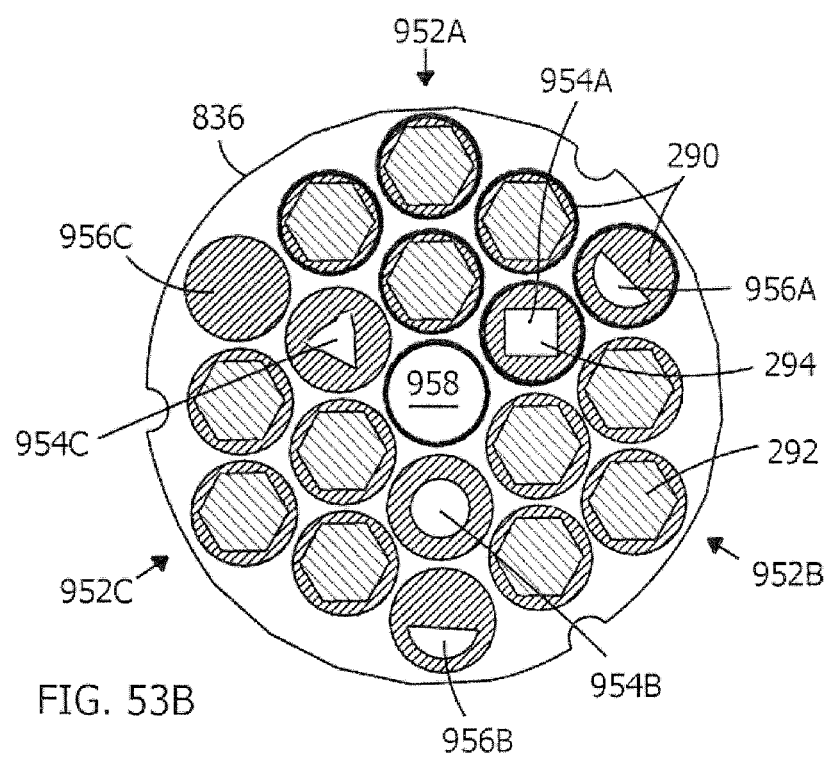
FIG. 53B is a top view of the fifth embodiment's replaceable film plate, showing its graphic content.

Turning to FIG. 53B, thereshown is a second top view of the replaceable film plate 836 showing the graphic content lithographically printed its surface. As with previous embodiments, the replaceable film plate 836 contains a collection of film images. The film images contain a black background 290 printed with opaque black ink, a colored foreground 292 of translucent colored ink, and a transparent foreground 294. Whereby, when light is transmitted through the film images, the light is blocked by the black background 290, filtered by the colored foreground 292, and unaltered by the transparent foreground 294.

The graphic content of the film images varies greatly. For example, in three regions of the replaceable film plate 836 are colored hexagon film images 952A, 952B, 952C having colored, hexagon shaped pictures. Of note, the colored hexagon film images 952A are positioned directly over the white LEDs of the light array plate (in FIG. 51). Further, three regions of the replaceable film plate 836 contain sensing film images 954A, 954B, 954C having various transparent shapes. Interestingly, the sensing film image 954A is positioned directly over the inner infrared sensor 902 of the light array plate (in FIG. 51). Also, three regions of the replaceable film plate 836 contain rotation film images 956A, 956B, 956C having unique patterns. Note that the rotation film image 956A is positioned directly over the rotation indicator 906 of the light array plate (in FIG. 51). And finally, in FIG. 53B, the middle of the film plate 836 is a blank film image 958 that is wholly transparent. The blank film image 958 is positioned over the inner infrared emitter 900 of the light array plate (in FIG. 51).

Figure 54:
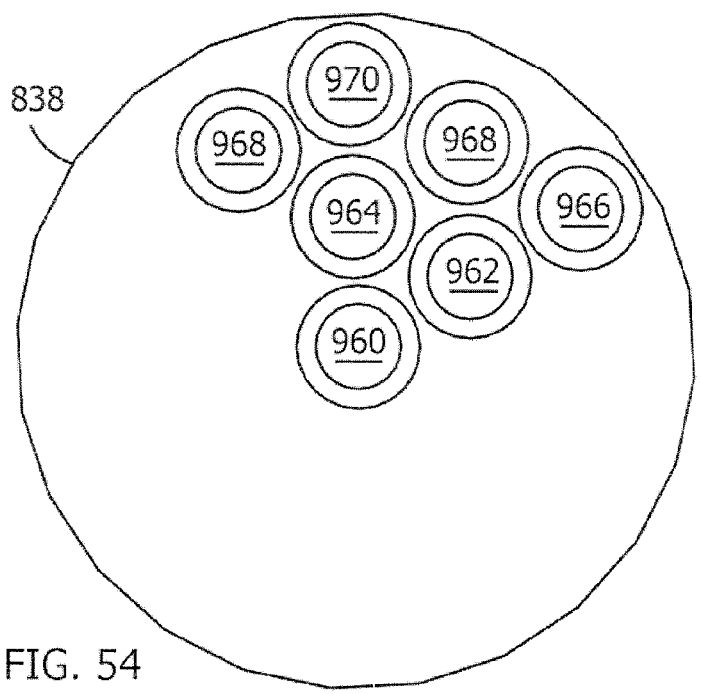
FIG. 54 is a top view of the fifth embodiment's secondary light guide plate.

Turning now to FIG. 54, a top view can be seen of the secondary light guide plate 838. Thereshown is a center secondary opening 964, surrounded by inner secondary openings 960, 962, 968, 970 and an outer secondary opening 966. The secondary openings 920, 922, 924, 926, 928, 930 have been positioned on a hexagonal lattice, such that each opening is over an underlying emitter/sensor of the light array plate (shown in FIG. 51).

Turning now to FIG. 56, a top view can be seen of the bug-eyed lens plate 840. Thereshown is a center lens 984, surrounded by inner lens 980, 982, 988, 990 and an outer lens 986. The lens 980, 982, 984, 986, 988, 990 have been positioned on a hexagonal lattice, such that a portion of lens is over an underlying emitter/sensor of the light array plate (shown in FIG. 51).

Having discussed FIGS. 51-55, the physical dimensions of the array pack are critical to its light projection abilities. Whereby, the suggested dimensions of the rotating array pack for image projection are defined as follows:

TABLE 8

Dimensions of Rotating Array Pack - Diverging Beams for Tiled Image Projection

Figure 55:
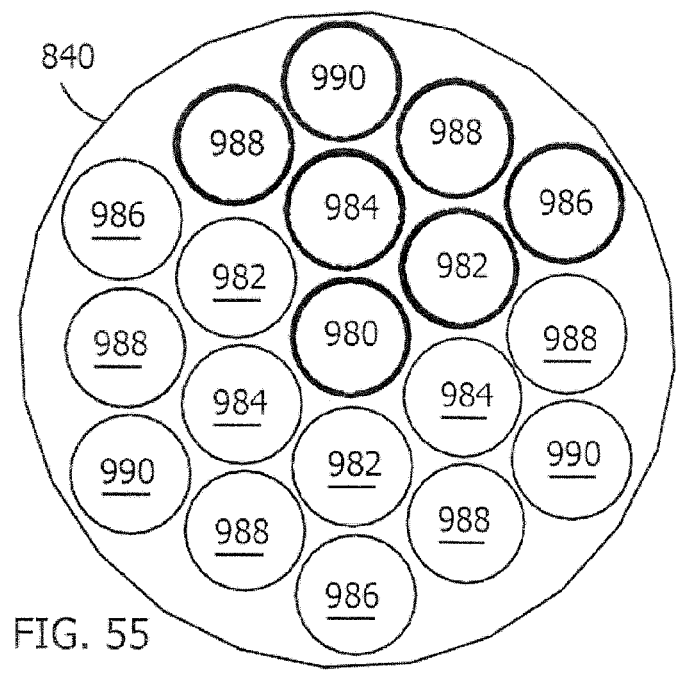
FIG. 55 is a top view of the fifth embodiment's bug-eyed lens plate.

| Figure Number | Reference Numeral | Name | Distance to Central Light Beam (CLB) (mm) |
|---|---|---|---|
| FIG. 51 | 904 | Center LED | 0.0 |
| FIG. 51 | 908, 910 | Inner LED | 16.2 |
| FIG. 52 | 924 | Center primary opening | 0.0 |
| FIG. 52 | 928, 930 | Inner primary opening | 16.2 |
| FIG. 53A | 944 | Center film image | 0.0 |
| FIG. 53A | 948, 950 | Inner film image | 21.4 |
| FIG. 54 | 964 | Center secondary opening | 0.0 |
| FIG. 54 | 968, 970 | Inner secondary opening | 21.4 |
| FIG. 55 | 984 | Center lens | 0.0 |
| FIG. 55 | 988, 990 | Inner lens | 30.0 |

In addition, the suggested physical dimensions of the rotating array pack for image sensing are defined as follows:

TABLE 9

Dimensions of Rotating Array Pack - Converging Beams for Image Sensing

| Figure Number | Reference Numeral | Name | Distance to Central Light Beam (CLB) (mm) |
|---|---|---|---|
| FIG. 51 | 904 | Center LED | 0.0 |
| FIG. 51 | 900 | Inner infrared emitter | 30.6 |
| FIG. 51 | 902 | Inner infrared sensor | 30.6 |
| FIG. 51 | 906 | Outer rotation indicator | 54.0 |
| FIG. 52 | 924 | Center primary opening | 0.0 |
| FIG. 52 | 920, 922 | Inner primary opening | 30.6 |

TABLE 9-continued

Dimensions of Rotating Array Pack - Converging Beams for Image Sensing

| Figure Number | Reference Numeral | Name | Distance to Central Light Beam (CLB) (mm) |
|---|---|---|---|
| FIG. 52 | 926 | Outer primary opening | 54.0 |
| FIG. 53A | 944 | Center film image | 0.0 |
| FIG. 53A | 940, 942 | Inner film image | 30.3 |
| FIG. 53A | 946 | Outer film image | 54.0 |
| FIG. 54 | 964 | Center secondary opening | 0.0 |
| FIG. 54 | 960, 962 | Inner secondary opening | 30.3 |
| FIG. 54 | 966 | Outer secondary opening | 54.0 |
| FIG. 55 | 984 | Center lens | 0.0 |
| FIG. 55 | 980, 982 | Inner lens | 30.0 |
| FIG. 55 | 986 | Outer lens | 54.0 |

Figure 56A:
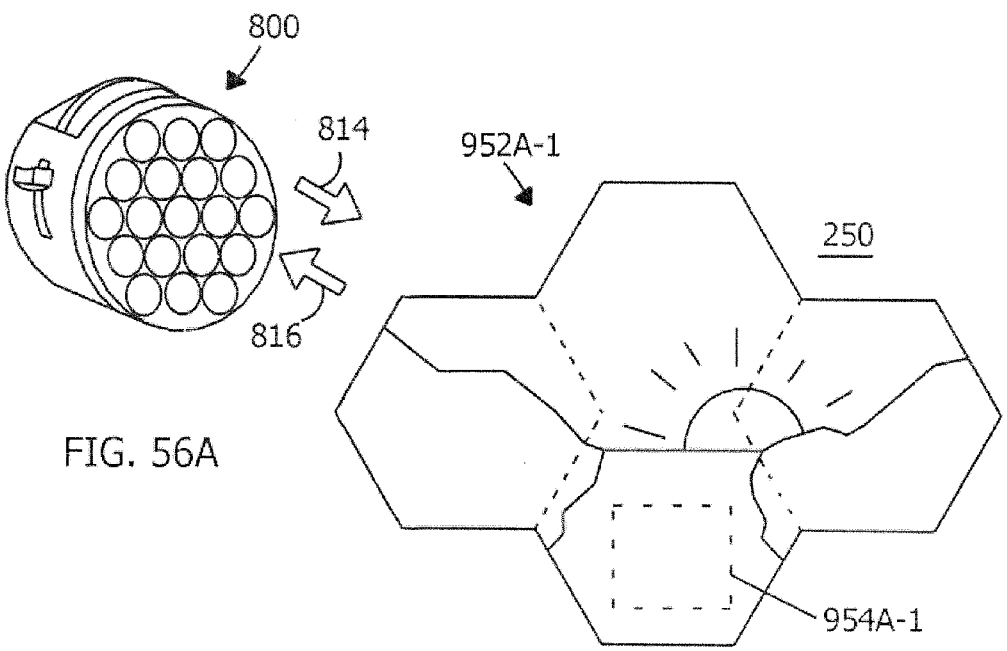
FIG. 56A is a perspective view of the fifth embodiment projecting a first tiled image, along with a first light-sensing region.
Figure 56B:
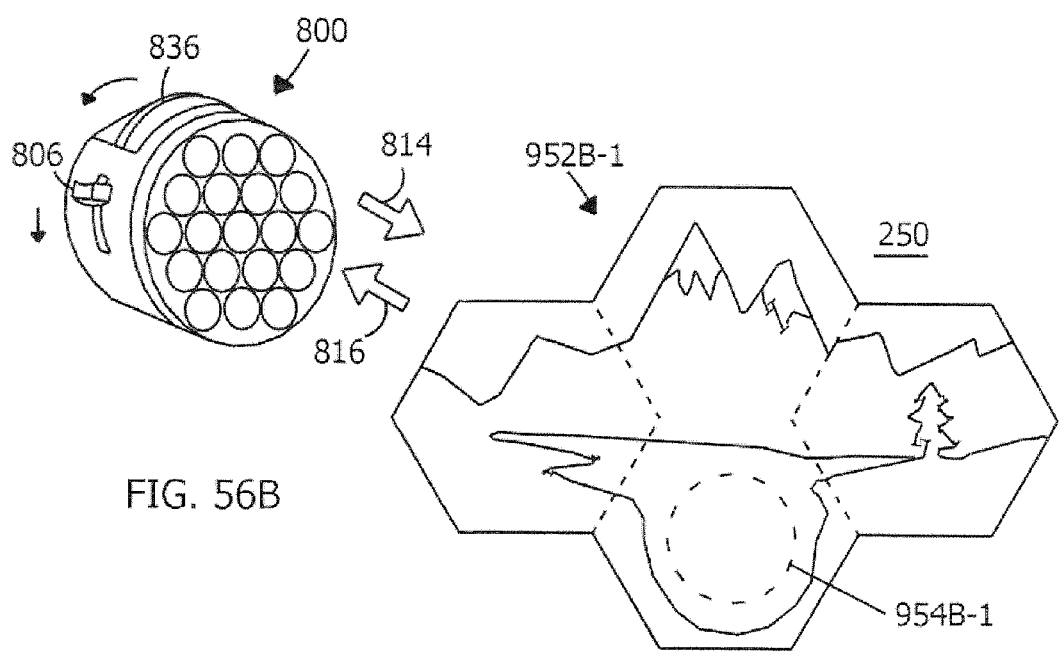
FIG. 56B is a perspective view of the fifth embodiment projecting a second tiled image, along with a second light-sensing region.

Turning now to FIGS. 56A and 56B, thereshown are two perspective views of the rotating projection device 800 displaying a tiled image on a projection surface 250. In FIG. 56A, a first perspective view of the rotating projection device 800 creates projecting light beams 814 that fill and cover the illuminated tiled image 952A-1.

To further explain the projection process, in FIG. 51, the device's control unit (not shown) activates four white LEDs 904, 908, 910 of the light array plate 832. Then in FIG. 52, the four white light beams pass through the primary light guide plate 834. Where, in FIG. 53B, the light is filtered through four colored hexagon film images 952A, producing four colored light beams. Then in FIG. 54, the four light beams make their way through the secondary light guide plate 838. Whereupon, finally in FIG. 55, the light beams are refracted by the bug-eyed lens plate 840 and exit as four diverging, projection beams that create the tiled image 952A-1 of FIG. 56A.

As can be seen in FIG. 56A, the generated tiled image 952A-1 is a lovely seascape with a rising sun at the horizon. Additionally, note that in the lower section of the tiled image 952A-1 is a light-sensing region 954A-1, denoted as box shaped. The light sensing region 954-1 is essentially a view of the projection surface, where the device 800 can perceive light intensity.

To further explain the light sensing process, in FIG. 51, the device's control unit (not shown) activates the infrared emitter 900 of the light array plate 832. Then in FIG. 52, the infrared light passes through the primary light guide plate 834. Where, in FIG. 53B, the infrared light is transmitted through the wholly transparent, blank film image 958. Then in FIG. 54, the infrared light beam makes its way through the secondary light guide plate 838. Whereupon, in FIG. 55, the infrared light is refracted by the bug-eyed lens plate 840. Finally, in FIG. 56A, the infrared light exits the device 800 as the projected light beam 814, which illuminates the light-sensing regions 954A-1. Subsequently, the infrared light is reflected off the projection surface 250 as a returning light beam 816 and re-enters the device 800.

Then turning to FIG. 55, the returning infrared light is refracted by the bug-eyed lens plate 840. In FIG. 54, the infrared light passes through secondary opening 962 of the secondary light guide plate 838. Where, in FIG. 53B, the infrared light passes through sensing film image 954A, filtering the light with a box shaped mask. Then in FIG. 52, the infrared light makes its way through the primary light guide plate 834. And finally, in FIG. 51, the infrared sensor 902 receives the infrared light. The device's control unit (not shown) then reads the infrared sensor's 902 light intensity value and responds accordingly. For example, referring back to FIGS. 48 and 49, the rotating projection device 800 may activate its sound generator 212 upon detecting light intensity changes. Or the device 800 may modify the projected image by coordinating light sources in the rotating array pack 830.

Continuing on to FIG. 56B, a second perspective view of the rotating projection device 800 is shown with its projected tiled image. However, this time, the user has manually pressed and released the film shift lever 806, causing the replaceable film plate 836 to make a ⅓ revolution within the device 800. The result is a whole new picture is presented to the user. That is, the device 800 creates projecting light beams 814 that fill and cover the illuminated tiled image 952B-1. As can be seen, the generated tiled image 952B-1 is now a lovely landscape of a mountain near a lake. Additionally, note that a different light-sensing region 954B-1 has appeared, denoted as a circular shape. Whereby, the light sensing region 954B-1 is observed by the device 800 along the returning light beam 816.

The revolving projection device 800 can alter both its projected image and light-sensing region by rotating the film plate 836. To explain the effect, as shown in FIG. 53B, when the replaceable film plate 836 rotates, an old set of images move out of the light path and a new set of images move into the light path. As indicated in FIG. 53B, the colored hexagon film images 952A, sensing film image 954A, and rotation film image 956A are positioned above the light emitters and sensors of the light array plate 832, shown in FIG. 51. Then, in FIG. 53B, when the replaceable film plate 836 is rotated ⅓ revolution in the counterclockwise direction, the colored hexagon film images 952B, sensing film image 954B, and rotation film image 956B are positioned above the emitters and sensors of the light array plate 832, shown in FIG. 51. As a result, a new set of projected images and sensing regions become available.

Further, in FIG. 53B, the device is aware of the exact position of the replaceable film plate 836. That is, each time the replaceable film plate 836 rotates, a different rotation film image 956A, 956B, or 956C is positioned over the rotation indicator 906 of the light array plate 832, as shown in FIG. 51. Thereshown in FIG. 51, the rotation indicator 906 is a fairly simple mechanism. The rotation infrared emitter 907A is initially activated, creating a forward infrared beam that illuminates the rotation film image 956A, shown in FIG. 53B. Encoded portions of the rotation film image 956A then reflect infrared light back towards the rotation indicator 906, containing rotation infrared sensors 907B and 907C, shown in FIG. 51. Whereupon, depending on the encoded light pattern, no sensor, either sensor, or both sensors may receive the light within the rotation indicator 906. The control unit (not shown), being in association with both sensors 907B and 907C, then converts the encoded signal into a rotation position.

Whereby, referring back to FIGS. 56A and 56B, the rotating projection device 800 is very much aware of its rotation position. The device's 800 interactive responses may then correspond to the actively projected images and sensing regions. For example, in FIG. 56A, the device 800 projects the seascape tiled image 952A-1, but in addition, generates the ambient sound of ocean waves and seagulls. Then, in FIG. 56B, after the user has pressed the film shift lever 806, the device 800 projects the mountainous tiled landscape image 952B-1, but also generates the accompanying sound of quacking ducks on a mountain lake.

Accompanying the visual and sound effects, the rotating projection device 800 can also respond to hand gestures. That is, thereshown in FIG. 56A, the user may wave his hand over the light sensing region 954A-1, and the device 800 generates the sound of a water splash. In FIG. 56B, the user may wave his hand over the circular light sensing region 954B-1, and the device 800 generates a moose call. Understandably, more emitters, sensors, and film images may be incorporated into the rotating projection device 800 for increased sophistication, such as creating animated visual effects with interactive regions on the projection surface 250.

Sixth Embodiment—Variable Light Array Device

Figure 57:
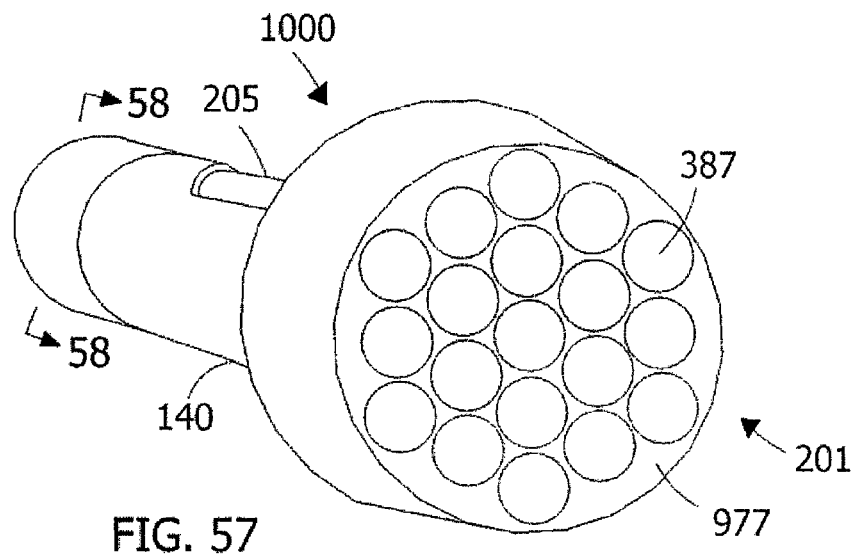
FIG. 57 is a perspective view of a sixth embodiment of a variable light array device, containing an array pack.
Figure 58:
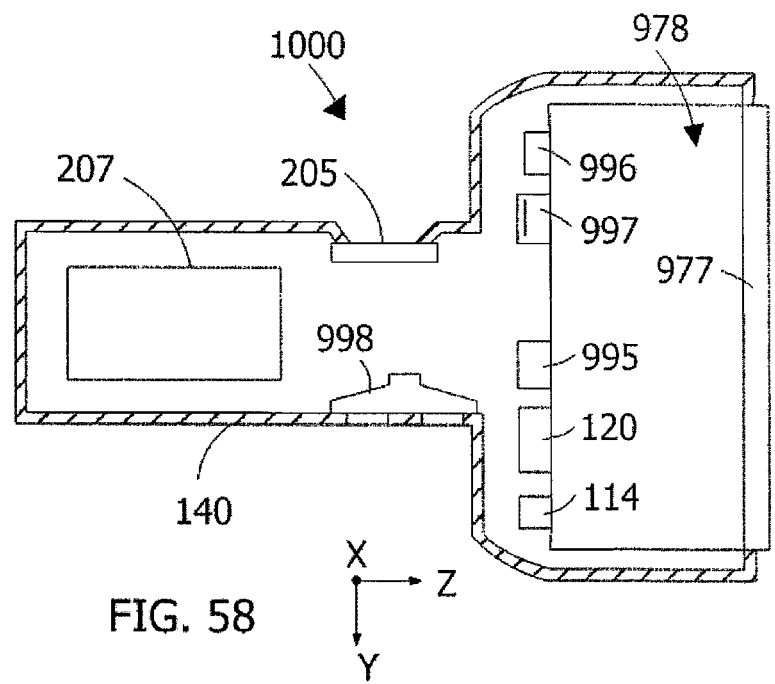
FIG. 58 is a section view of the sixth embodiment of the variable light array device.

Turning now to FIGS. 57-58, thereshown is a sixth embodiment of the disclosure, referred to as a variable light array device 1000. Device 1000 has been enhanced with variable brightness control of the light emitters. The variable light array device 1000 is constructed similar to previous embodiments (as shown in FIGS. 2-3 and FIGS. 19-20) with slight modifications; whereby, similar parts have similar reference numerals. The variable light array device 1000 includes outer housing 140 with user interface 205, such as a keypad. At the projection face 201, the device 1000 includes optical element disk 977 containing a plurality of optical elements 387.

Specifically in FIG. 58, a section view is presented of the array device 1000 having an array pack 978 for generating illuminated images. Affixed to device 1000 is motion sensor 996, haptic generator 997, sound generator 998, light brightness control 995, control unit 120, memory 114, user interface 205, and power source 207.

Figure 59:
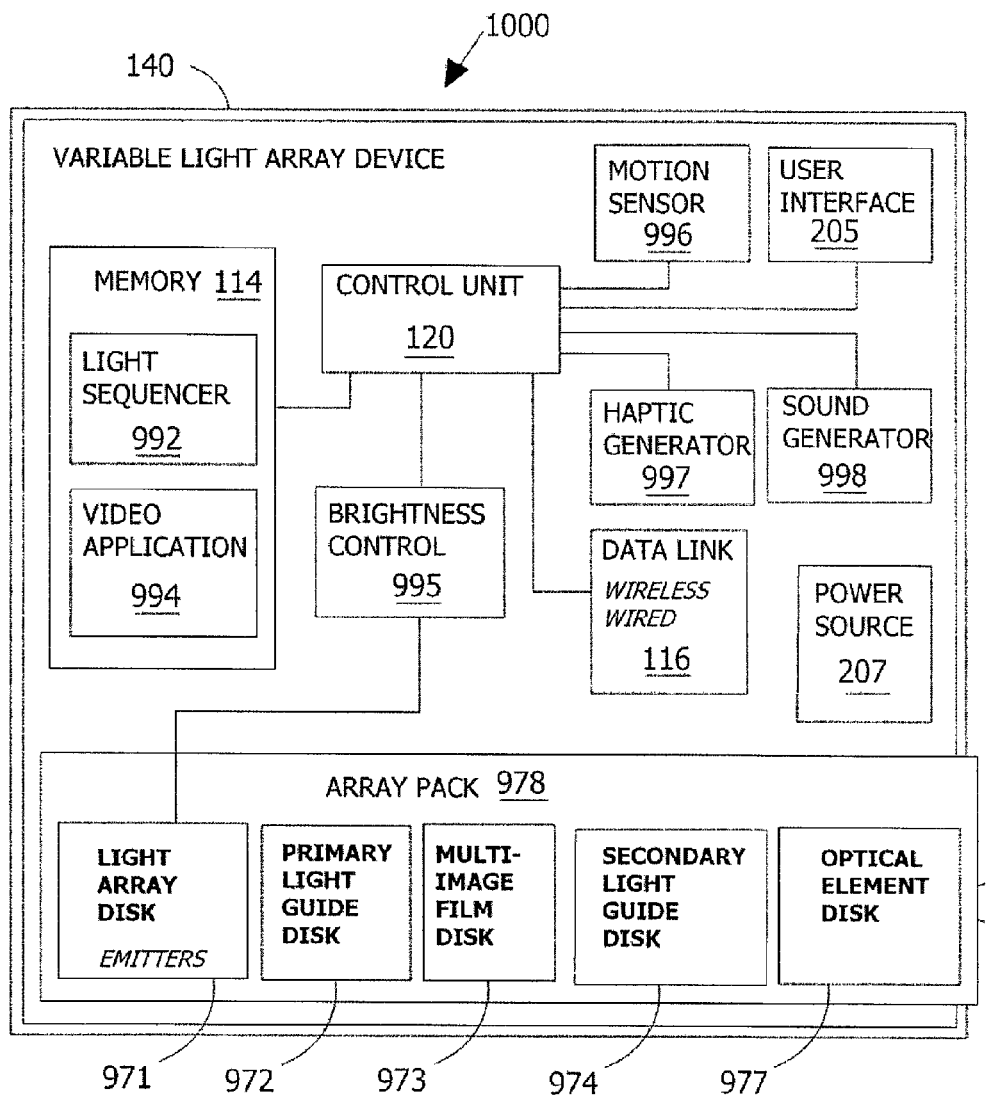
FIG. 59 is a block diagram of the sixth embodiment of the variable light array device, showing the principal components.

Turning now to FIG. 59, a block diagram shows components of the variable light array device 1000, which may be comprised of, but not limited to, control unit 120, memory 114, light brightness control 995, motion sensor 996, user interface 205, haptic generator 997, sound generator 998, data link 116, array pack 978, and power source 207.

Further illustrated, the array pack 978 may be comprised of light array disk 971 (which contains light emitters), primary light guide disk 972, multi-image film disk 973, secondary light guide disk 974, and optical element disk 977. For sake of brevity, only some of the components will be discussed further.

The control unit 120 provides computing abilities for device 1000, wherein control unit 120 may be comprised, for example, of at least one or more central processing units (CPU) having appreciable processing speed (e.g., 10 mHz to 2 ghz) to execute computer instructions. Control unit 120 may include one or more processing units that are general-purpose and/or special purpose (e.g., multi-core processing units, video processors, and/or related chipsets). The control unit 110 may be operatively coupled to, but not limited to, memory 114, light brightness control 995, motion sensor 996, user interface 205, haptic generator 997, sound generator 998, and data link 116. Although one architecture to connect components of device 1000 has been presented, alternative embodiments may rely on alternative bus, network, and/or hardware architectures.

The memory 114 may be comprised of a computer readable storage medium, which may, for example, contain or store computer instructions. Examples of computer readable storage medium may include, but not limited to, the following: an electrical connection having one or more wires, an optical fiber, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, and/or any suitable combination of the foregoing. Memory 114 may be operatively coupled to control unit 120 such that control unit 120, for example, may execute computer readable instructions. Memory 114 may be comprised of RAM, ROM, Flash, and/or hard drive, although other types of memory in whole, part, or combination may be used, including fixed and/or removable memory, volatile and/or nonvolatile memory. Alternatively, memory 114 may be integrated with control unit 120.

Memory 114 may contain computer implemented methods having computer readable instructions and/or data, such as, but not limited to, a light sequencer 992, and a video application 994. The computer implemented methods may be implemented in software, firmware, and/or hardware. Although not shown, memory 114 may be further comprised of an operating system, drivers, BIOS, etc.

The video application 994 may represent one or more computer implemented methods, such as, but not limited to, computer games, security monitoring, advertising display, etc. Application 994 may contain multimedia operations and data, such as light sequencing, light brightness, audio, and haptic information.

The light sequencer 992 may be a computer implemented method for coordinating activation or brightness of one or more light emitters within light array pack 978. In some embodiments, light sequencer 992 may be operable to load and parse table driven video data (as defined by application 994) to activate one or more light emitters for light brightness and sequencing effects.

Also affixed to the variable light array device 1000, the motion sensor 996 may provide inertial spatial sensing as device 1000 is moved through space. Motion sensor 996 may be operatively coupled to control unit 120 such that control unit 120, for example, may receive spatial position and/or movement information. Motion sensor 996 may be comprised of one or more spatial sensing components, such as an accelerometer, a magnetometer (e.g., electronic compass), a gyroscope, a spatial triangulation sensor, and/or a global positioning system (GPS) receiver, as illustrative examples. Advantages exist for motion sensing in 3D space; wherein a 3-axis accelerometer and/or a 3-axis gyroscope may be utilized.

The sound generator 998 may provide device 1000 with audio or sound generation capability. Sound generator 998 may be operatively coupled to control unit 120, such that control unit 120, for example, may control the generation of sound from device 1000. Sound generator 998 may be comprised of, but not limited to, audio processing units, audio codecs, audio synthesizer, and/or at least one sound generating element, such as a loudspeaker.

Further affixed to device 1000, the haptic generator 997 may provide device 1000 with haptic or vibratory effects, which may be sensed by a user (not shown) in physical contact with device 1000. Haptic generator 997 may be operatively coupled to control unit 120 such that control unit 120 may control and enable vibration effects of device 1000. Haptic generator 120 may be comprised of, but not limited to, vibratory processing units, codecs, and/or at least one vibrator (e.g., mechanical vibrator).

Finally, the light brightness control 995 may provide device 1000 with adjustable brightness of its light emitters. Brightness control 995 may be operatively coupled to control unit 120 and light array disk 971, such that control unit 120 may control the illumination brightness of one or more light emitters within array pack 978. Brightness control 995 may be comprised of at least one light intensity control or function operable to adjust the brightness of at least one light emitter. For example, brightness control 995 may be comprised of an at least one LED driver (e.g., multi-channel LED driver with integrated brightness control), a digital-to-analog converter (e.g., with variable voltage output), or a pulse-width signal modulator (e.g., with variable duty cycle of 0-100%). In some alternate embodiments, brightness control 995 may be integrated with or integral to the control unit 120 having, for example, pulse-width modulated output signal capabilities. In certain alternate embodiments, brightness control 995 may be implemented in memory 114 as a computer implemented method (enabling pulse-width modulation or light brightness control) that is executed by control unit 120 having output signal capabilities.

Figure 60:
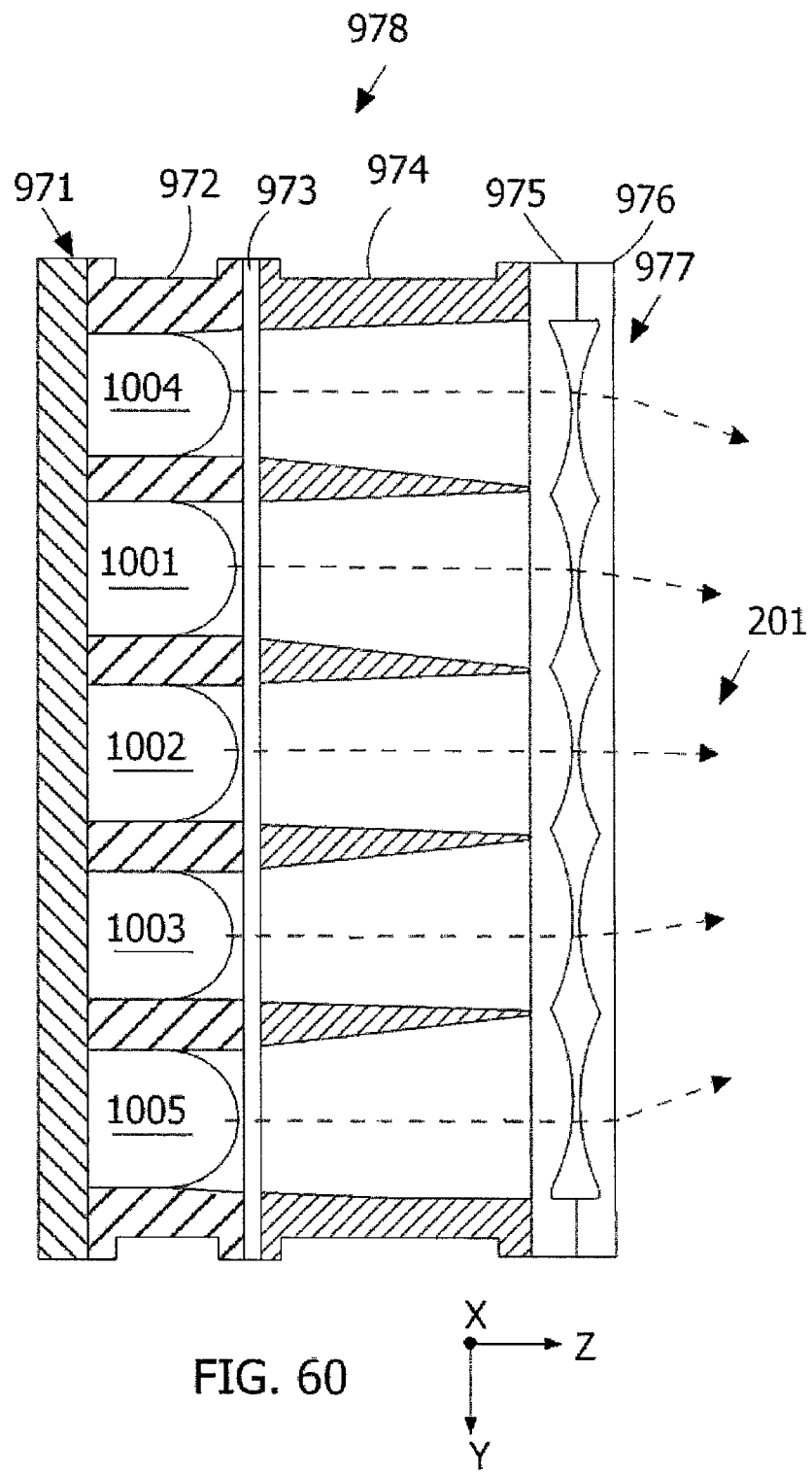
FIG. 60 is a section view of the sixth embodiment's array pack.

FIG. 60 presents a close-up section view of the array pack 978. Array pack 978 may contain light emitters 1001-1005, such as light emitting diodes (e.g., 5 mm white LEDs), laser diodes, or other types of light sources. The light emitters 1001-1005 may be affixed to light array disk 971, which is mounted to primary light guide disk 972, attached to multi-image film disk 973, mounted to secondary light guide disk 974, and affixed to optical element disk 977. The multi-image film disk 973 may be assumed, for example, to contain images of a dog (similar to images 340, 341, and 343 of FIG. 15).

Moreover, array pack 978 may be constructed similarly to the array pack of the second embodiment (reference numeral 430 of FIG. 26), except the previously disclosed bug-eyed lens disk (reference numeral 440 of FIG. 26) has been replaced with the optical element disk 977 shown at projection face 201. The optical element disk 977 may have multiple optical elements that form a complex lens for reduced optical distortion. As illustrated, optical element disk 977 may be comprised of a plurality of plano-convex lens contained in both an inner optic disk 975 and an outer optic disk 976, where the plano-convex lens are substantially aligned with each other. The disks 975 and 976 may be constructed of light transmissive material, such as injection molded transparent plastic parts, or individual optical lens mounted within a framework.

Sixth Embodiment—Operation of Animated Image

Figure 61A:
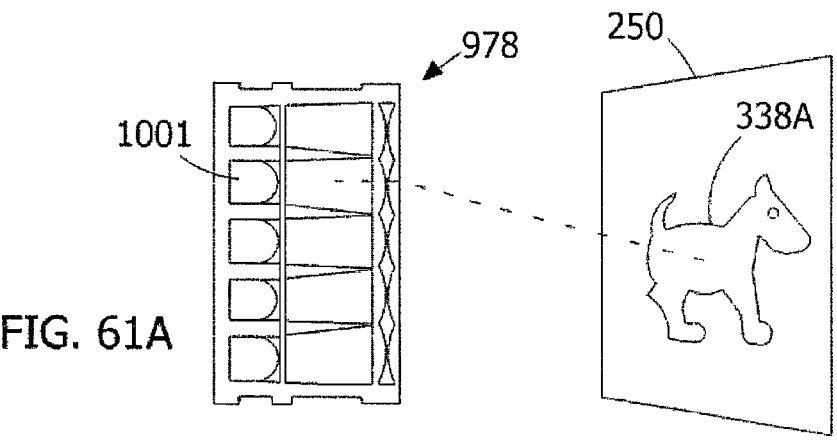
FIG. 61A is a first temporal view of the sixth embodiment's array pack in operation.
Figure 61B:
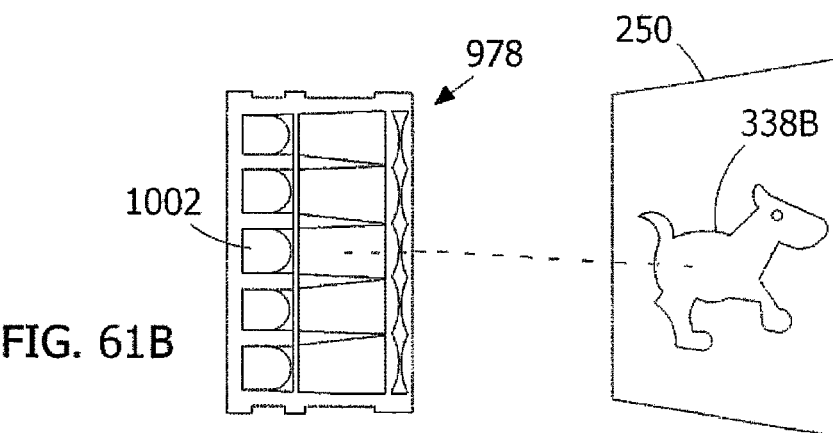
FIG. 61B is a second temporal view of the sixth embodiment's array pack in operation.
Figure 61C:
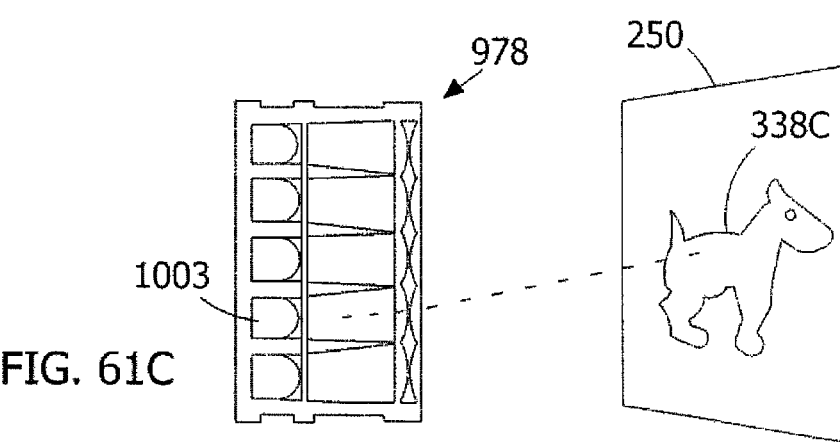
FIG. 61C is a third temporal view of the sixth embodiment's array pack in operation.

FIGS. 61A-61C illustrate a section view of the array pack 978 positioned in front of projection surface 250. FIGS. 61A-61C represent three different temporal views of array pack 978 in operation (similar to the earlier disclosed embodiment of FIGS. 16-18).

To animate an overlaid image, the light emitters contained in the array pack 978 may be activated in a substantially sequential manner. So starting with FIG. 61A, the control unit (not shown) activates the light emitter 1001 and creates illuminated image 338A on surface 250. A moment later (e.g., 0.10 second later), the light emitter 1001 is deactivated.

Then in FIG. 61B, the control unit (not shown) activates the light emitter 1002 and creates illuminated image 338B on surface 250. A moment later (e.g., 0.10 second later), the light emitter 1002 is deactivated.

Then in FIG. 61C, the control unit (not shown) activates the light emitter 1003 and creates illuminated image 338C on surface 250. A moment later (e.g., 0.10 second later), the light emitter 1003 is deactivated.

The illumination operation may then repeat and continue to cycle, defined by FIGS. 61A-61C for a pre-determined period of time (e.g., a five second duration). The illumination cycle causes an illuminated, animated dog to appear to walk to the right on surface 250. Understandably, the current embodiment can project an animated dog walking to the left or other animated graphic effects, by simply implementing additional images on the multi-image film disk (reference numeral 973 of FIG. 59) and coordinating the activation of other light emitters from the light array disk (reference numeral 971 of FIG. 59).

Sixth Embodiment—Animated Image using Brightness Control

Figure 62A:
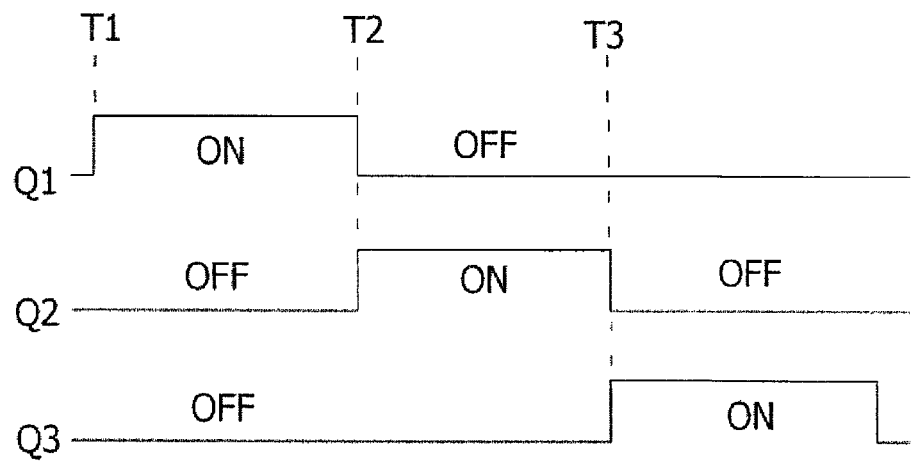
FIG. 62A is a signal diagram of three light emitters used to create an animated image, wherein the light emitters are turned on and off.

In a typical on/off lighting effect, FIG. 62A presents an example signal diagram of three on/off light signals Q1, Q2, and Q3 for three light emitters (such as light emitters 1001-1003 shown in FIGS. 61A-61C) when creating an animated image. As noted, the light signals Q1, Q2, and Q3 are activated to an "on" state and deactivated to an "off" state in a substantially sequential manner during time events T1-T3. Understandably, alternate on/off signal patterns and number of signals (e.g., two signals for two light emitters) may be used as well.

Figure 62B:
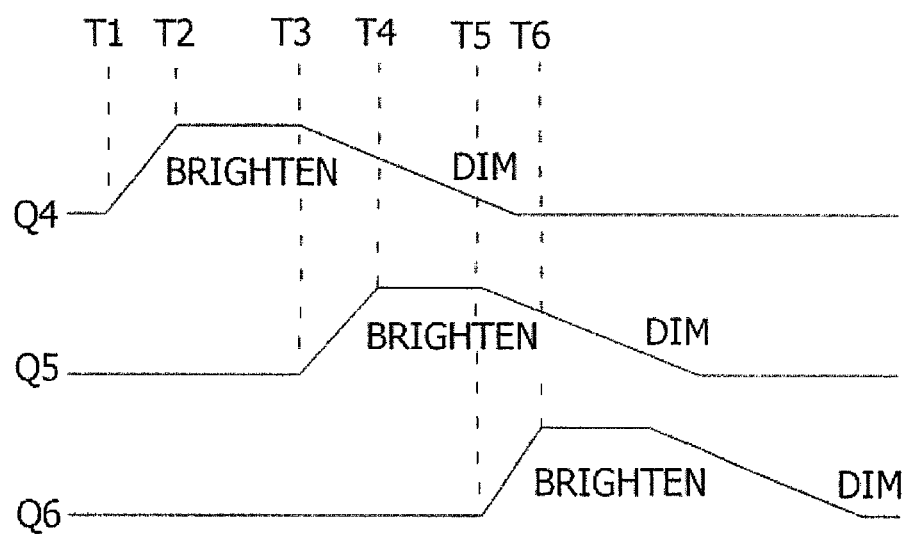
FIG. 62B is a signal diagram of three light emitters used to create an animated image, wherein the light emitters are brightened and dimmed.

However, for a more smoothly animated image, the current embodiment may utilize the light brightness control (reference numeral 995 of FIG. 59) discussed earlier. Whereby, FIG. 62B presents an example signal diagram of three brighten/dim light signals Q4, Q5, and Q6 for three light emitters (such as light emitters 1001-1003 shown in FIGS. 61A-61C) when creating an animated image. As noted, the light signals Q4, Q5, and Q6 ramp up ("brighten"), sustain, and ramp down ("dim") in a substantially sequential manner during time events T1-T6. Moreover, when a first light signal Q4 is being dimmed, a second light signal Q5 may be brightened, as shown from time T3 to T4. Understandably, alternate brighten/dim signal patterns (e.g., triangle wave) and number of signals (e.g., two signals for two light emitters) may be used as well.

Figure 63:
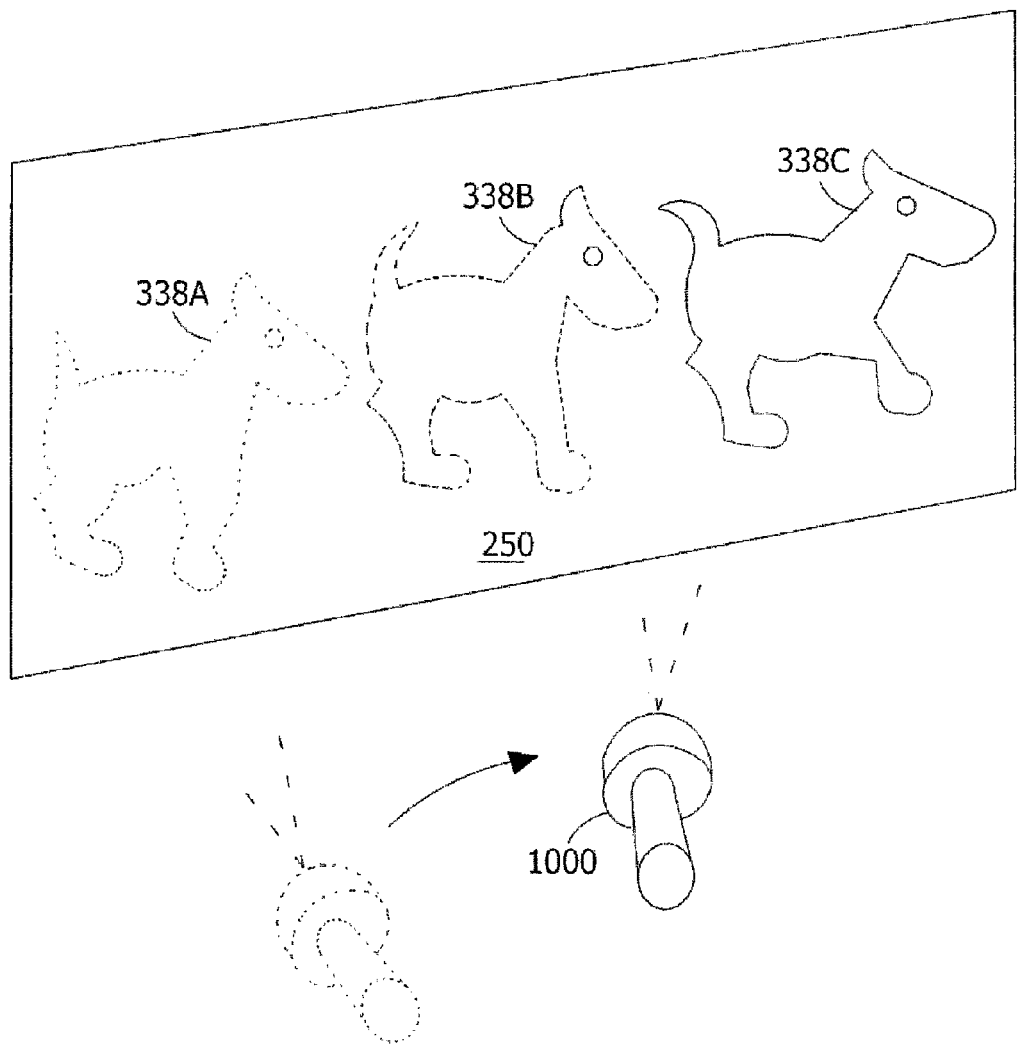
FIG. 63 is a perspective view of the sixth embodiment of the variable light array device creating an animated, illuminated image.

FIG. 63 shows a resulting perspective view of the light array device 1000 creating a video frame of illuminated images 338A-338C that appear to be smoothly animated, by using the brightening and dimming effects described above. That is, when device 1000 is swung to the right by a user (not shown), the device 1000 creates animated images 338A-338C of an animated object (such as a walking dog). As illustrated, when one illuminated image 338A (of a dog) is being dimmed, another illuminated image 338B (of a dog) may be brightened, enabling the appearance of a smoothly animated image using a limited number of distinct images. (Note: For purposes of illustration, the images 338A-338C have been separated in an exaggerated manner.) Understandably, other types of smoothly animated images for various animated objects (e.g., characters, vehicles, spaceships, etc.) are possible as well, where device 1000 may project one or more illuminated, animated objects that, for example, jump up and down, roll over, or twirl. Device 1000 may further create special effects such as explosions, fireworks, and glowing objects that utilize the brightness control of device 1000.

Moreover, when the device 1000 is moved through space by a user (not shown), device 1000 may adjust the brightness of the illuminated images 338A-338C. To accomplish this task, the device's 1000 motion sensor (reference numeral 996 of FIG. 59) may generate a movement signal based upon the movement of device 1000. Wherein, the device's 1000 control unit (reference numeral 120 of FIG. 59) is operable to take receipt of the movement signal and in response, adjust the brightness of one or more illuminated images projected by device 1000, as shown by FIG. 63.

In addition, when the light array device 1000 generates a video frame of animated images 338A-338C, the device 1000 may further generate a sound effect that corresponds to the video frame (of one or more illuminated images). For example, the device 1000 may generate the sound effect of a dog's feet tip-tapping across a floor that corresponds to the movement of the dog's feet. Moreover, when the device 1000 generates a video frame of animated images 338A-338C, the device 1000 may further generate a haptic or vibratory effect that corresponds to the video frame (of one or more illuminated images). For example, device 1000 may generate a vibration such that a user (not shown) holding device 1000 feels a vibratory effect that corresponds to the movement of the dog's feet.

Operation Method of a Light Array Device

Figure 64:
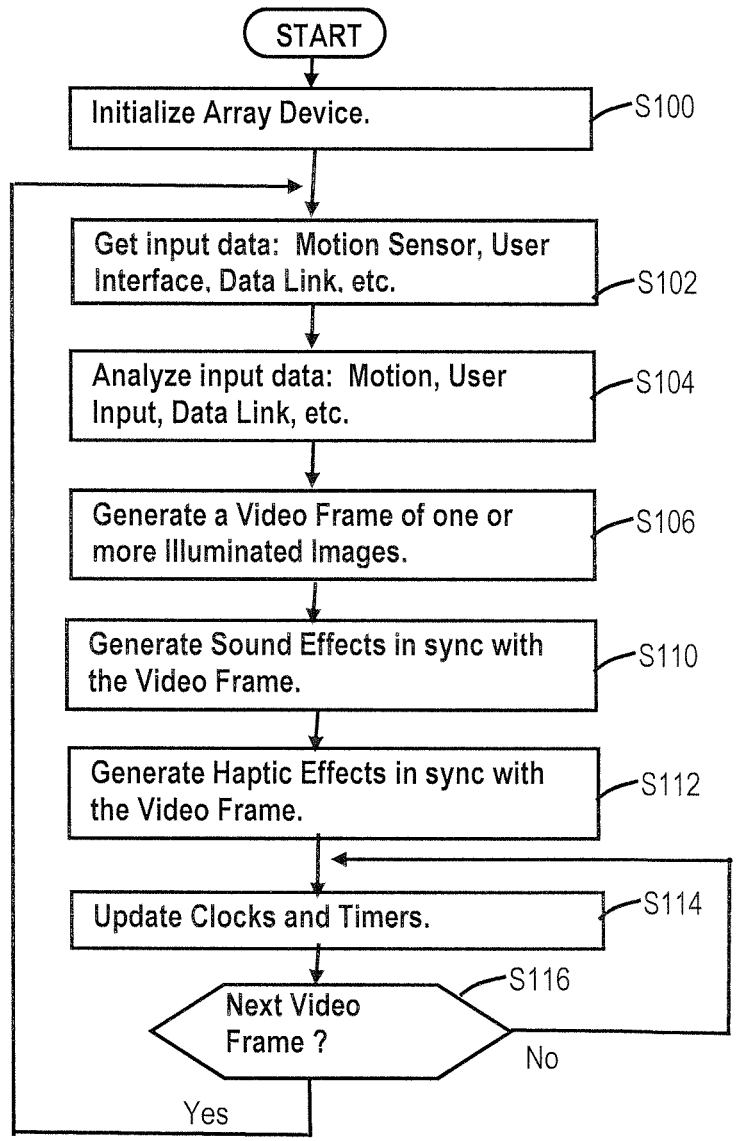
FIG. 64 is a flowchart of a computer implemented method of operation for a light array device.

Turning now to FIG. 64, a flowchart for a computer implemented method (or high level method) of operation of a light array device is presented, although alternative methods may be considered. The method may be implemented, for example, in memory (reference numeral 114 of FIG. 59) and executed by at least one control unit (reference numeral 120 of FIG. 59).

Beginning with step S100, the array device may initialize its computer readable memory (reference numeral 114 of FIG. 59) with default data (e.g., establishing data structures, variables, and configuring libraries).

In step S102, the array device may take receipt of signals from various sensors, such as one or more movement signals from the motion sensor (reference numeral 996 of FIG. 59) in response to device movement; whereupon, the signals are transformed and stored as motion data in memory. Further, the device may receive user input data (e.g., button press) from the device's user interface (reference numeral 116 of FIG. 3); whereupon, user input data is stored in memory. The device may also receive (or transmit) network data using the device's data link (reference numeral 116 of FIG. 59); whereupon, network data is stored in (or retrieved from) memory.

In step S104, the array device may analyze the input data (e.g., motion data, user input data, network data, etc.), acquired in step S102, and make decisions for the initialization and generation of corresponding multimedia effects. For example, moving the array device to the right (as shown in FIG. 63) may cause the device to start video frame playback of an illuminated, animated object (e.g., character, vehicle, etc.) moving to the right. Sound effects may also be initialized and generated such that the sound effects correspond to video frame playback. Moreover, haptic or vibratory effects may also be initialized and generated such that the haptic effects correspond to video frame playback.

In step S106, the array device may generate and project a video frame comprised of one or more illuminated images (e.g., as shown by images 338A-33C in FIG. 63). Wherein, the array device may activate or adjust the brightness of one or more illuminated images projected by the array device. For example, the light sequencer (reference numeral 992 of FIG. 59) may retrieve light control information from a library of pre-determined video frame definitions, which may be located in at least one application (reference numeral 994 of FIG. 59).

In step S110, the array device may generate at least one sound effect that corresponds to the video frame (containing one or more illuminated images) of step S106. The array device may coordinate, for example, the transfer of audio data (e.g., MP3 file) from at least one application (reference numeral 994 of FIG. 59) to the sound generator (reference numeral 998 of FIG. 59), creating an audible sound effect for a user.

In step S112, the array device may create at least one haptic (or vibratory) effect that corresponds to the video frame (containing one or more illuminated images) of step S106. The array device may coordinate, for example, the transfer of haptic wave data from at least one application (reference numeral 994 of FIG. 59) to the haptic generator (reference numeral 998 of FIG. 59), creating a vibratory effect felt by a user in physical contact with the array device.

In step S114, the array device may update clocks and timers so the device operates in a time-coordinated manner.

Finally, in step S116, if the array device determines, for example, that the next video frame needs to be displayed (e.g., every 1/30 of a second), then loop to step S102 to repeat the process. Otherwise, the device goes back to step S114 to wait for clocks to update.

In summary, the method of FIG. 64 may enable the array device to animate its projected image comprised of a sequence of video frames, each containing one or more illuminated images. Each iteration of steps S102-S116 produces a new video frame that may be comprised of one or more illuminated images on a projection surface. Whereby, during operation, the array device projects a first video frame, followed by a second video frame, and so on.

For smoother animation (as shown earlier in FIG. 63), a first illuminated image, appearing in a first video frame, may decrease in brightness in at least one subsequent video frame and a second illuminated image, appearing in the first video frame, may increase in brightness in at least one subsequent video frame.

Light Sequencer Method of an Array Device

Figure 65:
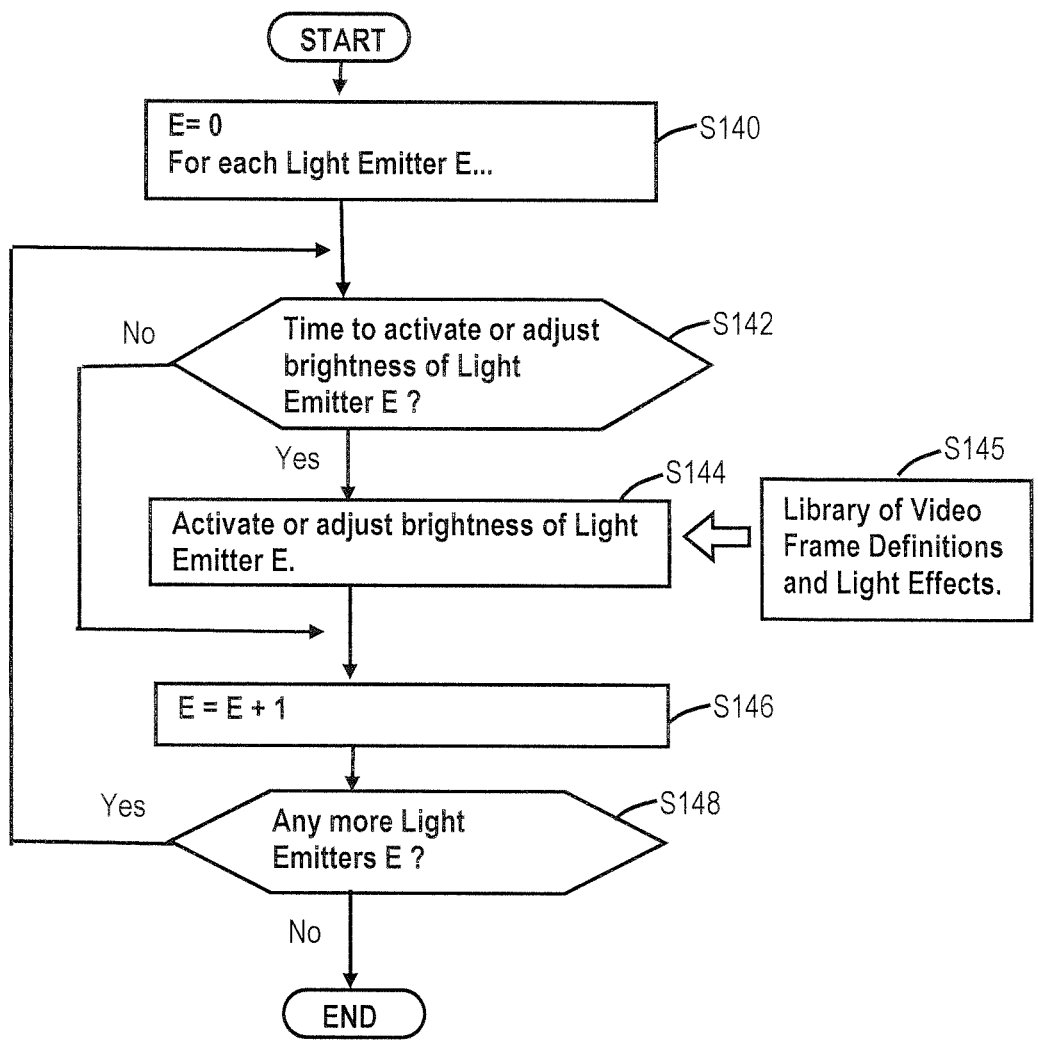
FIG. 65 is a flowchart of a computer implemented method of a light sequencer for a light array device.

Turning now to FIG. 65, a flowchart for a computer implemented method of a light sequencer for controlling light effects of an array device is presented, although alternative methods may be considered. The method may be implemented, for example, in the light sequencer (reference numeral 992 of FIG. 59) and executed by at least one control unit (reference numeral 120 of FIG. 59). This method may be invoked by a high-level method (e.g., step 106 of FIG. 64) to project at least one illuminated image by at least one light emitter.

Beginning with step S140, the array device may set a variable E=0, which acts as an identifier for a specific light emitter within the array device. Whereby, the array device may further select each light emitter available within the array device (e.g., such as each of nineteen light emitters within device 1000 of FIG. 57), starting with the first light emitter E.

Then in step S142, if the array device determines it may be time to activate and/or adjust the brightness of light emitter E, continue to step S144. Otherwise, skip to step S146. The time to activate or adjust light brightness may be determined by reading a data clock or timer in memory, for example.

In step S144, the array device may activate or adjust the brightness level of light emitter E. As indicated earlier, techniques for adjusting light brightness (e.g., pulse width modulation, variable voltage, varying current, etc.) for light emitter E may be adapted from current art. The array device may determine light activation or brightness of emitter E by retrieving a video frame definition or light effect information from a data library located, for example, in at least one application (e.g., reference numeral 994 of FIG. 59), as defined by step S145. For example, light brightness level may follow a wave pattern (e.g., ramp up, sustain, and ramp down as signal Q4 in FIG. 62B). Or alternatively, the light activation level may follow a square wave pattern (e.g., on and off as signal Q1 in FIG. 62A).

Then in step S146, the array device may increment the variable E to the next light emitter E.

Finally, in step S148, if the array device determines there are more light emitters E (contained in the array device) to activate or adjust brightness, then loop to step S142 to process the next light emitter E. Otherwise, the method ends. The array device may determine if there are more light emitters, for example, by comparing E to a predetermined total number of emitters (e.g., E<19) within the array device.

Alternative Light Array Devices

In summary, the features of the described embodiments and alternatives may be used in whole, part, or in combination to create a light array projection and sensing system. For example, the light brightness control functionality of the sixth embodiment may be utilized in the first through fifth embodiments of the invention. Most importantly, the mechanisms that enable converging, parallel, and diverging light beams discussed in the first, fourth, and fifth embodiments, respectively, are not mutually exclusive—but are aspects of the invention and may be utilized, for example, in a single embodiment.

In an effort to provide a concise description of various embodiments, not all features of an actual implementation have been described. It should be appreciated that when actually implementing embodiments of this invention, as in any product development process, many decisions must be made. Moreover, it should be appreciated that such a design effort could be quite labor intensive, but would nevertheless be a routine undertaking of design and construction for those of ordinary skill having the benefit of this disclosure. Some helpful terms used throughout the present disclosure shall be defined.

The terms "a", "an", and "the" refers to one or more items. Where only one item is intended, the term "one" or similar language is used. Also, the term "includes" means "comprises". The term "and/or" refers to any and all combinations of one or more of the associated list items.

The terms "component", "adapter", "module", "interface", "circuit", "program", "application", "method", "analyzer", "control", and like terms are intended to include hardware, firmware, and/or software.

The term "haptic" refers to tactile stimulus presented to a user, often provided by a vibrating or haptic device when placed near the user's skin. A "haptic signal" refers to a signal that activates a haptic device.

The terms "key", "keypad", "key press", and like terms are meant to broadly include all types of user input interfaces and their respective action, such as, but not limited to, a gesture-sensitive camera, a touch pad, a keypad, a control button, a trackball, and/or a touch sensitive display.

The terms "computer readable medium" or the like refers to any kind of medium for retaining information in any form or combination of forms, including various kinds of storage devices (e.g., magnetic, optical, and/or solid state, etc.). The term "computer readable medium" also encompasses transitory forms of representing information, including various hardwired and/or wireless links for transmitting the information from one point to another.

The term "multimedia" refers to media content and/or its respective sensory action, such as, but not limited to, video, graphics, text, audio, haptic, user input events, computer readable instructions, and/or computer data.

The term "operatively coupled" refers to a wireless and/or a wired means of communication between items, unless otherwise indicated. The term "wired" refers to any type of physical communication conduit (e.g., electronic wire, trace, or optical fiber). Moreover, the term "operatively coupled" may further refer to a direct coupling between items and/or an indirect coupling between items via an intervening item or items (e.g., an item includes, but not limited to, a component, a circuit, a module, and/or a device).

The term "optical" refers to any type of light or usage of light, both visible (e.g., white light) and/or invisible light (e.g., infrared light), unless specifically indicated.

The present disclosure illustrates examples of operations and methods used by various embodiments. Those of ordinary skill in the art will readily recognize that certain steps or operations described herein may be eliminated, taken in an alternate order, and/or performed concurrently. Moreover, the operations may be implemented as one or more software programs for a computer system and encoded in a computer readable medium as instructions executable on one or more processors. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Various alternatives and embodiments are fully contemplated as being within the scope of the following claims particularly pointing out and distinctly claiming the subject matter regarded as the invention.

I claim:

1. A light array device, comprising:
   a control unit; and
   an integrated array pack, the array pack including a plurality of light emitters, a multi-image film having a plurality of individual images, and a plurality of optical elements, wherein the array pack is in communication with the control unit such that the control unit operates the array pack to project at least one illuminated image.

2. The device of claim 1 wherein the control unit is comprised of at least one of a microprocessor, a microcontroller, a digital timer, an analog sequencer, or any other control apparatus capable of switching electronic circuitry on and off.

3. The device of claim 1 wherein the control unit adjusts the brightness of light emitted by at least one of the plurality of light emitters.

4. The device of claim 1 wherein the control unit is operable to control the array pack to project, in a substantially sequential manner, one or more illuminated images on a projection surface.

5. The device of claim 1 wherein the control unit is operable to control the array pack to project, in a substantially sequential manner, converging beams of light that form an animated overlaid image on a projection surface.

6. The device of claim 1 wherein the control unit is operable to control the array pack to project diverging beams of light that form a tiled image on a projection surface.

7. The device of claim 4 further comprising a sound generator operable to generate a sound effect, wherein the device may generate at least one sound effect that corresponds to the one or more illuminated images on the projection surface.

8. The device of claim 4 further comprising a haptic generator, affixed to the device, operable to generate vibratory effects of the device, wherein the haptic generator generates at least one vibratory effect that corresponds to the one or more illuminated images on the projection surface.

9. The device of claim 4 further comprising a light brightness control, wherein the control unit is in communication with the light brightness control such that the one or more illuminated images may be adjusted in brightness on the projection surface.

10. The device of claim 9 wherein the light brightness control is integrated with or integral to the control unit.

11. The device of claim 9 wherein at least one illuminated image increases in brightness at substantially the same time when at least one other illuminated image decreases in brightness.

12. The device of claim 9 wherein the light brightness control utilizes pulse-width modulation to vary the brightness of the one or more illuminated images.

13. The device of claim 9 further comprising a motion sensor, affixed to the device, and operable to generate a movement signal based upon the movement of the device, wherein the movement signal is received by the control unit such that the control unit activates one or more illuminated images projected by the array pack based upon the movement signal such that the one or more illuminated images projected by the array pack is based on the movement of the device.

14. The device of claim 13 wherein when the device is moved through space, the device adjusts the brightness of the one or more illuminated images projected by the allay pack.

15. A computer implemented method for presenting video frames using a light array device comprising a plurality of light emitters that each generate one of a plurality of converging beams of light, the method comprising:
   activating at least one light emitter to project a first video frame from the light array device, wherein the first video frame is projected to a focal point and is comprised of an at least a first illuminated image; and
   subsequently activating one or more other light emitters to generate one or more subsequent video frames from the light array device, wherein the subsequent video frames are projected to the focal point and are comprised of an at least second illuminated image.

16. The method of claim 15, wherein at least the first video frame is comprised of both the first and second illuminated image.

17. The method of claim 15, further comprising the step of generating at least one sound effect when the first video frame is projected by the light array device, wherein the sound effect corresponds to the first video frame.

18. The method of claim 15, further comprising the step of generating at least one haptic or vibratory effect when the first video frame is projected by the light array device, wherein the haptic or vibratory effect corresponds to the first video frame.

19. The method of claim 16, wherein the first illuminated image, appearing in the first video frame, decreases in brightness in at least one subsequent video frame and the second illuminated image, appearing in the first video frame, increases in brightness in at least one subsequent video frame.

20. A computer readable storage medium storing computer-executable instructions that, when executed by a control unit, perform a method comprising:
   activating at least one light emitter to project a first video frame from the light array device, wherein the first video frame is projected to a focal point and is comprised of an at least first illuminated image; and
   subsequently activating one or more other light emitters to generate generating one or more subsequent video frames from the light array device, wherein the subsequent video frames are projected to the focal point and are comprised of an at least second illuminated image.

21. The computer readable storage medium of claim 20, wherein the at least the first video frame is comprised of both the first and second illuminated image.

22. The computer readable storage medium of claim 21, wherein the first illuminated image. appearing in the first video frame, decreases in brightness in at least one subsequent video frame; and the second illuminated image, appearing in the first video frame, increases in brightness in at least one subsequent video frame.

* * * * *